US010848031B2

(12) United States Patent
Alei et al.

(10) Patent No.: US 10,848,031 B2
(45) Date of Patent: Nov. 24, 2020

(54) INTEGRATED FLYWHEEL ENERGY STORAGE SYSTEM

(71) Applicant: Saint-Augustin Canada Electric Inc., Saint-Augustin de Desmaures (CA)

(72) Inventors: Phil Alei, Saint-Augustin de Desmaures (CA); Preston Brendel, Saint-Augustin de Desmaures (CA); Cheruvari Karthik Hari Dharan, Berkeley, CA (US); Henry Godman, Saint-Augustin de Desmaures (CA); Mike Kitchen, Saint-Augustin de Desmaures (CA); Eric Martinez, Saint-Augustin de Desmaures (CA); Hung Nguyen, Saint-Augustin de Desmaures (CA); Khang Nguyen, Saint-Augustin de Desmaures (CA); Tien Nguyen, Saint-Augustin de Desmaures (CA); Ton Nguyen, Saint-Augustin de Desmaures (CA); Jeffrey Nguyen, Saint-Augustin de Desmaures (CA); Matt Paiz, San Diego, CA (US); E-Fann Suang, Saint-Augustin de Desmaures (CA); Danny Schmitz, Saint-Augustin de Desmaures (CA); Siyuan Xin, Saint-Augustin de Desmaures (CA)

(73) Assignee: Saint-Augustin Canada Electric Inc., Quebec (CA)

( * ) Notice: Subject to any disclaimer, the term of this patent is extended or adjusted under 35 U.S.C. 154(b) by 169 days.

(21) Appl. No.: 15/827,672

(22) Filed: Nov. 30, 2017

(65) Prior Publication Data

US 2018/0152076 A1    May 31, 2018

Related U.S. Application Data

(60) Provisional application No. 62/427,981, filed on Nov. 30, 2016.

(51) Int. Cl.
*H02K 7/02* (2006.01)
*H02K 11/21* (2016.01)
(Continued)

(52) U.S. Cl.
CPC ............ *H02K 7/025* (2013.01); *G01L 5/0009* (2013.01); *H02K 5/1735* (2013.01); *H02K 5/24* (2013.01);
(Continued)

(58) Field of Classification Search
CPC .......... H02K 7/02; H02K 11/21; H02K 49/10; H02K 7/00; H02K 7/09; H02K 5/1735;
(Continued)

(56) References Cited

U.S. PATENT DOCUMENTS 5,398,571 A * 3/1995 Lewis ................. F16C 32/0459
310/90.5
7,884,521 B2 * 2/2011 Buhler ................ F16C 32/0457
310/216.121
(Continued)

*Primary Examiner* — Naishadh N Desai
(74) *Attorney, Agent, or Firm* — TraskBritt

(57) ABSTRACT

A flywheel energy storage system comprises a rotor having a rotational axis about which the rotor spins in operation and comprising a ferrous material and a housing enclosing the rotor and having an interior subject to a vacuum. The system further comprises a vacuum pump configured to provide the vacuum of the interior of the housing, an electromagnet configured to apply a magnetic field and lift the rotor vertically along the rotational axis of the rotor, and at least one bearing provided between the rotor and the housing, and a controller in operative communication with the electromagnet and the vacuum pump. The rotor applies a force against the at least one bearing.

20 Claims, 55 Drawing Sheets

(51) Int. Cl.
  *H02K 49/10* (2006.01)
  *H02K 7/09* (2006.01)
  *H02K 7/00* (2006.01)
  *G01L 5/00* (2006.01)
  *H02K 11/25* (2016.01)
  *H02K 5/173* (2006.01)
  *H02K 7/116* (2006.01)
  *H02K 5/24* (2006.01)

(52) U.S. Cl.
  CPC ............... *H02K 7/003* (2013.01); *H02K 7/09* (2013.01); *H02K 7/116* (2013.01); *H02K 11/21* (2016.01); *H02K 11/25* (2016.01); *H02K 49/108* (2013.01); *Y02E 60/16* (2013.01)

(58) Field of Classification Search
  CPC .......... H02K 5/24; H02K 7/116; H02K 11/25; H02K 49/108; H02K 7/003; H02K 7/025; G01L 5/00; G01L 5/0009; Y02E 60/16
  USPC .......................................................... 310/74
  See application file for complete search history.

(56) References Cited

U.S. PATENT DOCUMENTS

2008/0054741 A1* 3/2008 Oyama ............... F16C 32/0444
                                        310/68 A
2014/0124172 A1* 5/2014 Veltri .................... F16F 15/302
                                        165/104.19

* cited by examiner

| State | Pump 410 | Bleeder Valve 440 | Accumulator Valve 420 | Piston Valve 430 |
|---|---|---|---|---|
| S0 | Off | Closed | Closed | Closed |
| S1 | On | Closed | On | Closed |
| S2 | Off | Closed | Closed | Open |
| S3 | Off | Open | Closed | Closed |

FIG. 4b

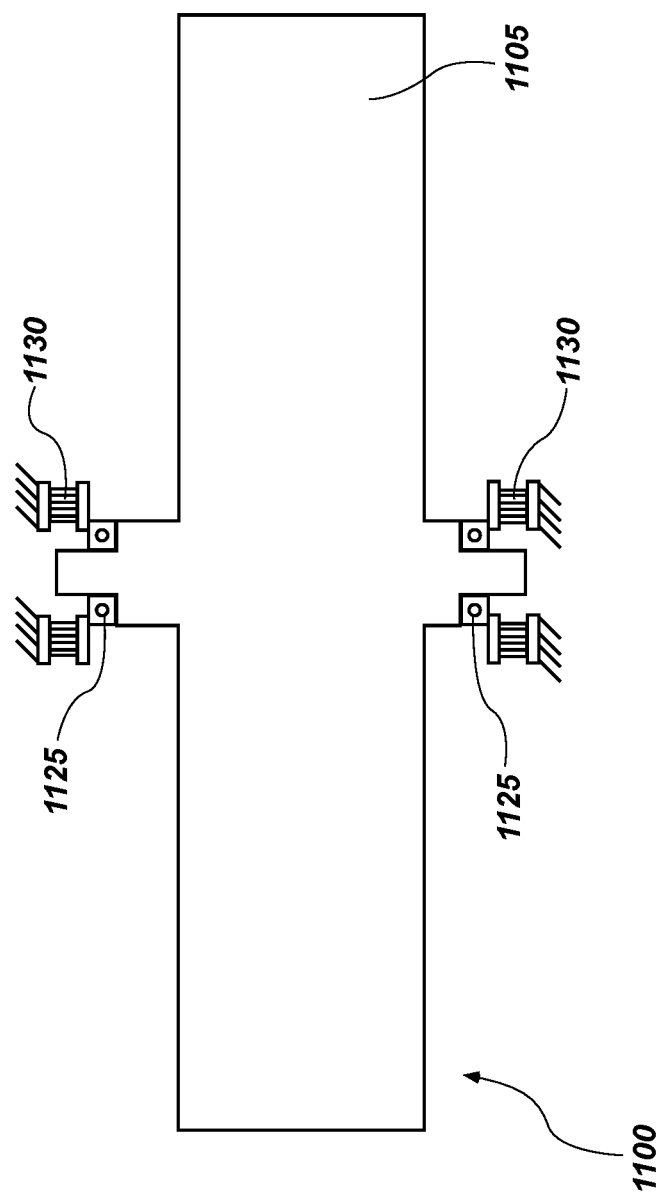

INTEGRATED FLYWHEEL ENERGY STORAGE SYSTEM

CROSS-REFERENCE TO RELATED APPLICATION

This application claims the benefit under 35 U.S.C. § 119(e) of U.S. Provisional Patent Application Ser. No. 62/427,981, filed Nov. 30, 2016, the disclosure of which is hereby incorporated herein in its entirety by this reference.

FIELD

The present description relates to energy storage systems and, more particularly, to a system and method for efficiently converting electrical energy into stored kinetic energy and providing electrical energy converted from kinetic energy.

BACKGROUND

Energy can be converted from one form to another, such as from electrical energy into kinetic energy and back into electrical energy. Thus, electrical energy can be used to power a motor that can spin a flywheel or rotor. The momentum of the flywheel is a form of stored energy. The motor can be used as a generator and convert the kinetic energy of the flywheel into electrical energy. Ideally, once a flywheel has momentum, the flywheel can spin indefinitely. However, parasitic losses such as friction and drag can diminish the efficiency of a flywheel as an energy storage device. Accordingly, it can be desirable to increase the efficiency of a flywheel energy storage system.

SUMMARY

An illustrative system includes a rotor configured to spin about an axis and a housing configured to surround the rotor. The rotor is comprised of a ferrous material. An inside area of the housing comprises a vacuum. The system also includes a vacuum pump configured to provide the vacuum of the inside area of the housing and an electromagnet configured to apply a magnetic field near the rotor. The magnetic field lifts the rotor. The system can further include upper bearings pressed between the rotor and the housing when the electromagnet applies the magnetic field and a controller in operative communication with the electromagnet and the vacuum pump.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 4b is a table of the states of a hydraulic piston system in accordance with an illustrative embodiment.

FIGS. 11a and 11c illustrate techniques for controlling resonant frequency and vibration in accordance with an illustrative embodiment.

Figure 1:
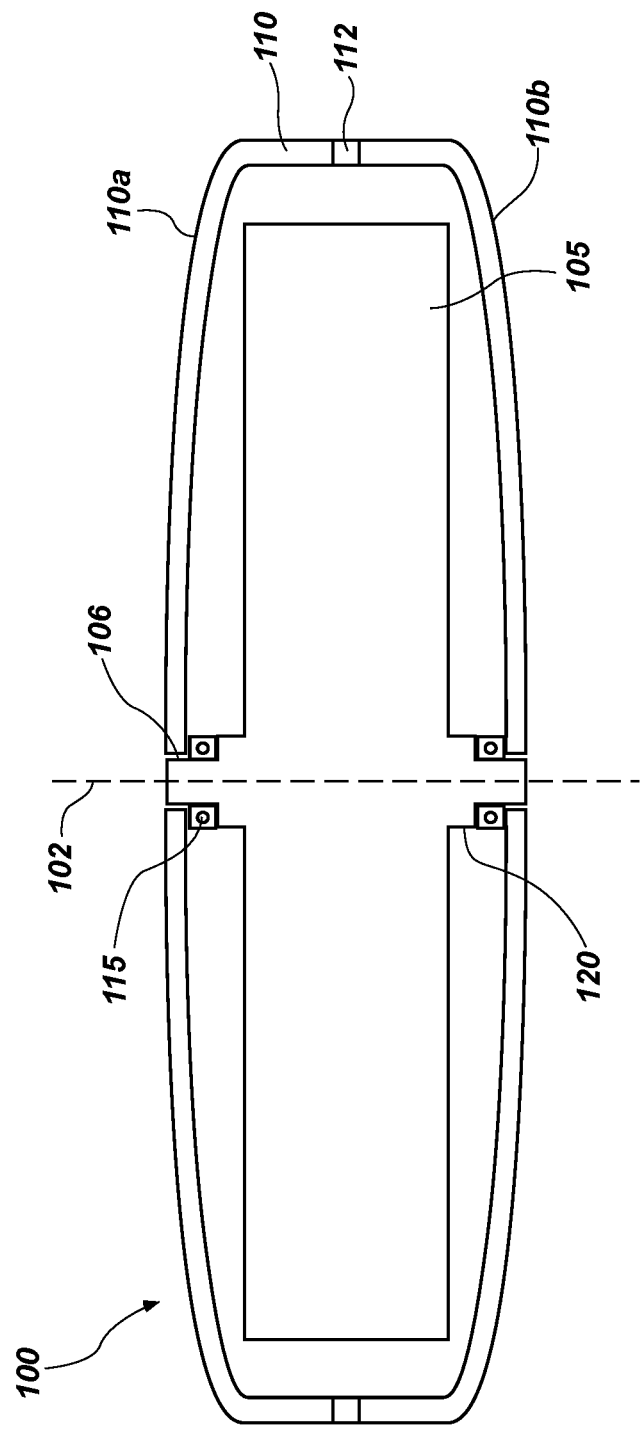
FIG. 1 illustrates a sealed flywheel energy storage system in accordance with an illustrative embodiment.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 illustrates a sealed flywheel energy storage system 100 in accordance with an illustrative embodiment. In alternative embodiments, the system 100 can include additional, fewer, and/or different elements. The system 100 can include a rotor 105, a housing 110, upper bearings 115, and lower bearings 120. The rotor 105 can be configured to rotate about an axis 102 and can be centered between upper bearings 115 and lower bearings 120. The rotor 105 can be configured to receive rotational energy (e.g., from a motor, which is not shown in FIG. 1) and store the rotational energy by continuing to rotate. That is, the rotor 105 (which can be referred to as a flywheel) can store rotational energy as momentum.

In an ideal system, the system 100 can receive, for example, 10 watts (W) of rotational energy, store the 10 W of rotational energy by rotating indefinitely, and output 10 W of rotational energy (e.g., when a generator is coupled to a shaft of the rotor 105). However, in the real world, several practical, parasitic components or properties of the system 100 can reduce the efficiency from an ideal system.

For example, air resistance can reduce the efficiency of the system 100. When the rotor 105 is rotating, the atmosphere surrounding the rotor can act as a fluidic resistance to the rotor 105 rotating. Thus, in some embodiments, the housing 110 can be configured to maintain a vacuum within the housing 110. By creating a vacuum, either a partial vacuum or a total vacuum, the air resistance encountered by the rotor 105 while rotating can be reduced or eliminated, thereby increasing the efficiency of system 100.

In another example, friction can cause rotational energy to be converted into heat, which can be lost to an atmosphere surrounding system 100. As shown in FIG. 1, some embodiments can include upper bearings 115 and lower bearings 120. The upper bearings 115 and lower bearings 120 can be, for example, ball bearings configured to reduce the friction between the stationary housing 110 and the rotating rotor 105. The lower bearings 120 can be arranged between a shoulder 104 of the rotor 105 and a lower portion 110b of the housing 110. That is, lower bearings 120 can contact the rotor 105 on a top side of the lower bearings 120 and can contact the housing 110 on a bottom side of the lower bearings 120. Similarly, the upper bearings 115 can be arranged between a shoulder 104 of the rotor 105 and an upper portion 110a of the housing 110. That is, upper bearings 115 can contact the housing 110 on a top side of the upper bearings 115 and can contact the rotor 105 on a bottom side of the upper bearings 115.

In some instances, the rotor 105 can press against at least one of the upper bearings 115 or the lower bearings 120 while the rotor 105 is rotating. The force applied against the upper bearings 115 or the lower bearings 120 can cause friction, which can convert rotational energy of the rotor 105 into heat. In some embodiments, at least one of the upper bearings 115 or the lower bearings 120 can also be configured to maintain the rotor 105 along an axis and can prevent the rotor 105 from tilting off of the vertical axis.

Although not shown in FIG. 1, system 100 can include an electromagnet that is configured to lift the rotor 105. For example, the rotor 105 can be made of a ferrous or other magnetic material, and the electromagnet can be located above at least a portion of the rotor 105. In some embodiments, system 100 can include multiple electromagnets that are spaced evenly about the rotor 105. The electromagnet can be configured to apply a magnetic field near the rotor 105 to attract the rotor 105. As noted, the electromagnet can be located above the rotor 105, and the electromagnet can lift the rotor 105 using electromagnetic energy. In some embodiments, the electromagnet can be configured to reduce (or eliminate) the amount of force (e.g., weight) applied to the lower contact bearings 120 by the rotor 105, thereby reducing the amount of friction that translates rotational energy into heat.

Further, in some embodiments, the electromagnet can be configured to lift the rotor 105 up against the upper bearings 115. The electromagnet can be configured to control the lifting force applied to the rotor 105 and, therefore, control the force applied against the upper bearings 115 by the rotor 105. By reducing the amount of rotational friction (e.g., by lifting the rotor 105) and by reducing the amount of air resistance (e.g., by creating a vacuum in housing 110), the efficiency of system 100 can be increased to be closer to ideal conditions.

As shown in FIG. 1, the housing 110 can be comprised of multiple parts. For example, the housing 110 of FIG. 1 includes an upper portion 110a and a lower portion 110b separated by a seal 112 around a lateral outside circumference of the housing 110. The housing 110 can also include a seal around at least one shaft 106 (e.g., an upper shaft) of the rotor 105. The at least one shaft 106 can be configured to couple the rotor 105 to a generator (not shown in FIG. 1), which can convert rotational kinetic energy into electrical energy. The seals of housing 110 can be configured to maintain a vacuum inside of the housing 110 while the housing 110 is surrounded by an atmosphere (e.g., atmospheric pressure).

As mentioned, a generator can be coupled to the rotor 105. In some embodiments, the generator can also be an electric motor. For example, the motor/generator can be configured to input energy into the system 100 by converting electrical energy into rotational energy and can also be configured to extract energy from system 100 by converting rotational energy into electrical energy. In other embodiments, the system 100 can include a generator and an electric motor. The electrical energy of the motor/generator can be converted from/into a different form (e.g., 480 Volts of alternating current (VAC)).

In some embodiments, an oil cooling system can be used in conjunction with the system 100. As noted above, heat can be generated by the upper bearings 115 and/or the lower bearings 120. The upper bearings 115 and/or the lower bearings 120 can be surrounded by oil. The oil can reduce friction between ball bearings and the raceway of the ball bearings. In some embodiments, a flow of oil around the ball bearings in the raceway can be used. The flow of oil can further decrease the amount of friction between the ball bearings and the raceway. The flow of oil can also help to dissipate heat created by the upper bearings 115 and the lower bearings 120. Oil flowing into the upper bearings 115 and/or the lower bearings 120 can have a temperature that is cooler than the upper bearings 115 and/or the lower bearings 120. As the oil flows across, around, and/or through the upper bearings 115 and/or the lower bearings 120, heat can transfer from the upper bearings 115 and/or the lower bearings 120 to the oil. The oil can also flow out of the upper bearings 115 and/or the lower bearings 120 (having absorbed some heat from the upper bearings 115 and/or lower bearings 120) and flow through a heat exchanger configured to transfer heat from the oil to another location (e.g., air, atmosphere, water, coolant, etc.).

In some embodiments, a system controller can be used. The system controller can monitor and command/control the various components of a flywheel energy storage system. The system controller can include a processor, a memory, an input/output module, etc. Some embodiments of the present disclosure can include motors, pumps, sensors (e.g., cameras, pressure transducers, vibration sensors, microphones, temperature sensors, flow sensors, etc.), power inverters, etc. The system controller can communicate with some or all of the components and send commands to the various components. The system controller can include a central decision node and/or multiple decision nodes. The system controller can coordinate the various components to work together. A system controller according to some embodiments is discussed in greater detail below with regard to FIG. 24a and controller 2400.

As mentioned, the system 100 can be configured to store energy. In some embodiments, the energy can be received by the system 100 in the form of electricity. For example, system 100 can be connected to line energy, which can be, for example, three phase power. The system 100 can include a line power modulator that can be configured to convert incoming line power into a form usable by the system 100 and can convert outgoing power to the lines from the system 100 (e.g., electricity generated by a generator powered by the rotor 105). The line power modulator can also be configured to monitor and/or modify characteristics of the electrical circuit of the line power. For example, the line power modulator can be configured to correct a power factor of the lines, reduce apparent power of the lines, correct harmonic imbalances of the line power, etc.

A flywheel energy storage system, for example, including the system 100, can be physically located in various places around the world. For example, the flywheel energy storage system can be located in a city center, in a warehouse, in an office building, in a house, in a shed, in the country, in the desert, in mountainous terrain, etc. Thus, rotors can be shipped, for example, from a manufacturer to the location of a storage system, which can be anywhere.

In some embodiments, an integrated shipping container can be used to contain a rotor for shipment. FIGS. 2d and 2e illustrate a cross-sectional view of a rotor shipping container 282 in a closed state and in an open state, respectively, in accordance with an illustrative embodiment. The integrated shipping container can have a load capacity of at least 15,000 pounds (lbs). The integrated shipping container can be used to contain a rotor 260 (e.g., rotor 105) for shipment. The integrated shipping container can also be used to align the rotor 260 with housing 250.

In some embodiments, a rotor shipping container 282 can include a first annular wall 280 that can surround a rotor 260. The shipping container 282 can also include a circular top 285 and a circular bottom 290. The first annular wall 280, the circular top 285, and the circular bottom 290, together, can completely enclose the rotor 260. The circular top 285 and the circular bottom 290 can be removed from the first annular wall 280. In some embodiments, the circular top 285 and the circular bottom 290 can be removed from the first annular wall 280 while the rotor 260 remains within an inside portion of the first annular wall 280.

One or more hydraulic pistons 295 can be used to lift the rotor 260. For example, the hydraulic pistons 295 can be attached to the first annular wall 280. The hydraulic pistons 295 can be connected to the rotor 260 via a strap 288, a brace, etc. In such embodiments, the strap 288 can connect to the hydraulic piston 295 on one end, travel down the first annular wall 280 in a vertical direction, and attach to the rotor 260 on the other end of the strap 288. The hydraulic pistons 295 can be in an extended position and can be configured to maintain the weight of the rotor 260.

As noted above, the circular top 285 and the circular bottom 290 can be removed. In some instances, a retractable safety brace can be placed beneath the rotor 260 and connected to the first annular wall 280. The safety brace can be used to prevent the rotor 260 from falling through the first annular wall 280 in the event that the rotor 260 is no longer supported.

In some embodiments, the circular bottom 290 of the shipping container can be removable, and the rotor 260 can be ejected from the bottom side of the shipping container 282, as illustrated in FIG. 2e. The rotor 260 can be ejected directly into a housing 250. The first annular wall 280 can be configured to align with a bottom portion (e.g., a bottom half) of the housing 250. The bottom portion of the housing 250 can have an annular ridge 284 that can be configured to receive an annular ridge 286 of the first annular wall 280. Thus, a center axis of the first annular wall 280 can also be a center axis of the rotor 260, which can be aligned with a center axis of the housing 250. Hydraulic force of the piston 295 can be relieved, thereby lowering the rotor 260 into the housing 250 along the center axis of the housing 250. In some embodiments, the shipping container 282 can include markings that can assist accurate and repeatable engagement of the rotor 260 with the housing 250.

In some embodiments, one or more flywheel energy storage systems (or portions of the one or more flywheel energy storage systems) can be housed in a single housing or enclosure. In some embodiments, the enclosure can be portable. For example, the enclosure can include an intermodal container (also known as a container, a freight container, an ISO container, a shipping container, a hi-cube container, a box, a sea container, a container van, a Conex container, etc.) that can be configured to be shipped.

Figure 2B:
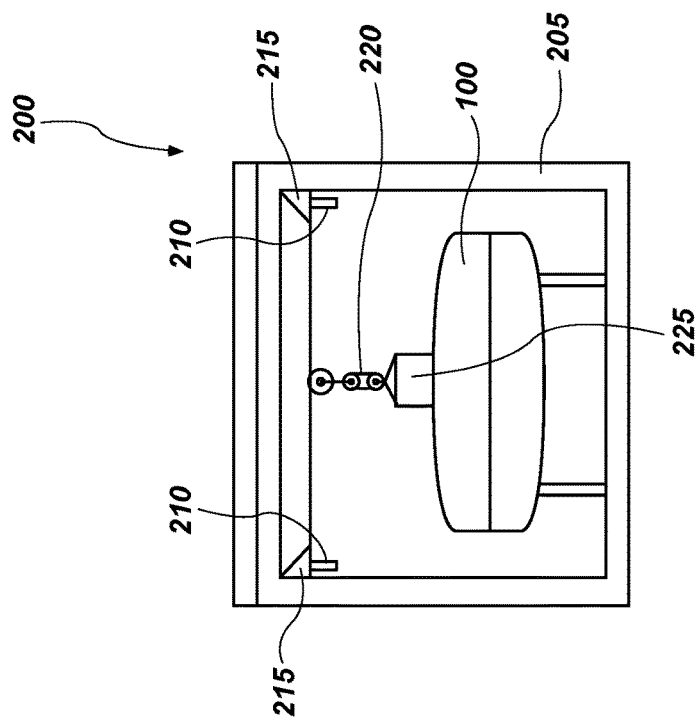
FIGS. 2a and 2b illustrate a system for transporting parts within an enclosure in accordance with an illustrative embodiment.
Figure 2A:
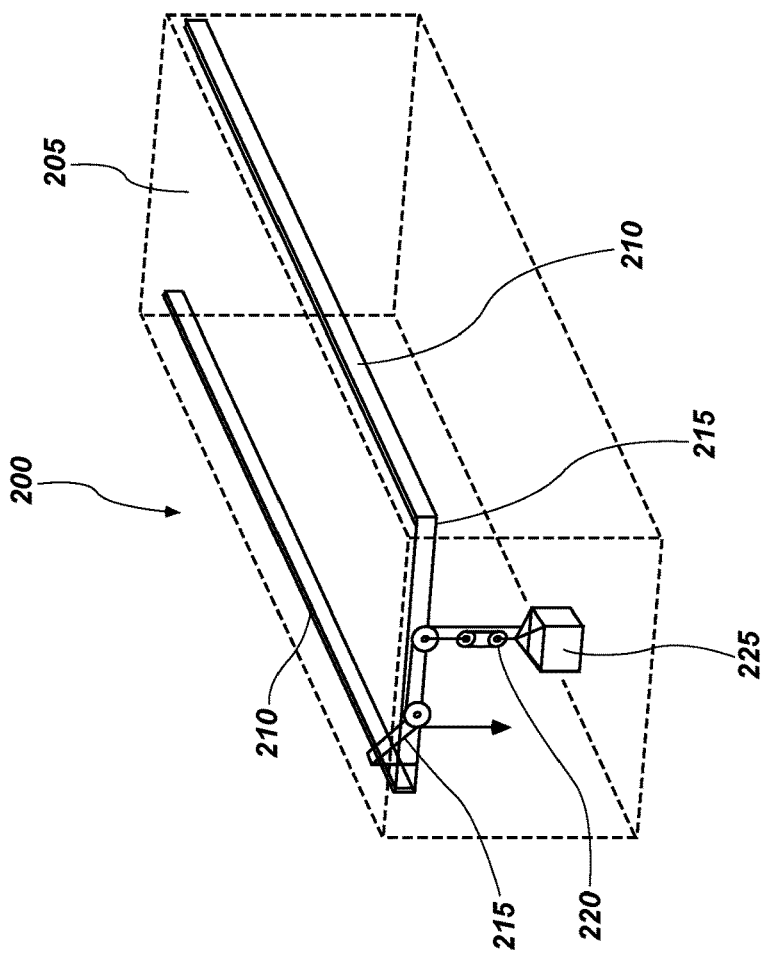

FIGS. 2a and 2b illustrate a perspective view and a cross-sectional view, respectively, of a system 200 for transporting parts within an enclosure in accordance with an illustrative embodiment. In alternative embodiments, additional, fewer, and/or different elements can be used. System 200 can include an enclosure 205, rails 210, hangers 215, a block and tackle 220, and a weight 225. The enclosure 205 can be, for example, an intermodal container. In other embodiments, the enclosure 205 can be any suitable housing. The enclosure 205 is indicated by dashed lines in FIG. 2a to indicate an outline of the boundaries of the enclosure 205 such that the elements of the system 200 contained within the enclosure 205 are visible.

The system 200 can assist in removal, replacement, or movement of components, parts, or items, such as a motor/generator. For example, a motor/generator can be removed from a flywheel energy storage system 100, as illustrated in the cross-sectional view of FIG. 2b, for maintenance of the motor/generator or of the flywheel energy storage system 100. Rails 210 can be mounted along opposing sides of enclosure 205. Hangers 215 can be mounted on rails 210 such that each hanger 215 can slide along a rail 210. In some embodiments, each rail 210 has one hanger 215. In other embodiments, one or more rails 210 can have one or more hangers 215. The hangers 215 can be selectively lockable such that the hangers 215 do not slide along rails 210. Rope, cable, or other support means can be strung between two or more hangers 215. In some embodiments, a solid support means can be used across the two or more hangers 215. A block and tackle 220 can be used with the support means and the hangers 215 to support a weight 225. The weight 225 can be a motor, a generator, a housing, a rotor, a support, etc.

The system 200 can include one or more motors (not illustrated in FIGS. 2a and 2b) that can move hangers 215 along rails 210, can adjust/tension the rope or cable between the hangers 215, can lower or raise weight 225 via the block and tackle 220, etc. In some embodiments, a plurality of motors can be used to provide a motorized system. In some embodiments, the pulley block and tackle 220 can provide a mechanical advantage that can multiply the force applied to the weight by a factor of four. In other embodiments, any suitable force multiplier block and tackle 220 can be used. In some embodiments, the block and tackle 220 can include (or can be replaced by) a winch.

In some embodiments, a rigid rail can span between hangers 215 in place of a cable or rope. In such embodiments, a cable, rope, etc., can be used with the block and tackle 220, and the block and tackle 220 can be movably fixed to the rigid rail. In such embodiments, the rigid rail can be removable from the hangers 215 and the rigid rail can be stored when not in use.

Figure 2C:
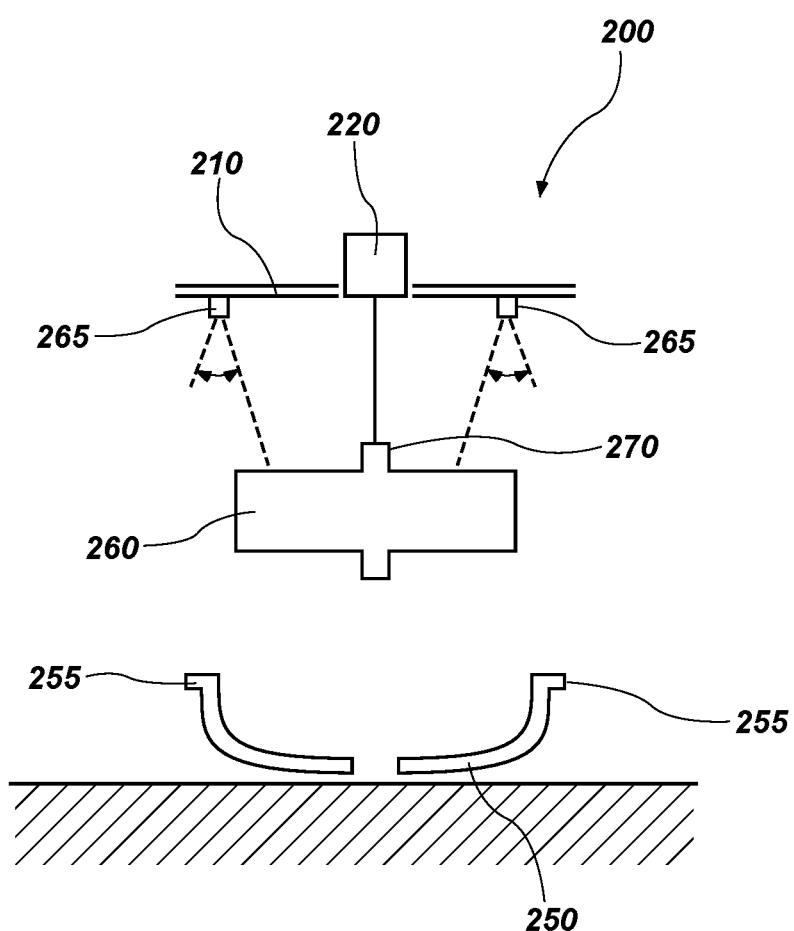
FIG. 2c illustrates a system for automatically mating a rotor with a housing in accordance with an illustrative embodiment.
Figure 2D:
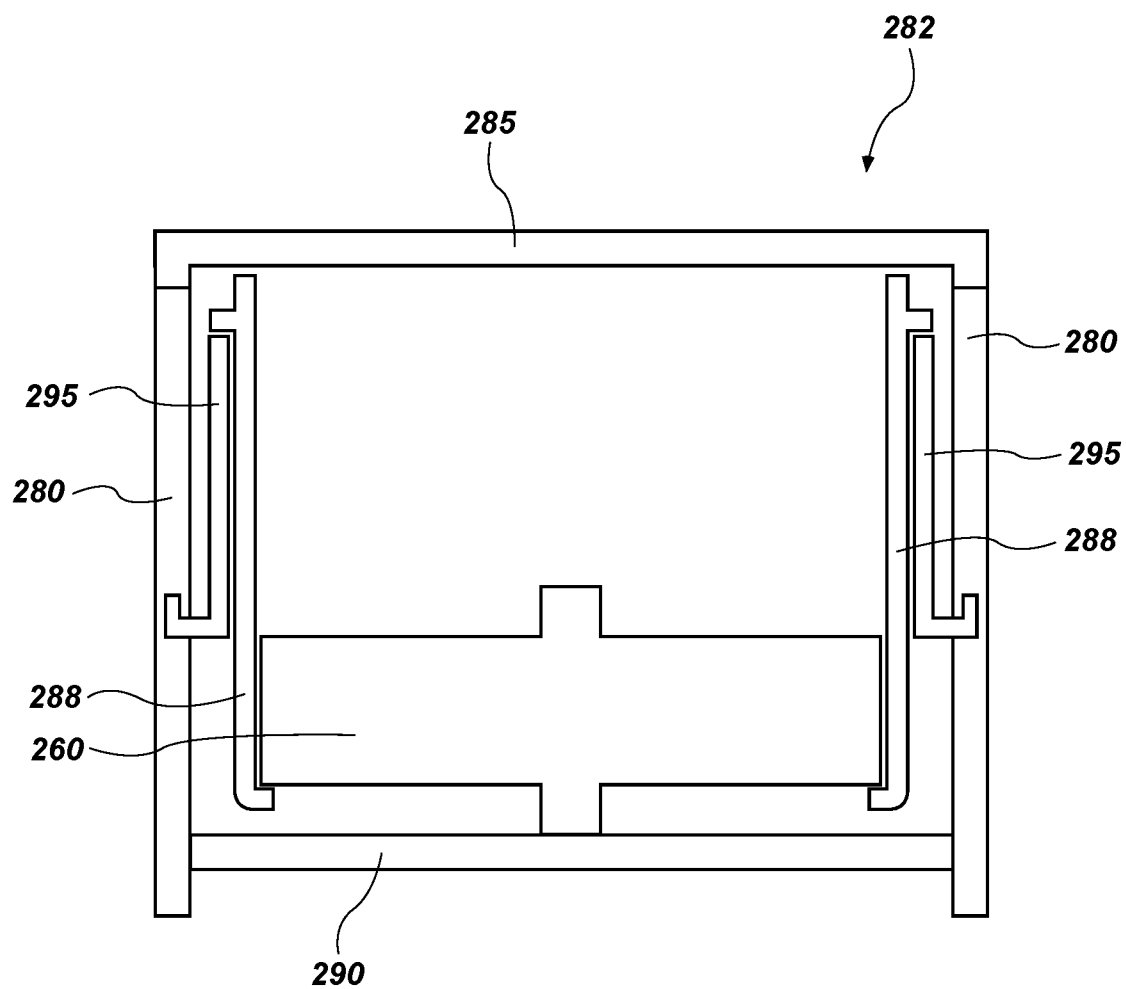
FIGS. 2d and 2e illustrate cross-sectional views of a rotor shipping container in accordance with an illustrative embodiment.
Figure 2E:
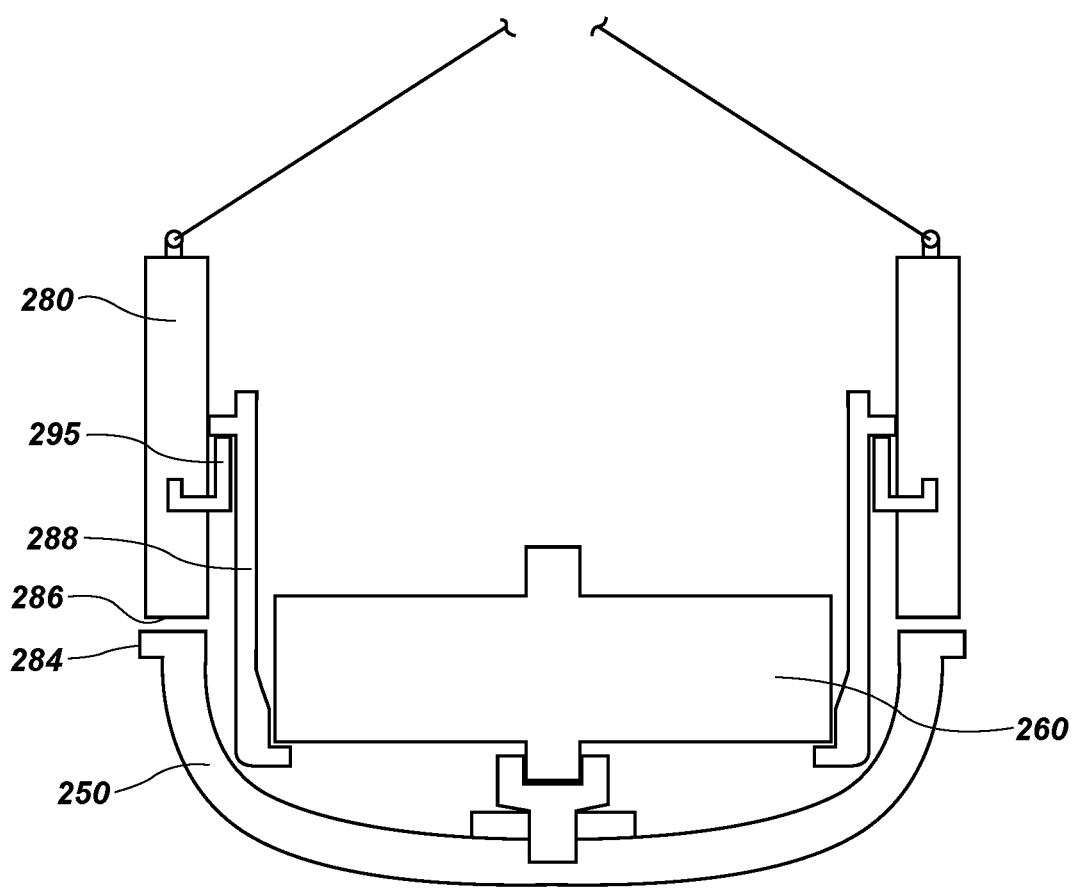

The system 200 can assist in assembly of a flywheel energy storage system. FIG. 2c illustrates a system for automatically mating a rotor 260 with a housing 250 in accordance with an illustrative embodiment. In alternative embodiments, additional, fewer, and different elements can be used. The system 200 can include rails 210 and a block and tackle 220. Motors can be used to move the block and tackle 220 in a two-dimensional plane. In some embodiments, block and tackle 220 can include any other suitable means for lifting and lowering items, such as an electric winch.

One or more cameras 265 can be used to locate items such as the rotor 260 and the housing 250 in relation to one another. Although FIG. 2c illustrates the use of two cameras 265, any suitable number of cameras can be used. Further, although FIG. 2c illustrates cameras 265 mounted on a ceiling looking down, cameras 265 can be mounted in any suitable position, such as on a wall. In some embodiments, one or more cameras 265 can be mounted at a height between rails 210 and housing 250 with a field of view perpendicular to the vertical movement of the rotor 260 being lowered into housing 250. In such embodiments, the one or more cameras 265 can be used to determine a height of the rotor 260 in relation to the housing 250.

As discussed in greater detail below (for example, with regard to FIGS. 12b and 12c), rotor 260 can display one or more patterns detectable by a camera. Cameras 265 can be configured to capture an image of the patterns on rotor 260 and send the image to a controller. The controller can be configured to determine a location of the rotor 260 based on the relative size of the patterns in the captured image. For example, the larger the pattern of the rotor 260, the closer the rotor 260 is to the camera 265 that captured the image. Further, the controller can be configured to determine a relative distance (e.g., the distance between the rotor 260 and the housing 250) based on a ratio of size of two objects. Housing 250 can include one or more tabs 255. The tabs 255 can be captured in images by cameras 265 and can be used to determine an orientation and/or location of the housing 250. For example, tabs 255 can display a pattern (e.g., can be white) that can be recognizable by the controller based on images captured by cameras 265. In one example, housing 250 can include four white tabs on the lip of the housing 250, each white tab separated by ninety degrees from a neighboring tab.

In some embodiments, system 200 can include one or more accelerometers 270. The accelerometers 270 can be used by the controller to determine a location of the rotor 260 and/or movement of the rotor 260. In some embodiments, one or more accelerometers 270 can be used in place of cameras 265 to determine the location of rotor 260. In some embodiments, an accelerometer 270 can be used to detect movement of the rotor 260, such as swinging. For example, if rotor 260 is being lowered into housing 250, the accelerometer 270 can be used to determine whether the rotor 260 is swinging in a lateral direction. Motors can be used to move the block and tackle 220 to compensate for the swinging or to mitigate the swinging. The motors can be controlled by the controller.

Cameras 265, accelerometers 270, and a controller can be used to align rotor 260 and the bottom half of a housing 250 such that the rotor 260 is hanging above and centered on the housing 250. The rotor 260 can then be lowered down into the housing 250.

In some embodiments, one or more rods can be used to align the center axis of the top half of the housing 250 with the bottom half of housing 250. Rods can be slid and/or fitted into slots around the lip of the bottom half of the housing 250. The rods can extend upward in a parallel direction to the center axis of the bottom half of the housing 250. The top half of the housing 250 can be lifted over bottom half of the housing 250 and can be lowered on top of the bottom half of the housing 250. The rods that extend upward from the bottom half of the housing 250 can slide into respective slots in the top half of the housing 250. The slots in the top and bottom halves of the housing 250 can be aligned such that the center axes of the top and bottom halves are the same axis when the slots are aligned. The top and bottom halves of the housing 250 can be bolted together to maintain the relative position of the top and bottom halves.

Figure 3:
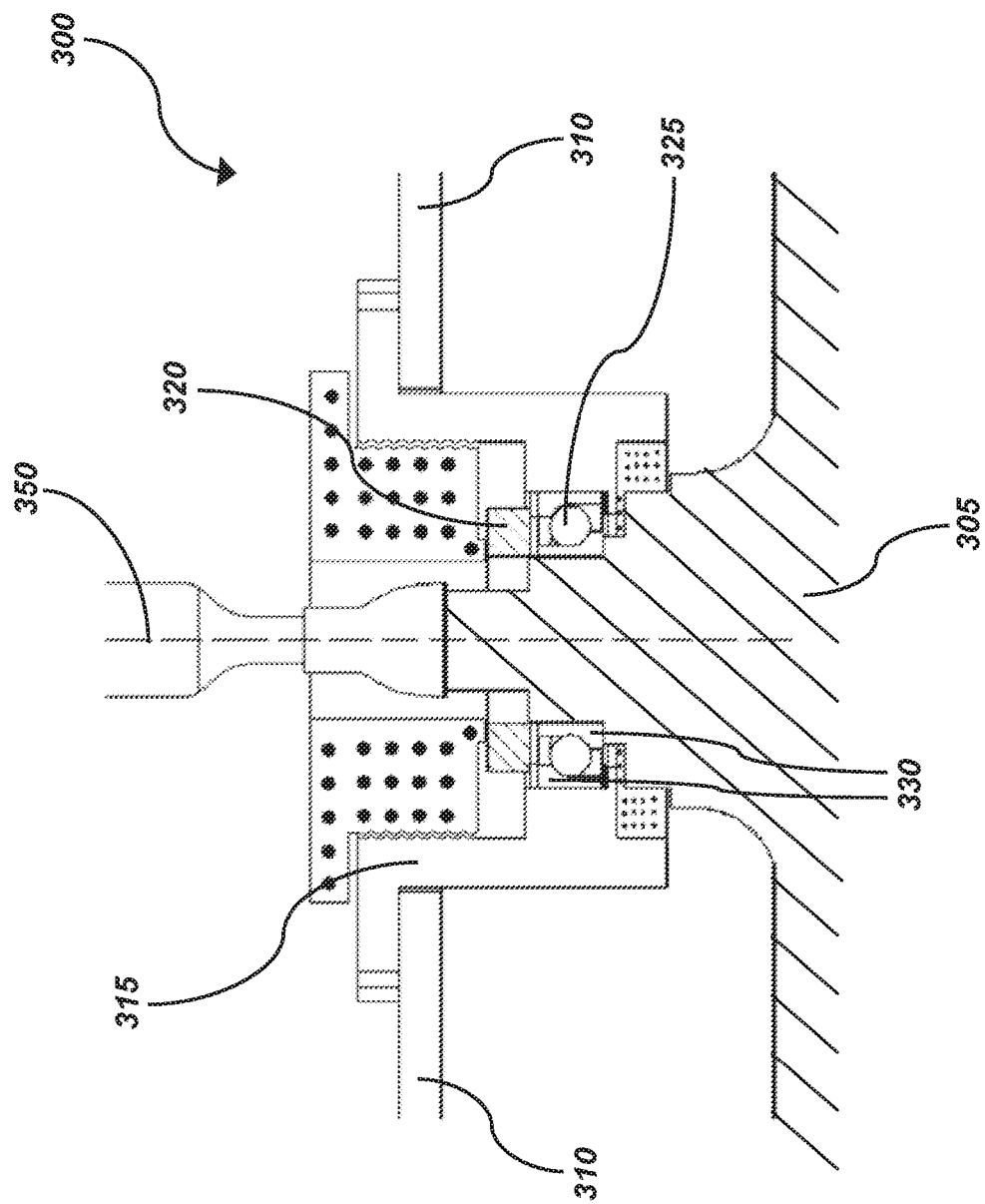
FIG. 3 illustrates a cross-sectional view of the mating between a rotor and a housing in accordance with an illustrative embodiment.

FIG. 3 illustrates a cross-sectional view of the mating between a rotor 305 and a housing 310 in accordance with an illustrative embodiment. In other embodiments, additional, fewer, and/or different elements can be used. A system 300 can include the rotor 305, the housing 310, an adapter 315, a load sensor 320, ball bearings 325, a raceway 330, and an axis 350. Although FIG. 3 illustrates the top portions of the rotor 305 and the housing 310, a similar or the same configuration that is inverted from the view of FIG. 3 can be used at the bottom end of a flywheel energy storage system.

As shown in FIG. 3, the adapter 315 can be located between the housing 310 and the rotor 305. In some embodiments, the adapter 315 is not used or can be incorporated and/or integrated into the housing 310. Between the adapter 315 and the rotor 305 can be ball bearings 325 and raceway 330. The ball bearings 325 and the raceway 330 can collectively be termed "bearings." The system 300 can further include an electromagnet (not shown in FIG. 3) that is configured to use magnetic force to lift the rotor 305. When the rotor 305 is lifted, the rotor 305 can apply an upward vertical force against the load sensor 320, which can include a load cell. The load sensor 320 can be configured to measure a force applied against the housing 310 by the rotor 305. The force can be applied through ball bearings 325 and raceway 330.

The load sensor 320 can send an indication of the force sensed to a controller (not shown in FIG. 3). The controller can also be configured to receive signals from other sensors, such as a height sensor configured to determine the position of rotor 305 in relation to the housing 310. The controller can also be configured to control the amount of electromagnetic force of the electromagnet, thereby controlling the amount of lift applied to the rotor 305 and, thus, the amount of force sensed by the load sensor 320. As noted above, a similar or the same configuration of components can be mirrored on the bottom end of the rotor 305 and the housing 310. That is, the controller can also receive signals from a load sensor 320 indicating the force (e.g., weight) applied to the bottom portion of the housing 310 by the rotor 305 through bottom ball bearings 325 and raceway 330.

Although not shown in FIG. 3, the system 300 can include a piston configured to raise or lower adapter 315 (or a similar element) in relation to housing 310. That is, adapter 315 can slide along axis 350 (which can be a center axis of rotor 305, housing 310, adapter 315, raceway 330, etc.), by being actuated by a piston. In some embodiments, the piston can be hydraulically actuated. In other embodiments, the adapter 315 can be mechanically actuated, for example, via a motor and gear system. In some embodiments, the piston and the adapter 315 can be in the bottom portion of the system 300. The controller can be configured to adjust the piston.

Thus, the controller can be configured to adjust the piston and the electromagnet to control the amount of force applied to the upper load sensor 320 and the lower load sensor 320 by the rotor 305. The controller can be configured to adjust the rotor 305 location such that a predetermined force is applied to the upper load sensor 320. In some embodiments, the predetermined force can be based on a desired life span of the ball bearings 325 and the raceway 330. For example, the more load that is applied to the ball bearings 325 and the raceway 330, the shorter the lifespan of the ball bearings 325 and the raceway 330. In some embodiments, the predetermined threshold can be 0.1% of the mass of the rotor 305. The load applied to the ball bearings 325 and the raceway 330 can be determined by subtracting the weight of the rotor 305 from the combined lifting force applied by the piston and the electromagnet.

The controller can be configured to apply a preload to one of or both of the upper and lower ball bearings 325. The preload force applied to the lower ball bearings 325 can be applied by the piston. The preload force applied to the upper ball bearings 325 can be applied by lifting the rotor 305 with the electromagnet.

In some embodiments, the controller can use two independent control loops to control the force applied to the upper and lower ball bearings 325. An upper control loop can control the force applied to the upper ball bearings 325 and a lower control loop can control the force applied to the lower ball bearings 325.

During operation, an electromagnet can lift the weight of the rotor 305 and force the rotor 305 to apply pressure up against the upper ball bearings 325 (FIG. 3 only shows upper ball bearings 325 and does not show lower ball bearings 325, although a similar but inverted configuration can be used). Thus, the force provided by the piston against the rotor 305 is equal to the force measured at the lower load sensor 320 (and the load applied to lower ball bearings 325). Thus, to adjust the load measured by the lower load sensor 320, the position of the piston or the force applied to the rotor 305 via the piston can be adjusted. In some embodiments, a fixed force corresponding to the recommended bearing preload force (e.g., two hundred pounds) is applied to the lower ball bearings 325 by the piston. The recommended bearing preload force can be determined to be a force sufficient to prevent balls in the bearings from skidding, thereby generating heat and causing excessive wear. As long as the rotor 305 remains lifted against the upper bearings 325 by the preload force provided by the electromagnet, changes to electromagnetic current will not have an effect on the bottom load.

The upper control loop can be used to control the force applied to the upper ball bearings 325 as measured by the upper load sensor 320. When the rotor 305 is lifted by the electromagnet and the piston, the force applied to the upper ball bearings 325 is a function of the force applied to the rotor 305 by both the piston and the electromagnet. The upper control loop can adjust the current supplied to the electromagnet so that the load applied to the upper ball bearings 325 is a predetermined upper load target. The predetermined upper load target can be the load difference between the load at the upper load cell and the load at the lower load cell. The predetermined upper load target can be maintained by a controller using a control loop.

By using an upper control loop that adjusts current to the electromagnet to maintain a relative differential load applied to the upper ball bearings 325, the upper control loop can be independent from the lower control loop. For example, the load applied to the upper bearings 325 can be determined by subtracting the weight of the rotor 305 from the lifting force applied by the electromagnet and the force applied by the piston. For example, the predetermined upper load target can be two hundred pounds greater than the load applied to the lower ball bearings 325. The load applied to the lower ball bearings 325 can also be two hundred pounds. Thus, the predetermined upper load target can be four hundred pounds. Accordingly, the force applied by the electromagnet can be two hundred pounds greater than the weight of the rotor 305.

Similarly, a lower control loop can be configured to control the piston pressure to maintain a lower load target (e.g., 200 lbs) on the lower load sensor 320. Because the entire weight of the rotor 305 can be lifted by the electromagnet, the force sensed by the lower load sensor 320 can be determined by the force of the piston. Therefore, the electromagnetic force can be controlled independently from the piston force. Independent upper and lower controls can be more stable because adjustments made to the lower load will not affect the upper load. That is, each control loop can control the weight applied to the respective load sensor 320 regardless of each other.

For example, if the upper load sensor 320 measures a load of 200 lbs, which can be the set point for the upper control loop, the upper control loop can maintain the amount of electrical current passing through the electromagnet, thereby maintaining the measured load of 200 lbs. If the lower load sensor 320 measures a load of 190 lbs with a set point of 200 lbs, the lower control loop can be configured to increase the pressure of the piston, thereby increasing the lifting force of the piston on the rotor 305. The increase in pressure of the piston can correspond to a 10-lb increase in force measured by the lower load sensor 320. Accordingly, the increase in pressure at the lower load sensor 320 can also correspond with an increase in force at the upper load sensor 320. The upper control loop can monitor the upper load sensor 320, recognize an increase in force that is above the set point (caused by the increase in force at the lower load sensor 320), and reduce the amount of current passing through the electromagnet, thereby relieving a load of the upper load sensor 320. Thus, while changes in the output of the upper or lower control loop can affect the amount of force on the lower or upper load sensors 320, respectively, the control loops can still operate independently. That is, the upper control loop can monitor the upper load sensor 320 and output a change in current for the electromagnet, and the lower control loop can monitor the lower load sensor 320 and output a change in piston pressure.

Furthermore, using independent upper and lower control loops can help guarantee that a minimum preload is achieved at the upper ball bearings 325. Using independent upper and lower control loops can help to guarantee that the rotor 305 does not drop if the piston fails. That is, the upper control loop can be configured to ensure that the electromagnet lifts, for example, two hundred pounds more than the weight of the rotor 305. Accordingly, if the piston fails and does not apply any force (or less force than desired), the rotor 305 can maintain its position because the electromagnet can completely support the weight of the rotor 305 and apply a force of two hundred pounds to the upper ball bearings 325, as determined by the upper control loop.

As discussed above, the lower control loop can control the force applied to the lower ball bearings 325. A flywheel, such as rotor 105 (FIG. 1), can have precise load adjustment on the bearings to ensure safe and stable operation. As the rotor 105 increases in rotational speed, the strain on the rotor 105 also increases. The strain on the rotor 105 can "thin" the rotor 105, thereby making the height of the rotor 105 shorter. Thus, strain can cause a change in bearing preload if the bearings are in a fixed location because the rotor 105 effectively shrinks between the upper and lower bearings 115, 120. A hydraulic adjustment system (such as the piston described below) can be used to adjust the loading condition on the bearings 115, 120 to ensure a safe operating loading condition.

Figure 4A:
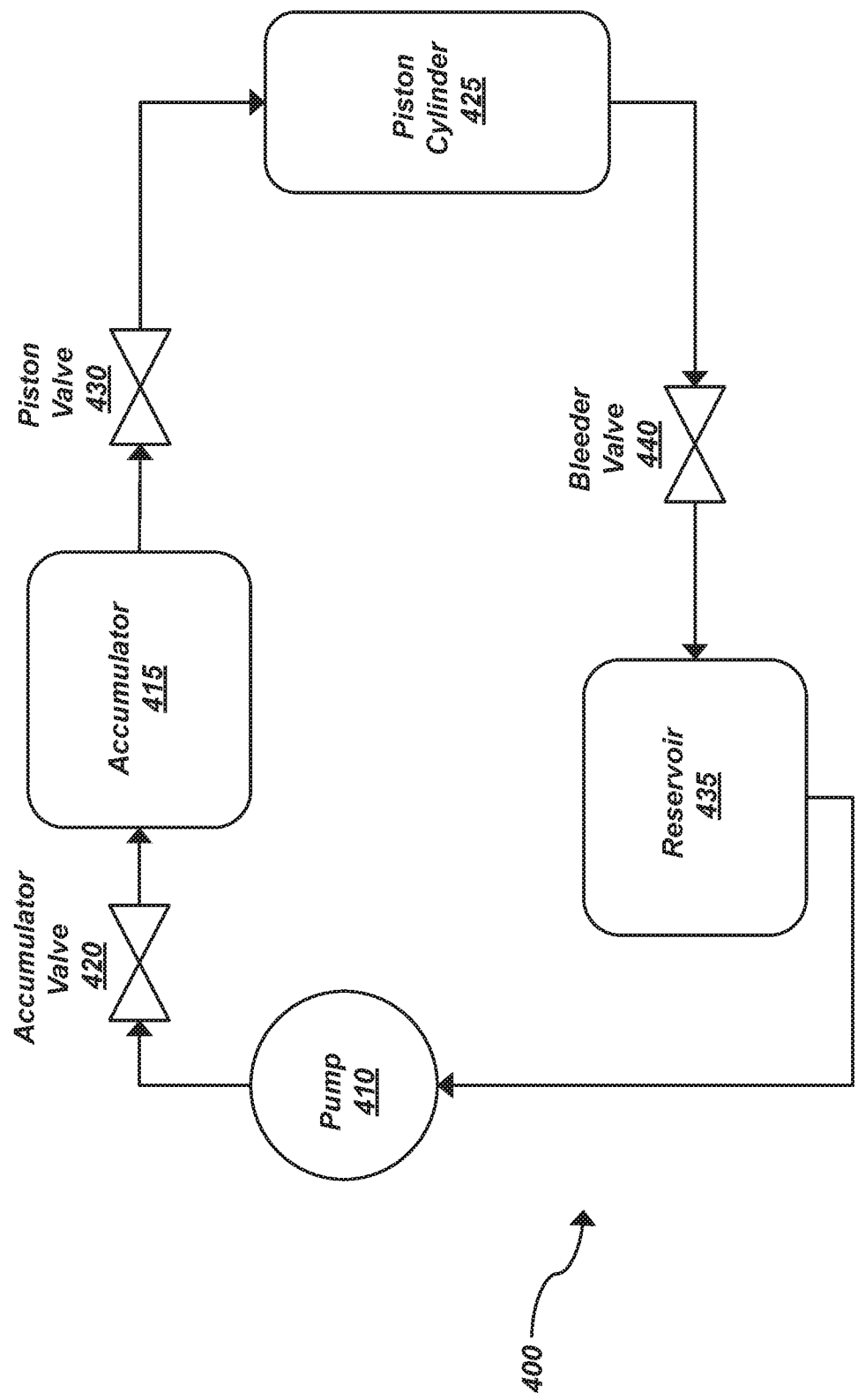
FIG. 4a shows a diagram of a hydraulic piston system in accordance with an illustrative embodiment.

FIG. 4a shows a diagram of a hydraulic piston system in accordance with an illustrative embodiment. In alternative embodiments, additional, fewer, and/or different elements can be used. FIG. 4b is a table of the states of a hydraulic piston system 400 in accordance with an illustrative embodiment. Hydraulic piston system 400 can include a pump 410, an accumulator 415, an accumulator valve 420, a piston cylinder 425, a piston valve 430, a reservoir 435, and a bleeder valve 440. The various elements of system 400 can be functionally connected via piping or tubing as shown in FIG. 4a. In alternative embodiments, additional, fewer, and/or different connections can be used.

Reservoir 435 and accumulator 415 can be tanks or other fillable volumes configured to store hydraulic fluid. In some embodiments, a pneumatic fluid can be used. In some embodiments, accumulator 415 can have only one port through which fluid enters and exits. The pump 410, the accumulator valve 420, the piston valve 430, and the bleeder valve 440 can be controlled via a controller. When the pump 410 is on and accumulator valve 420 is open, the pump 410 can transfer fluid from the reservoir 435 to the accumulator 415. The accumulator 415 can be configured to maintain hydraulic fluid under pressure. Piston cylinder 425 can be configured to exert pressure on a piston when filled with hydraulic fluid. That is, if hydraulic fluid is forced into piston cylinder 425 and bleeder valve 440 is closed, the hydraulic fluid can force a piston to move, thereby expanding the volume of the piston cylinder 425. When the volume of piston cylinder 425 is expanded, the piston can be configured to exert a force on a rotor, such as, rotor 305.

In some embodiments, the hydraulic piston system 400 can operate in four states, as shown in FIG. 4b. In state S0, the pump 410 can be off, the bleeder valve 440 can be closed, the accumulator valve 420 can be closed, and the piston valve 430 can be closed. In state S0, the system maintains its condition. In some embodiments, the system 400 can default to state S0. State S0 can be a fail-safe state.

In state S1, the pump 410 can be on, the bleeder valve 440 can be closed, the accumulator valve 420 can be open, and the piston valve 430 can be closed. In state S1, the pump 410 can transfer fluid from the accumulator 435, through the accumulator valve 420, and into the accumulator 415. The pressure in accumulator 415 can increase to be the pressure output by the pump 410.

In state S2, the pump 410 can be off, the bleeder valve 440 can be closed, the accumulator valve 420 can be closed, and the piston valve 430 can be opened. In state S2, the hydraulic pressure can be transferred from the accumulator 415 into the piston cylinder 425 via the piston valve 430. Accordingly, the volume of the piston cylinder 425 can be increased, thereby extending the piston (and, for example, raising the rotor 305 or increasing the amount of force applied to lower ball bearings 325).

In state S3, the pump 410 can be off, the bleeder valve 440 can be open, the accumulator valve 420 can be closed, and the piston valve 430 can be closed. In state S3, the hydraulic pressure built up in piston cylinder 425 can be relieved and hydraulic fluid can be transferred from a volume of the piston cylinder 425 into the reservoir 435 through bleeder valve 440. Accordingly, the volume of the piston cylinder 425 can be reduced, thereby retracting the piston (and, for example, lowering the rotor 305 or reducing the amount of force applied to lower ball bearings 325).

In some embodiments, the hydraulic piston system 400 can include a pressure sensor in accumulator 415 and/or piston cylinder 425. A controller can enter hydraulic piston system 400 into state S1 when a pressure of accumulator 415 drops below a minimum threshold. The controller can transition back to state S0 (or any other state) when the pressure of accumulator 415 reaches a maximum threshold. Accordingly, the controller can maintain the pressure of accumulator 415 between the minimum threshold and the maximum threshold. For example, maximum threshold can be 200 pounds per square inch (psi) and the minimum threshold can be 100 psi.

The controller can control the height of the piston (e.g., the amount the piston extends) by controlling the pressure and/or volume of piston cylinder 425. The controller can increase the pressure and/or volume of piston cylinder 425 by transitioning to state S2 for a time when pressure in accumulator 415 exceeds pressure in piston cylinder 425. The amount of time and the pressure differential between accumulator 415 and piston cylinder 425 can determine how much the piston is extended or how much force the piston exerts on the lower bearings 325. The controller can monitor the force exerted on the lower bearings 325 by the piston and increase or decrease the force to obtain an acceptable force exerted on the lower bearings 325. For example, the controller can increase or decrease the pressure in the piston to maintain a force measured by lower load sensor 320 between a first lower load cell threshold and a second lower load cell threshold.

The controller can decrease the pressure and/or volume of piston cylinder 425 by transitioning to state S3 for a time. The amount of time and the pressure differential between piston cylinder 425 and reservoir 435 (which can be at atmospheric pressure) can determine how much the piston is withdrawn or how much force the piston exerts on the lower bearings 325.

In some embodiments, a filter can be placed in the line between the pump 410 and the accumulator 415. In some embodiments, the filter can be located between the accumulator valve 420 and the pump 410. In some embodiments, the accumulator valve 420, the piston valve 430, and/or the bleeder valve 440 can be solenoid valves. In other embodiments, the accumulator valve 420, the piston valve 430, and/or the bleeder valve 440 can be actuated using any suitable means. In some embodiments, the reservoir 435 is not used.

In addition to the valves shown in FIG. 4a, the hydraulic piston system 400 can include one or more throttling valves, such as needle valves. For example, a throttling valve can be located in the line between the accumulator 415 and the piston valve 430. In some embodiments, the throttling valves can be hand valves and not be actuated or controlled by a controller. In other embodiments, the throttling valves can be controlled by a controller via an actuator.

In some embodiments, a low pressure hydraulic system can provide a failsafe measure for the hydraulic piston system 400. A flow restrictor or a pressure regulator can be used to ensure that minimal pressure in the line is held even if one or more of the valves (or the controller) malfunction.

Figure 4C:
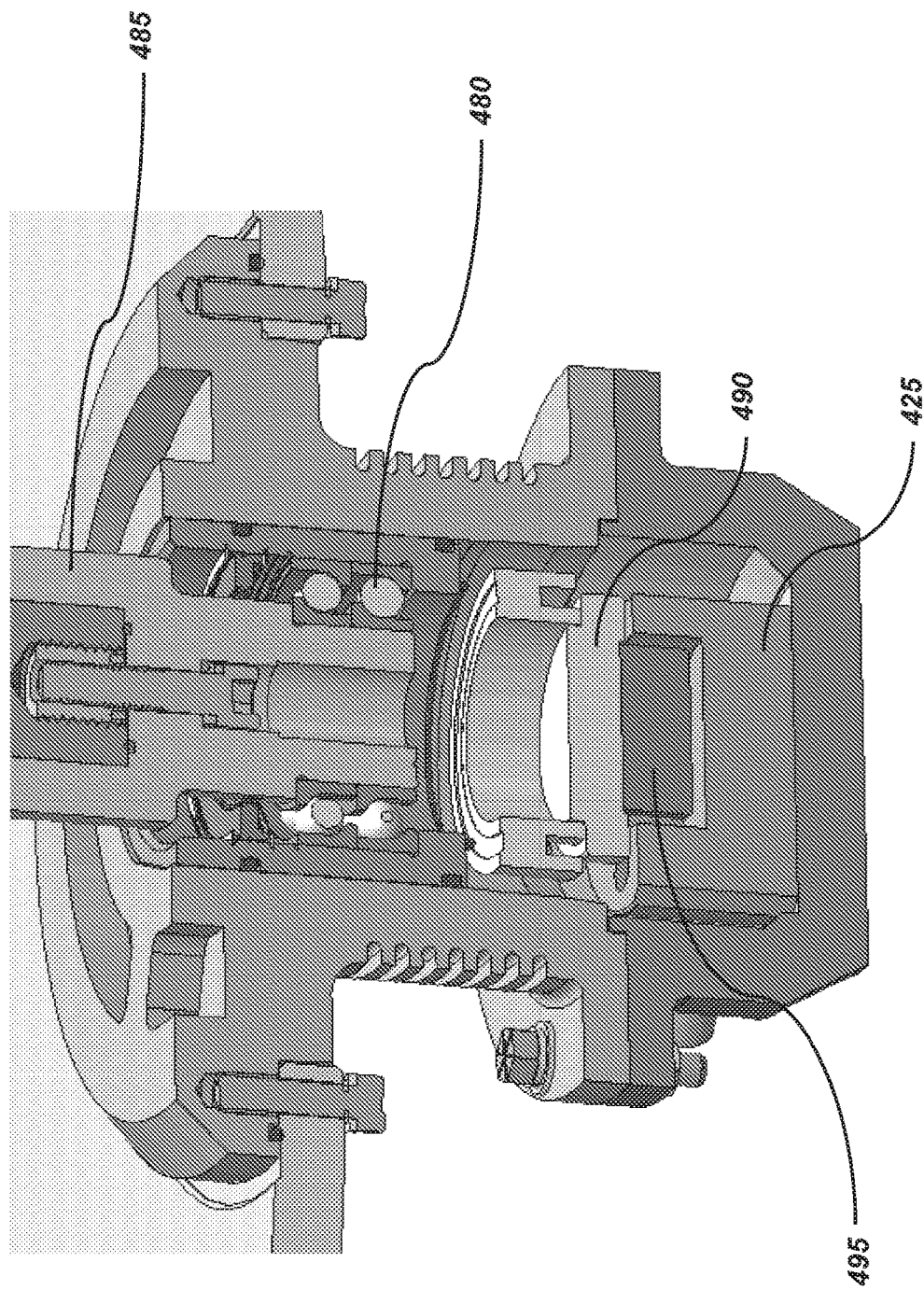
FIG. 4c illustrates a hydraulic piston in accordance with an illustrative embodiment.

FIG. 4c illustrates a hydraulic piston 490 in accordance with an illustrative embodiment. In alternative embodiments, additional, fewer, and/or different elements can be used. As shown in FIG. 4c, bearings 480 can be in contact with a shaft 485 such that when a force is applied to the bottom of the bearings 480, the shaft 485 is supported by the bearings 480. The piston 490 can be moved upwards when hydraulic fluid 495 is forced into piston cylinder 425. When enough hydraulic fluid 495 is forced into piston cylinder 425, the piston 490 will press against the bearings 480 and, therefore, press against the shaft 485. Accordingly, if hydraulic fluid 495 is released from piston cylinder 425, the piston 490 will move downward and reduce the amount of force applied to the bearings 480 and, therefore, the shaft 485.

In an alternative embodiment, the hydraulic piston system 400 can be replaced by a gear drive system. The gear drive system can use a stepper motor to make precise adjustments that, together with a geared transmission, raise and lower the rotor (e.g., rotor 305). The controller can adjust the force applied to the lower ball bearings 325 by rotating a motor of the gear drive system. The magnitude of the adjustment can be proportional to the number of steps (or fractional rotations) the stepper motor makes. The geared transmission can translate rotational motion by the stepper motor into linear motion. That is, if the stepper motor rotates a first direction, the geared transmission can increase the force applied to the rotor 305 or raise the rotor 305. If the stepper motor rotates a second direction opposite the first direction, the geared transmission can decrease the force applied to the rotor 305 or lower the rotor 305.

Figure 4D:
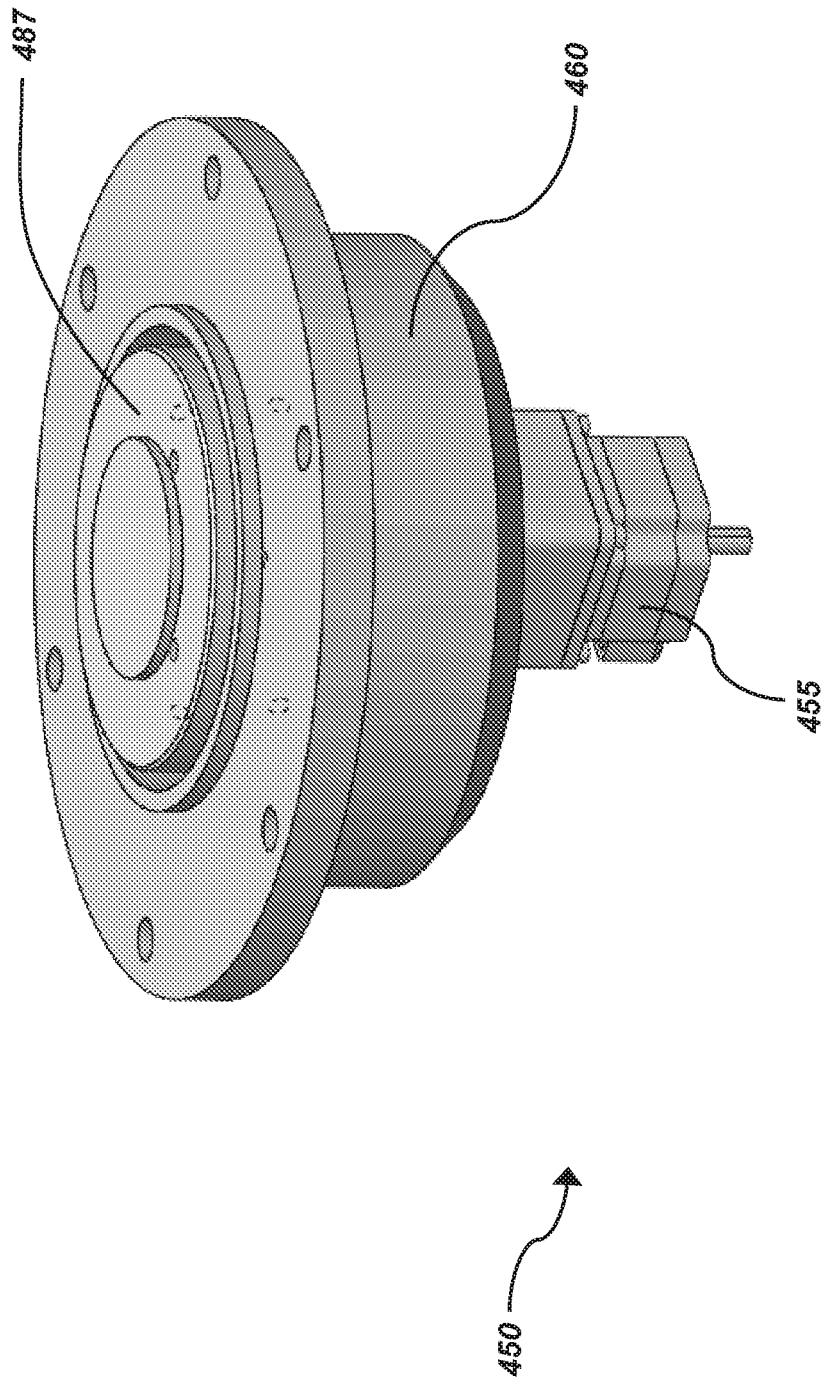
FIGS. 4d-4f illustrate a motorized adjustable load system in accordance with an illustrative embodiment.
Figure 4E:
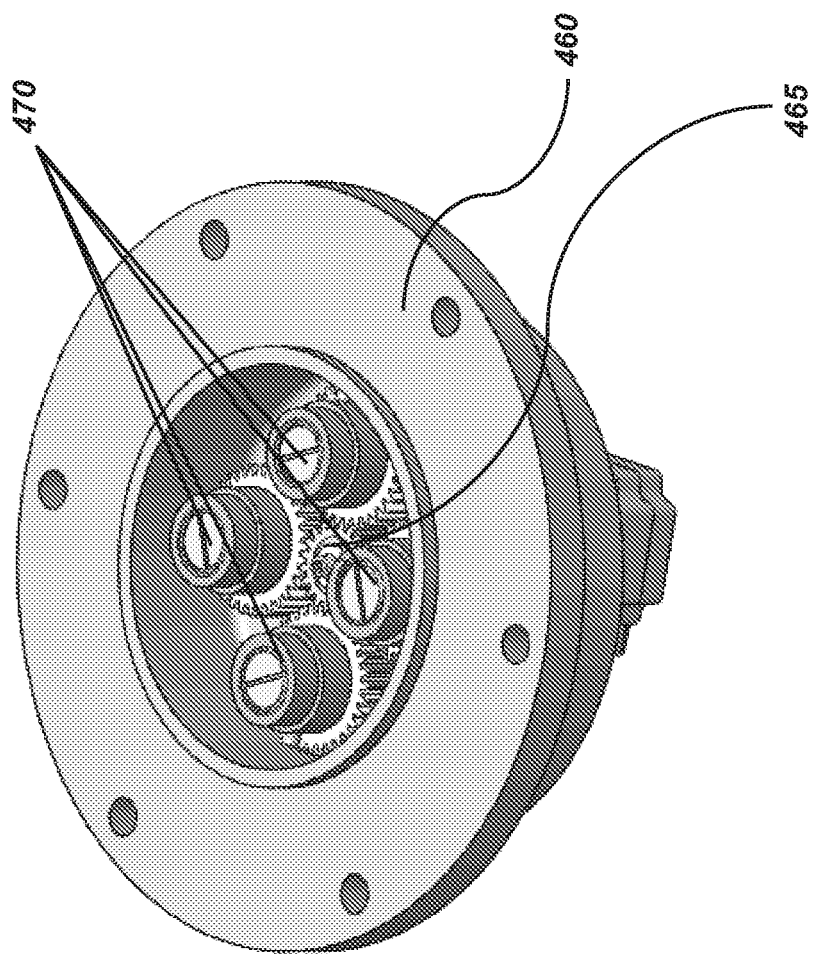
Figure 4F:
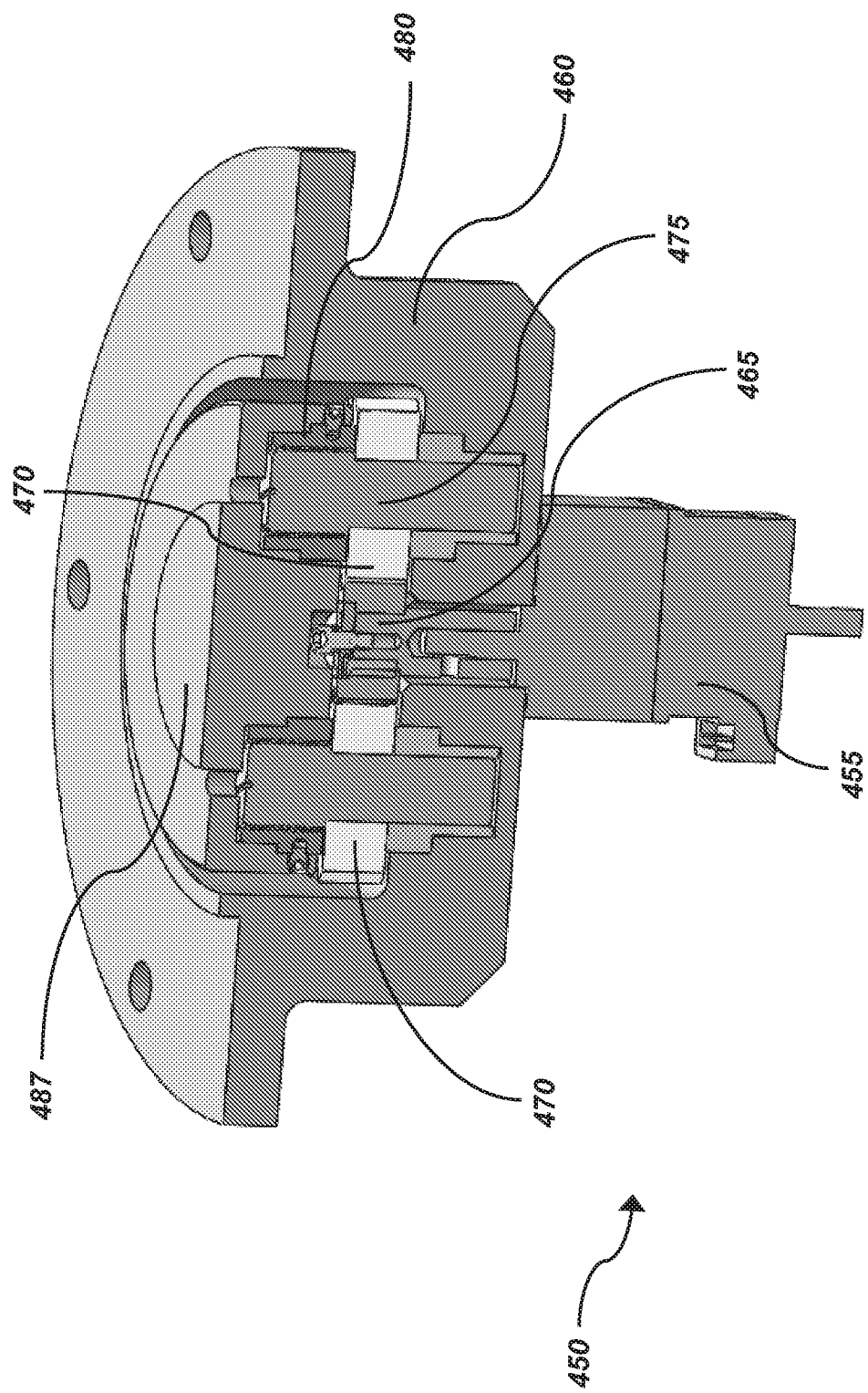

FIGS. 4d-4f illustrate a motorized adjustable load system 450 in accordance with an illustrative embodiment. Alternative embodiments can include additional, fewer, and/or different elements. The adjustable load system 450 can include a stepper motor 455, a gearbox 460, a center pinion 465, planetary gears 470, threaded rods 475, female threads, and top plate 487.

The stepper motor 455 with the gearbox 460 can turn the center pinion 465. The center pinion 465 can, in turn, turn three or four (or more) planetary gears 470. The planetary gears 470 can be rigidly attached to the threaded rod 475. Each of the treaded rods 475 can be threaded into the female threads of a bushing mounted in the movable top plate 487. When the stepper motor 455 rotates its shaft, the planetary gears 470 rotate, thereby rotating threaded rods 475. By rotating threaded rods 475 within the female threads, the top plate 487 can be then lifted or lowered, depending upon the direction of rotation of the stepper motor 455. The movable top plate 487 can be configured to contact bearings (e.g., raceway 330) that, in turn, contact a rotor (e.g., rotor 305). Accordingly, moving the top plate 487 can adjust the amount of load on the bearings. A controller can control the stepper motor 455 based on a load sensor, such as load sensor 320.

Figure 4H:
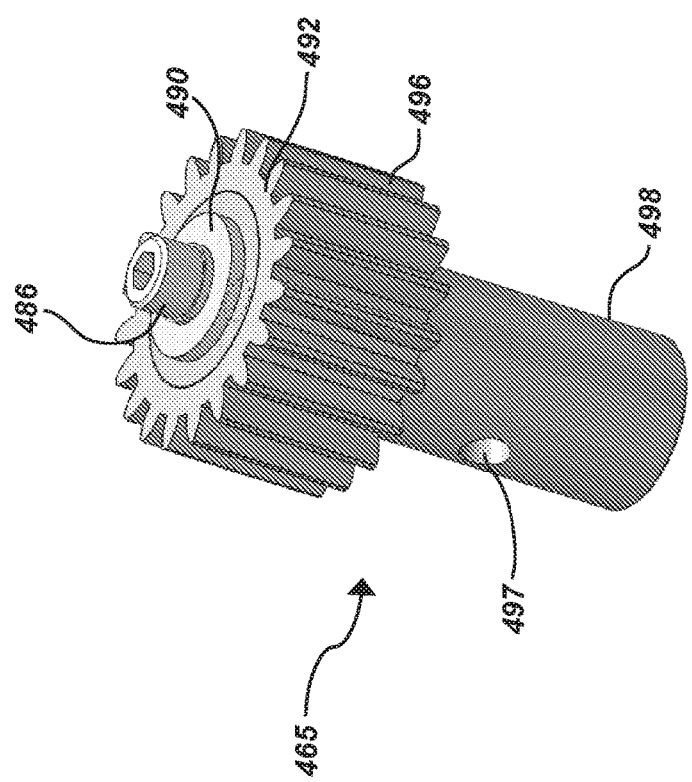
FIGS. 4g and 4h illustrate a center pinion in accordance with an illustrative embodiment.
Figure 4G:
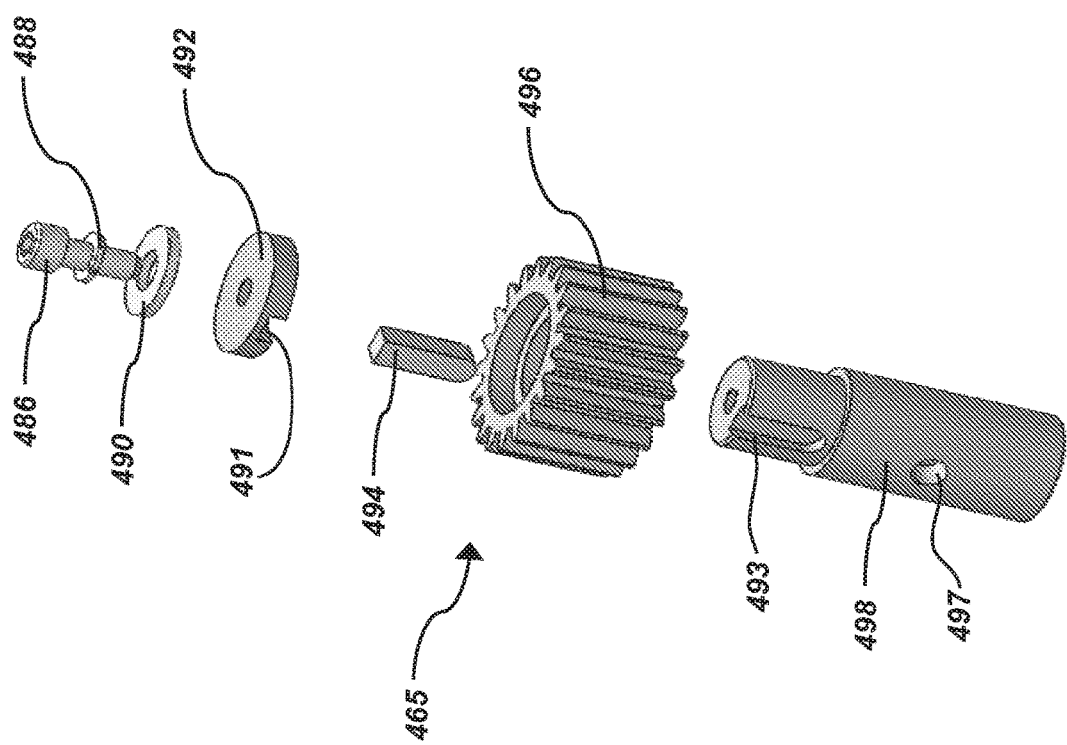

FIGS. 4g and 4h illustrate the center pinion 465 in accordance with an illustrative embodiment. In alternative embodiments, additional, fewer, and/or different elements can be used. FIG. 4g shows an exploded version of the center pinion 465 and FIG. 4h shows the center pinion 465 assembled. Center pinion 465 can have a fastener 486, a lock washer 488, a washer 489, a plate 492, a key 494, a gear 496, and a shaft 498.

Shaft 498 can have a hole 497 configured to receive a rod. The rod can slide through the hole 497 of the shaft 498 and through a hole in a shaft of the stepper motor 455. The rod can be used to rotatably lock the shaft of the stepper motor 455 and the shaft 498. In alternative embodiments, any suitable method can be used to rotatably lock the shaft of the stepper motor 455 and the shaft 498 such that the stepper motor 455 and the shaft 498 rotate together. For example, in some embodiments, stepper motor 455 may not have a hole to receive the rod. In some embodiments, a set screw can be used to rotatably lock the shaft of the stepper motor 455 and the shaft 498.

As shown in FIG. 4g, shaft 498 can have a slot 493 that is configured to receive the key 494. For example, the slot 493 in shaft 498 can have a rounded end configured to receive a rounded end of the key 494. In alternative embodiments, any suitable shape or configuration of the key 494 can be used, including squared corners, a pointed end, etc. Although not shown in FIG. 4g, an inside surface of the gear 496 can have a slot configured to receive the key 494. For example, the slot in the gear 496 can be the same configuration as the slot 493 in the shaft 498.

Similarly, the plate 492 can have a slot 491 that is configured to receive an end of the key 494. In the embodiment shown in FIG. 4g, the slot 491 in the plate 492 can have squared corners. However, any suitable slot shape can be used. Further, any suitable key shape can be used to match the slots of the gear 496, the shaft 498, and/or the plate 492. In some embodiments, the plate 492 does not have a slot configured to receive the key 494. In such embodiments, the key 494 can be short enough to fit within the slots of the gear 496 and the shaft 498. The plate 492 can be configured to prevent the key 494 from sliding out of the slots in the shaft 498 and the gear 496. The key 494 can be configured to rotatably fix the gear 496 and the shaft 498 such that the gear 496 and the shaft 498 rotate together. The fastener 486 can be, for example, a shoulder bolt. The fastener 486 can be configured to be screwed into a threaded hole of the shaft 498.

Assembly of the adjustable load system 450 can occur in any suitable manner. For example, threaded rods 475 with planetary gears 470 can be inserted into their respective holes in the gearbox 460. Shaft 498 can be slid on to the shaft of the stepper motor 455. The shaft 498 and the shaft of the stepper motor 455 can be rotatably locked with, for example, a set screw configured to thread into a hole of the shaft 498 and apply a pressure to the shaft of the stepper motor 455. In some embodiments, the shaft of the stepper motor 455 can have a flat recess configured to provide a place for the set screw to press against the shaft of the stepper motor 455. The shaft 498 can be inserted through the bottom of gearbox 460 and can be secured to the gearbox 460.

Figure 4J:
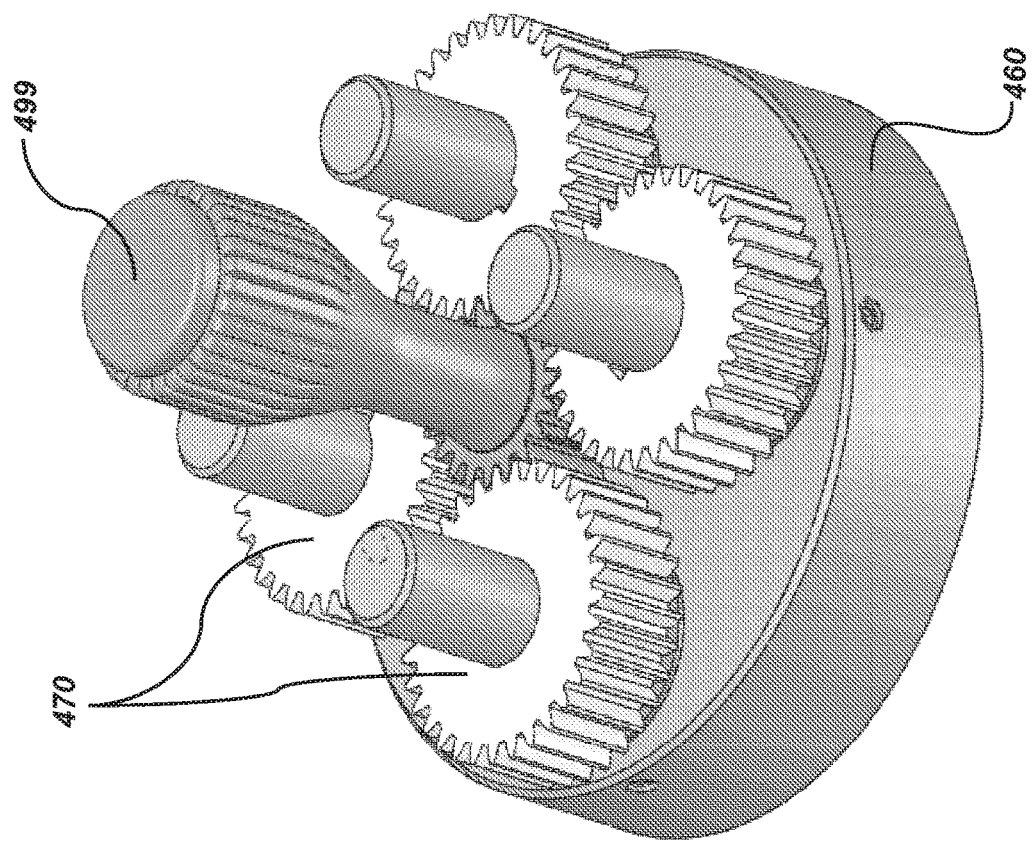
FIGS. 4i and 4j illustrate a spline alignment tool in accordance with an illustrative embodiment.
Figure 4I:
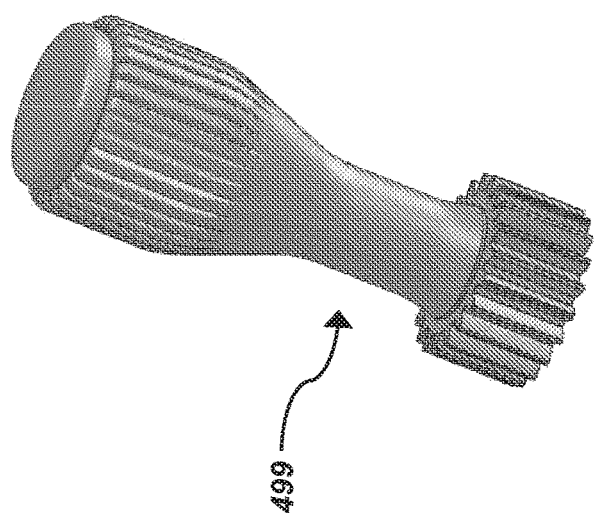

Planetary gears 470 can be aligned. FIGS. 4i and 4j illustrate a spline alignment tool in accordance with an illustrative embodiment. In some embodiments, the planetary gears 470 can be inserted into the gearbox 460 before the gear 496 of the center pinion 465 is inserted into the gearbox 460. In such embodiments, the splines of the planetary gears 470 can be aligned such that the gear 496 can fit between the planetary gears 470. A spline alignment tool 499 can be used to align the planetary gears 470. FIG. 4i illustrates the spline alignment tool 499. FIG. 4j illustrates the spline alignment tool 499 between the planetary gears 470.

As shown in FIG. 4i, spline alignment tool 499 can have a splined end and a handle. The splined end (e.g., the bottom end as illustrated in FIG. 4i) can have splines (e.g., be a gear) similar to the splines on gear 496. In some embodiments, the splined end of the spline alignment tool 499 can be the gear 496. For example, the spline alignment tool 499 can be removably fixed to the gear 496 via, for example, the slot in the gear 496 configured to receive the key 494. For example, gear 496 can be inserted into the gearbox 460 between planetary gears 470 from the top of the gearbox 460. Spline alignment tool 499 can be used to rotate the gear 496 (and, therefore, planetary gears 470) until the slot in the gear 496 aligns with the slot in the shaft 498 (which can not yet be installed). The handle of the spline alignment tool 499 can be used to rotate the spline alignment tool 499. The handle can be the end opposite of the splined end.

In other embodiments, any suitable means can be used to align planetary gears 470 and set gear 496 into the gearbox 460. The key 494 can be inserted in respective slots of shaft 498 and the gear 496. The plate 492, the washer 489, the lock washer 488, and the fastener 486 can be inserted into the center pinion 465, as shown in FIG. 4g. The top plate 487 can be mounted onto threaded rods 475. The top plate 487 can be seated into the gearbox 460, for example, by rotating the shaft of the stepper motor 455 such that the center pinion 465, the planetary gears 470, and the threaded rod 475 also rotate. The threaded rod 475 can be rotated in a direction such that threaded rods 475 thread into the female threads, thereby allowing the top plate 487 to move closer to the gearbox 460 and sit inside the gearbox 460.

Although not shown in FIG. 1, system 100 can include an electromagnet that is configured to provide a magnetic force to lift the rotor 105. In some embodiments, the electromagnet can be located outside of the housing 110. In other embodiments, the electromagnet can be located inside of the housing 110. For example, the electromagnet can be mounted to an inner top surface of the housing 110. The distance between the electromagnet and the rotor 105 can be controlled. Precise control of the distance can help to ensure reliable operation of the system 100.

Figure 5A:
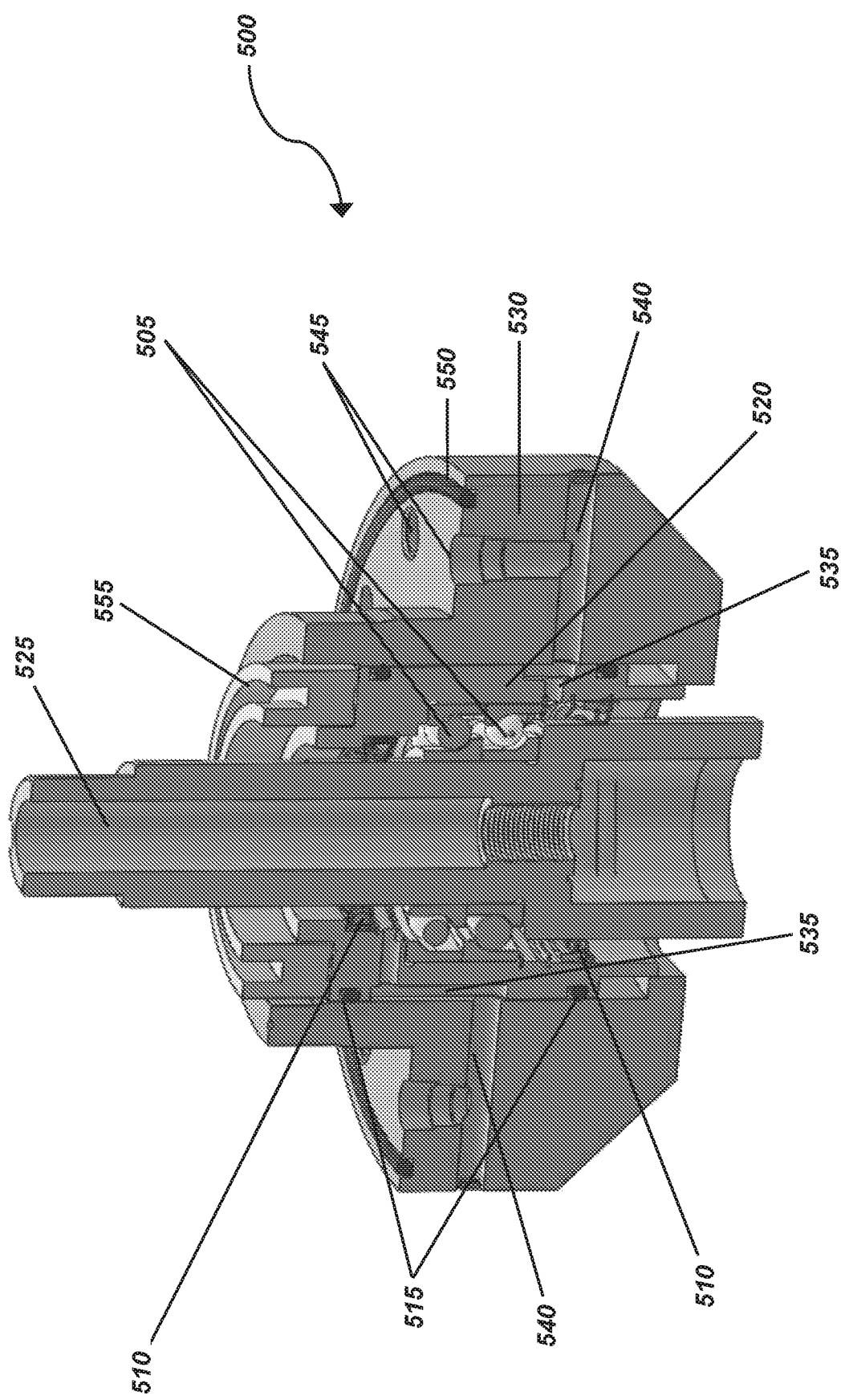
FIGS. 5a and 5b illustrate a cartridge system in accordance with an illustrative embodiment.
Figure 5B:
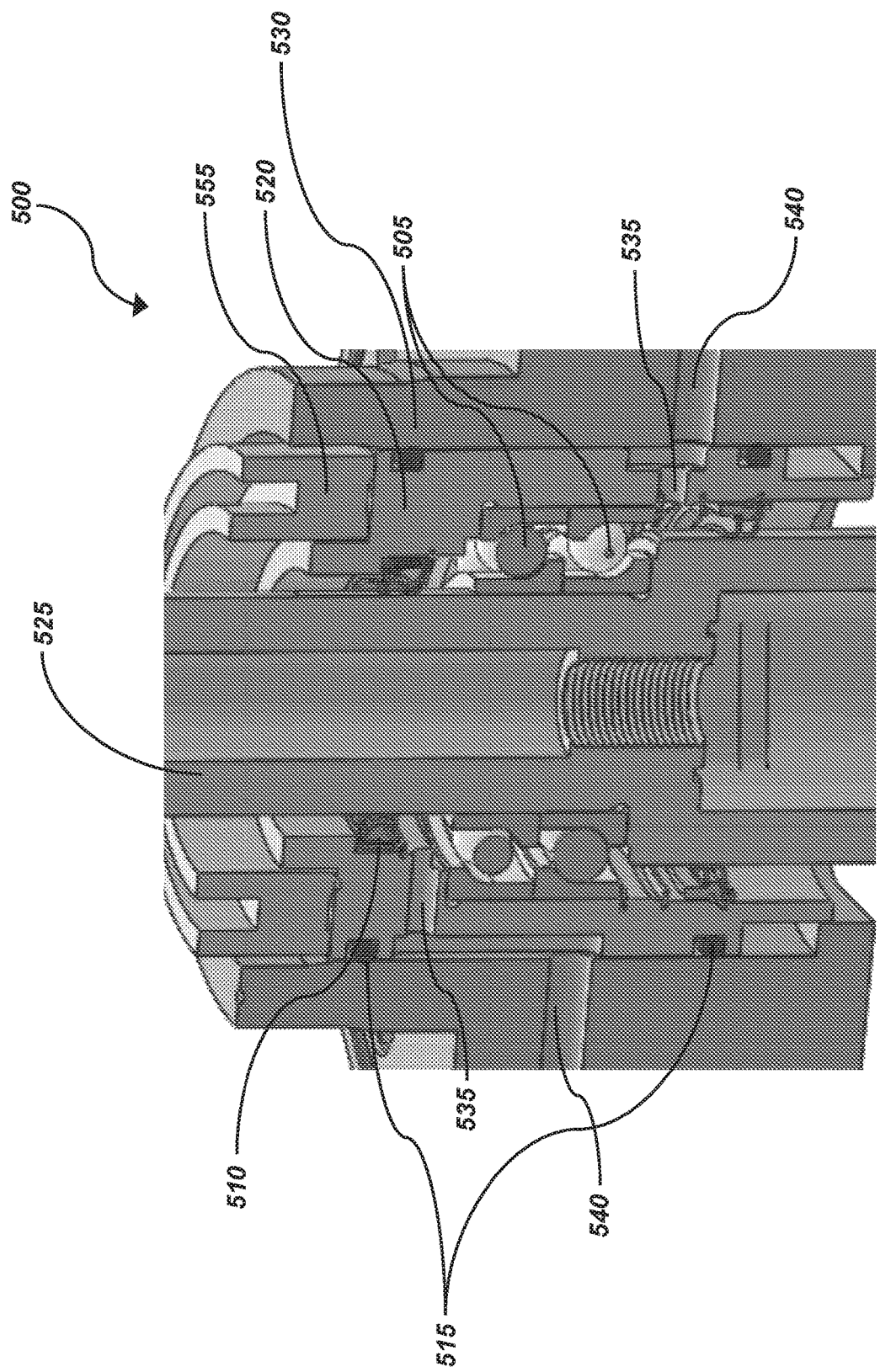

FIGS. 5a and 5b illustrate a cartridge system 500 in accordance with an illustrative embodiment. In alternative embodiments, additional, fewer, and/or different elements can be used. FIG. 5b is a close-up view of the cross-sectional view of the cartridge system 500 illustrated in FIG. 5a. The cartridge system 500 can be used for ease of maintenance, assembly, and manufacture. The cartridge system 500 can be located at the top and/or bottom portion of a flywheel energy storage system, such as system 100.

In some embodiments, a rotor (e.g., rotor 105 or rotor 305) of a flywheel energy storage system can be configured to move vertically along an axis (e.g., axis 102 or axis 350). In some embodiments, the cartridge system 500 can be used around at least one of the upper rotor shaft and the lower rotor shaft. The cartridge system 500 can allow the rotor to move in the vertical direction. Furthermore, the cartridge system 500 can be configured to allow coolant and/or oil to circulate around and through bearings. The inner cartridge is inserted into the outer cartridge and sealed with O-rings or other suitable sealing mechanism. Matching flat portions can be manufactured on the inner and outer cartridge to prevent rotation of the inner and outer cartridge with relation to each other and a housing, but allow vertical movement and rotational movement of a shaft. Slots in the inner and outer cartridges can be aligned to allow flow of oil through the bearings.

The cartridge system 500 can include an inner cartridge 520 and an outer cartridge 530. The inner cartridge 520 can include bearings 505, an oil seal 510, and lip seals 515. As shown in FIG. 5a, the cartridge system 500 can include a plurality of sets of bearings 505. Inside of the inner cartridge 520 can be a shaft or a shaft extension 525. The lower portion of the shaft extension 525 can be configured to be fixed to a rotor (e.g., rotor 105 or rotor 305 not shown in FIG. 5a). The upper portion of the shaft extension 525 can be configured to be mated to a motor/generator (not shown in FIG. 5a). The mating of the shaft extension 525 to the motor/generator can include a clutch system or other detachable mating configurations. In some embodiments, a transmission can be used between shaft extension 525 and the motor/generator.

The outer cartridge 530 can include fastening means 545. Fastening means 545 can include holes or bores configured to accept fasteners. Fasteners can include bolts, screws, studs, etc. Fastening means 545 can be used to secure the outer cartridge 530 (and the inner cartridge 520) to the housing (e.g., the housing 110 of FIG. 1 not shown in FIG. 5a). Outer cartridge 530 can also include sealing means 550.

The outer cartridge 530 can be mounted to the housing from the bottom. That is, the bottom portion of the outer cartridge 530 can be within the housing. The upper portion of the outer cartridge 530 can extend through a hole in the housing and can be outside of the housing. For example, a ring 555 can be outside of the housing. Bolts or other fasteners can be inserted through holes in the housing and can be threaded into fastening means 545. The bolts or other fasteners can be configured to press the outer cartridge 530 against the housing, thereby compressing sealing means 550, to create a vacuum seal. The sealing means 550 can be configured to be pressed onto, for example, a bottom surface of the upper housing (e.g., upper portion 110a of housing 110 in FIG. 1 not shown in FIG. 5a) to create a vacuum tight seal. Sealing means 550 can include an annular deformable ring, such as an O-ring. The sealing means 550 can be pressed against an inner surface of the housing to maintain the vacuum integrity of the housing. Although sealing means 550 is shown in FIG. 5a as an O-ring, any suitable means for creating a vacuum seal can be used.

The cartridge system 500 can be configured to be connected to an oil system that can flow oil through the area between the inner cartridge 520 and the shaft extension 525. For example, the oil can flow around the bearings 505. The inner cartridge 520 and the outer cartridge 530 can have bores 535 and 540, respectively, that can be aligned to allow the flow of oil. For example, oil can flow in through bore 540 on the left hand side of the outer cartridge 530 in FIG. 5a, through the bore 535 on the left hand side of the inner cartridge 520 in FIG. 5a, through the area between the inner cartridge 520 and the shaft extension 525, including filling the area (or a portion of the area) surrounding bearings 505, around shaft extension 525, through bore 535 on the right hand side of inner cartridge 520, and exit through bore 540 of the outer cartridge 530 on the right hand side of FIG. 5a. In alternative embodiments, oil flow can be reversed.

Figure 5D:
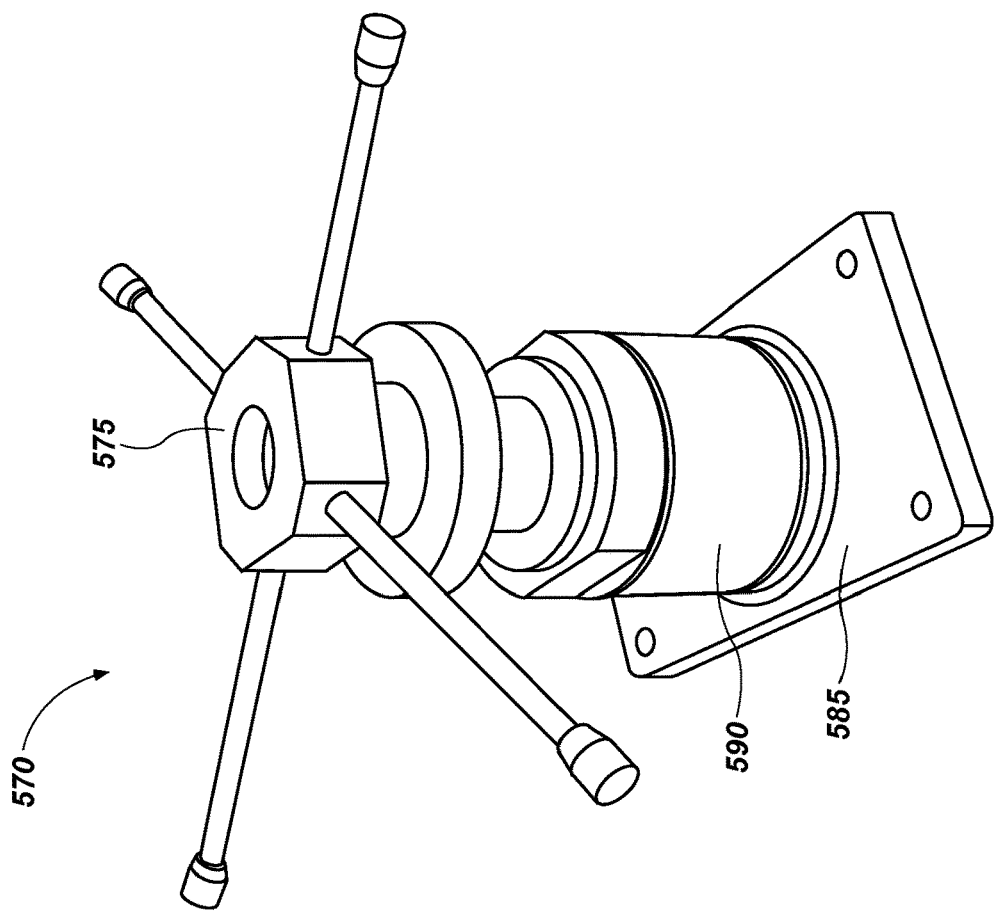
FIGS. 5c and 5d illustrate an assembly fixture for inner cartridges in accordance with an illustrative embodiment.
Figure 5C:
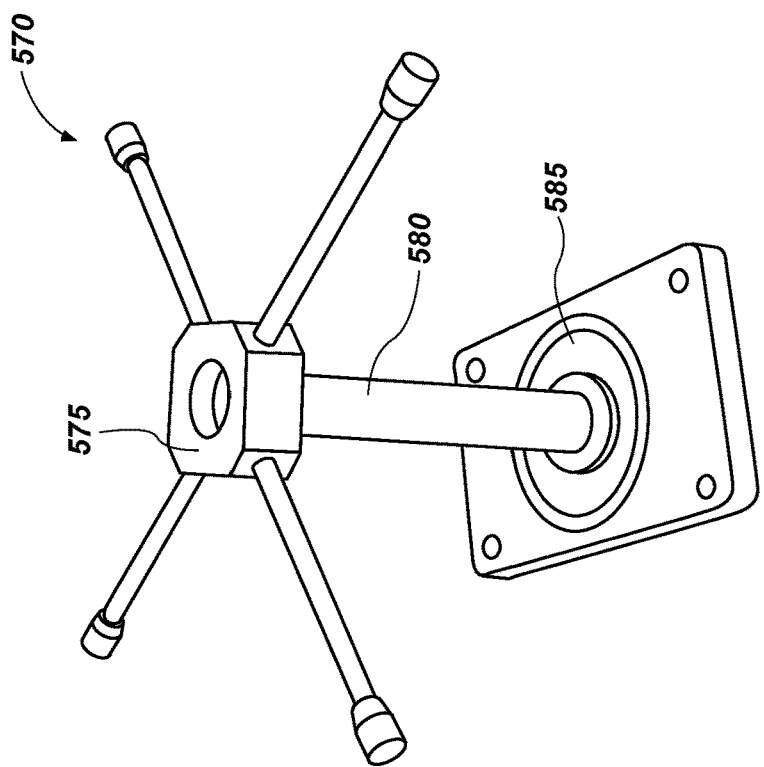

FIGS. 5c and 5d illustrate an assembly fixture for inner cartridges in accordance with an illustrative embodiment. In alternative embodiments, additional, fewer, and/or different elements can be used. An assembly fixture 570 can be configured to press together components of inner cartridge 520. For example, bearings 505 can be pressed into a housing of the inner cartridge 520. Additionally, one or more seals or spacers can be pressed into/onto the inner cartridge 520.

The assembly fixture 570 can include a spinner 575, a threaded rod 580, a base 585, and an assembly sleeve 590. The spinner 575 can have a center bore with threads and can be configured to move up and down the threaded rod 580 by rotating about the threaded rod 580. The threaded rod 580 can be fixed to the base 585. The assembly sleeve 590 can be configured to fit around the threaded rod 580 and sit on the base 585. The base 585 can have one or more grooves configured to center the assembly sleeve 590 about the threaded rod 580.

The assembly sleeve 590 can be configured to receive a cartridge housing, such as the cartridge housing of inner cartridge 520, and center the cartridge housing about the threaded rod 580. One or more components can be placed into the cartridge housing. One or more bushings can be placed on top of the component and the spinner 575 can move down the threaded rod 580 and press down on the bushings and, therefore, the component. Thus, the spinner 575 can press a component into the cartridge housing. Multiple components can be pressed into the cartridge housing, one at a time, or multiple at once.

Referring back to FIG. 5a, the inner cartridge 520 can be configured to move laterally within outer cartridge 530 and with the extension shaft 525 but not rotate within the outer cartridge 530. That is, the rotor of a flywheel energy storage system can move up and down, as discussed herein. For example, an electromagnet can be configured to lift the rotor, a piston can be configured to push the rotor up, stress on the rotor can change the shape (e.g., height) of the rotor, etc. As the rotor moves up and down, the inner cartridge 520 can move up and down with the rotor (e.g., via the extension shaft 525, which can be fixed to the rotor). Although the rotor and the extension shaft 525 can rotate, the inner cartridge 520 may not. That is, the rotor can rotate within the inner cartridge 520 with bearings 505, but the body of the inner cartridge 520 can remain rotationally still.

A rotational alignment of the inner cartridge 520 and the outer cartridge 530 can remain even when the extension shaft 525 is rotating. For example, the bore 535 and bore 540 can remain aligned such that oil can flow through the bore 535 and bore 540. As shown in FIG. 5a, the outer cartridge 530 can have a bore 535 that extends vertically along an outside surface of the housing of the inner cartridge 520. Thus, as the inner cartridge 520 moves up and down with the rotor, the bore 535 and the bore 540 can remain fluidly connected. In the position illustrated in FIG. 5a, the inner cartridge 520 can move down in relation to the outer cartridge 530, and the bore 535 and the bore 540 can remain fluidly connected. Although FIG. 5a illustrates bore 535 extending vertically, bore 540 can extend vertically instead. In some embodiments, both bore 535 and bore 540 can extend vertically.

Figure 7:
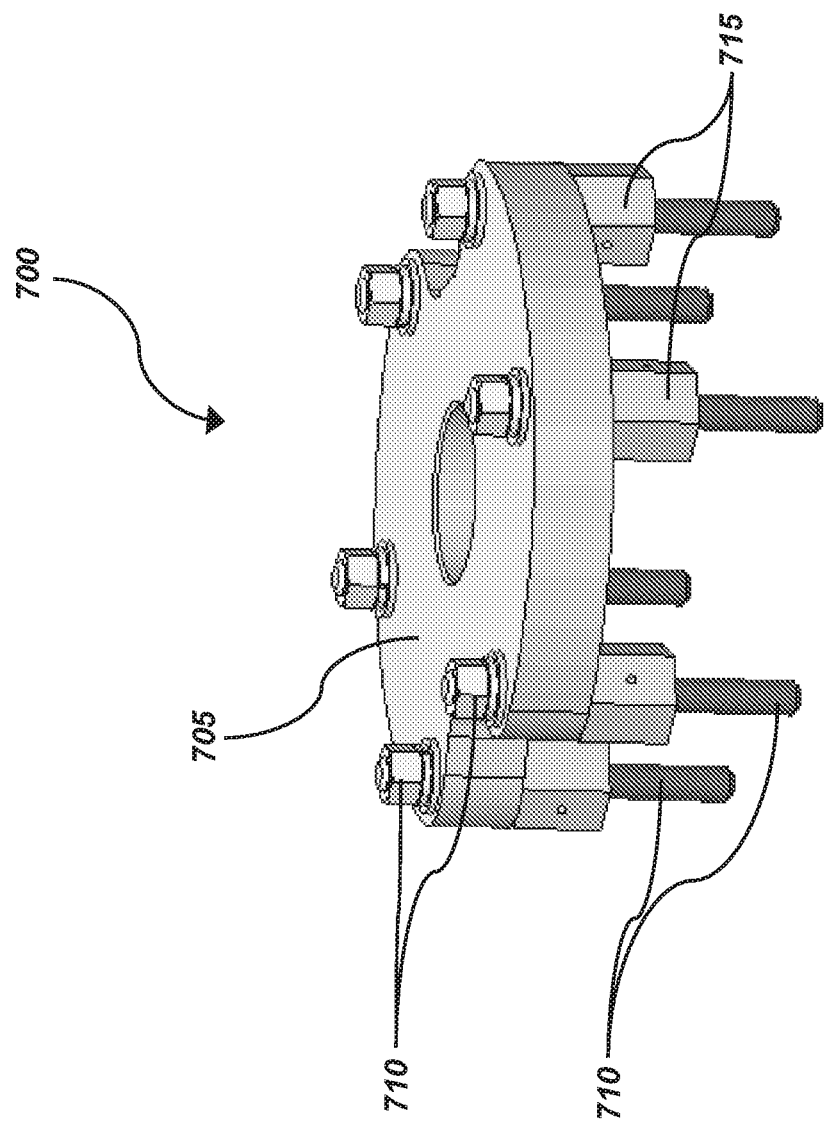
FIG. 7 illustrates an upper cartridge in accordance with an illustrative embodiment.

As discussed above, one or more mechanisms can be used to push the rotor up against bearings 505. FIG. 7 illustrates an upper cartridge in accordance with an illustrative embodiment. An upper cartridge 700 can be configured to prevent the inner cartridge 520 (and, therefore, the rotor) from moving too far up. In some embodiments, the upper cartridge 700 can function as a stop for the inner cartridge 520.

As shown in FIG. 5a, ring 555 can be an annular piece that is configured to rest on top of the inner cartridge 520 and can fit within outer cartridge 530. In some embodiments, ring 555 can be part of inner cartridge 520 and/or not be used at all. An upper cartridge 700, as illustrated in FIG. 7, can be configured to contact ring 555 and prevent the ring 555 from moving any further up. Upper cartridge 700 can be mounted on the outside of the housing of a flywheel energy storage system.

The upper cartridge 700 can include an upper plate 705, fasteners 710, and spacers 715. The spacers 715 can be configured to press against the top surface of the housing and against a bottom surface of upper plate 705. Fasteners 710 can be configured to pass through the upper plate 705, the spacers 715, and holes in the housing. The fasteners 710 can be configured to thread into fastening means 545 of the outer cartridge 530. The upper plate 705 can have a center bore configured to allow a rotor shaft and/or extension shaft 525 to pass through the center bore. The upper plate 705 can be configured to allow ring 555 to seat on the bottom surface of the upper plate 705.

The spacers 715 can be configured to have a length that corresponds with an upper limit on the travel of the rotor. As mentioned above, an electromagnet can be configured to provide a lifting force on the rotor. The electromagnet can be located within the housing. Thus, if the rotor is lifted far enough, the spinning rotor can contact the electromagnet.

The spacers 715 can have a length that prevents the rotor from contacting the electromagnet and can maintain a gap between the electromagnet and the rotor. Put another way, the electromagnet can be fixed to an inner surface of the housing of a flywheel energy storage system. The spacers can locate the upper plate 705 in a location that provides a vertical stop for the ring 555, the inner cartridge 520, the extension shaft 525, and the rotor (which can all move up and down together). The vertical stop can maintain a gap between the electromagnet and the rotor. In alternative embodiments, upper cartridge 700 can be configured to be mounted on the bottom portion of the housing.

Figure 8A:
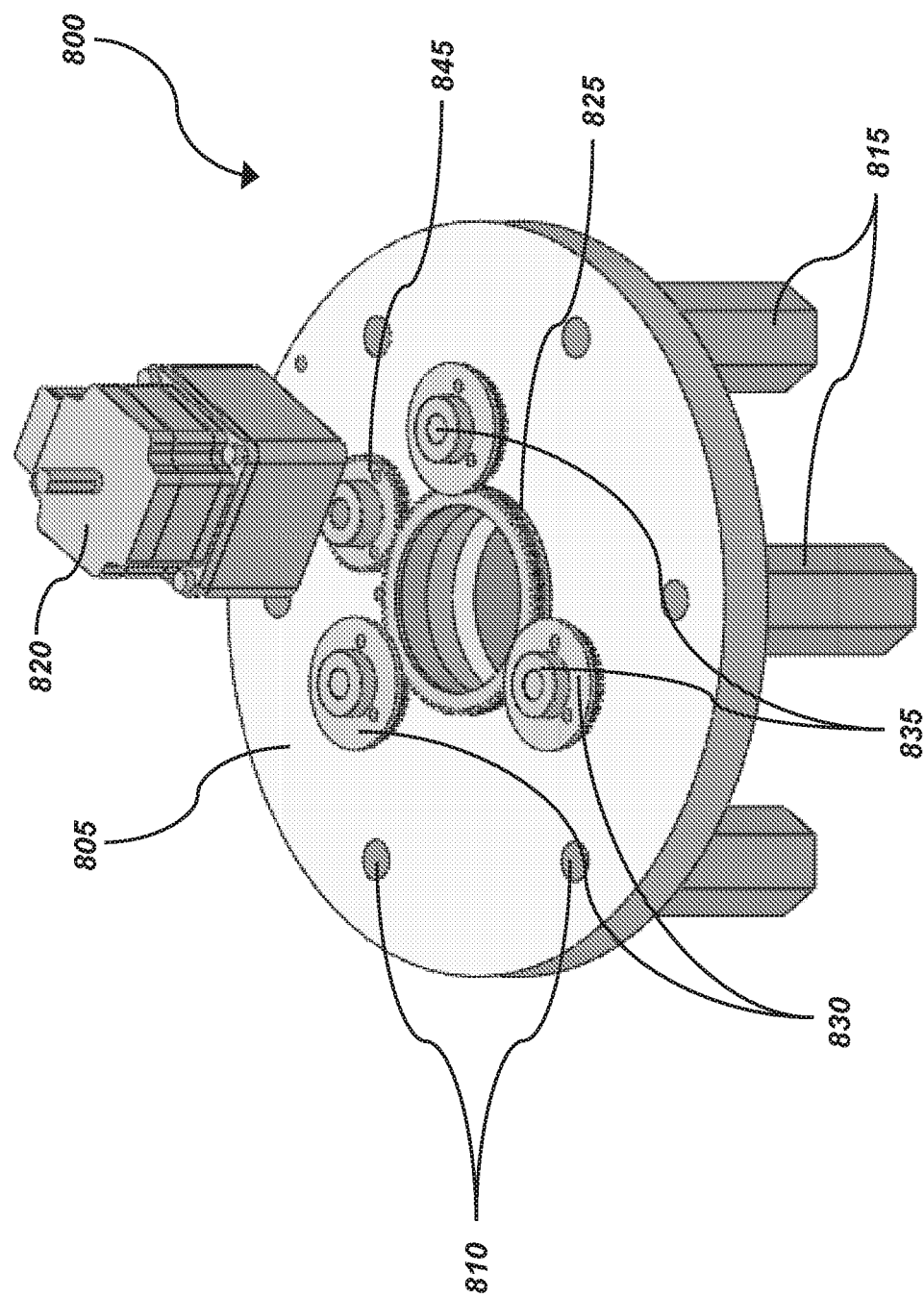
FIGS. 8a and 8b illustrate a motorized upper cartridge in accordance with an illustrative embodiment.
Figure 8B:
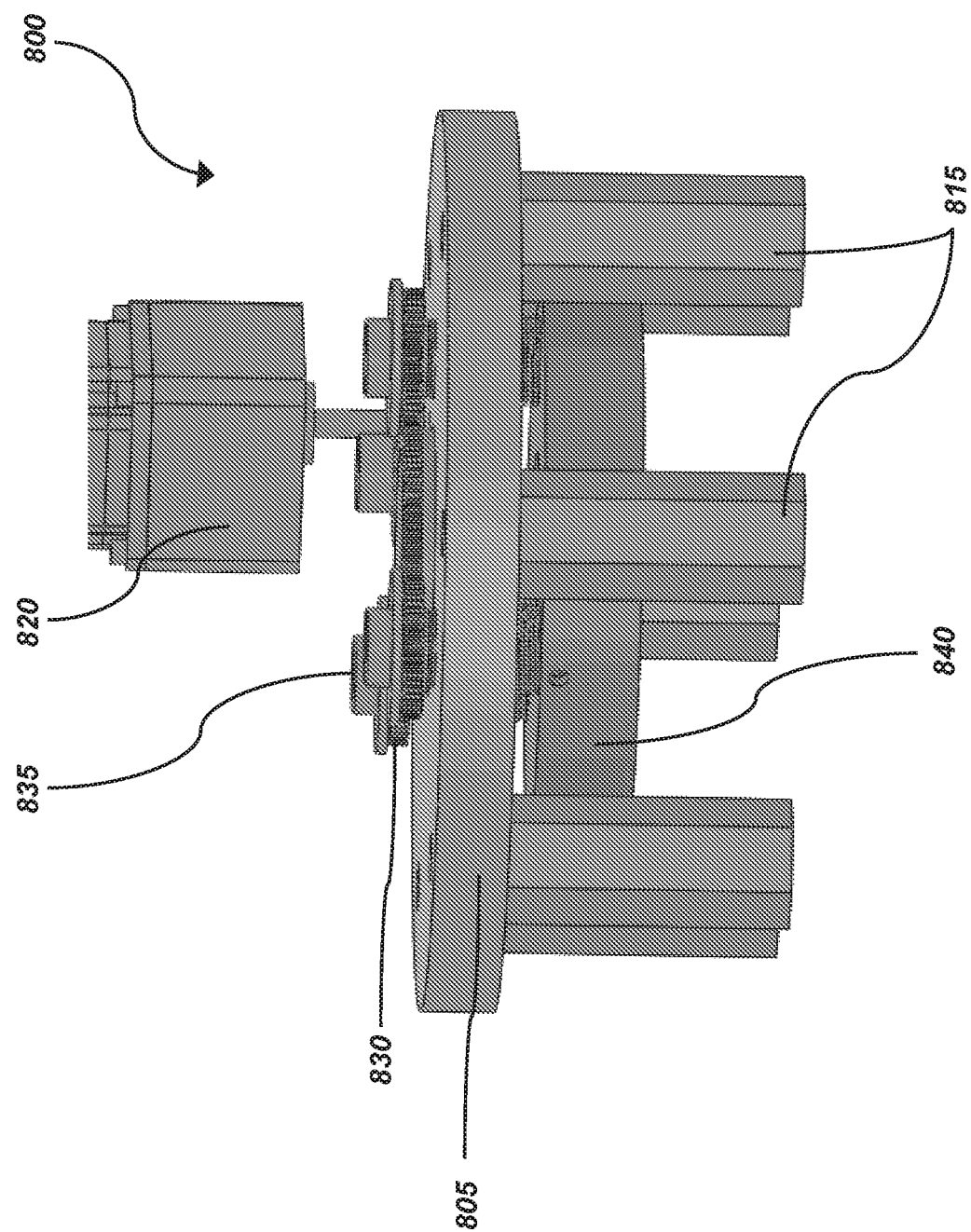

FIGS. 8a and 8b illustrate a motorized upper cartridge in accordance with an illustrative embodiment. In alternative embodiments, additional, fewer, and/or different elements can be used. In some embodiments, a motorized upper cartridge 800 can be used in place of the upper cartridge 700 of FIG. 7. The motorized upper cartridge 800 can include an upper plate 805, fastener bores 810, spacers 815, motor 820, a ring gear 825, planetary gears 830, an idler gear 845, threaded rods 835, and a movable plate 840.

The spacers 815 can be located between an outer surface of the housing and the bottom surface of the upper plate 805. The fastener bores 810 can extend through the upper plate 805 and spacers 815 to allow a fastener, such as a bolt, to slide through the upper plate 805, through spacers 815, through holes in the housing, and attach (e.g., thread) to holes in the outer cartridge, such as fastening means 545.

Movable plate 840 can be configured to move towards or away from the housing/upper plate 805. For example, threaded rods 835 can be threaded into threaded bores of the movable plate 840. The threaded rods 835 can be laterally stationary. That is, threaded rods 835 can rotate, but do not move up or down in relation to upper plate 805. Thus, by rotating threaded rods 835, the movable plate 840 can move up or down, depending upon the direction of rotation of the threaded rods 835.

The threaded rods 835 can be rotationally connected to motor 820, which can be a stepper motor. In alternative embodiments, any suitable means for rotating planetary gears 830 can be used, such as a manual crank. The motor 820 can be configured to rotate the ring gear 825, which can be hollow and allow a shaft, such as extension shaft 525, to be located in the center of the ring gear 825. The motor 820 can be rotatably connected to the ring gear 825 via an idler gear 845. In some embodiments, the idler gear 845 may not be used. The ring gear 825, in turn, can be rotatably connected to the planetary gears 830. Thus, my rotating a shaft of the motor 820, threaded rods 835 can rotate and the movable plate 840 can move up or down.

The movable plate 840 can be configured to provide a stop to the inner cartridge 520, via, for example, ring 555. Thus, by moving the movable plate 840, the height of the inner cartridge 520 and, therefore, the height of the rotor in relation to the housing can be adjusted. Accordingly, the gap between the electromagnet and the rotor can be adjusted via motor 820. One or more sensors can be configured to monitor the gap between the rotor and the electromagnet. A controller can be configured to monitor the gap, and, based on readings from the one or more sensors, can control the motor 820 to adjust the gap.

Figure 6:
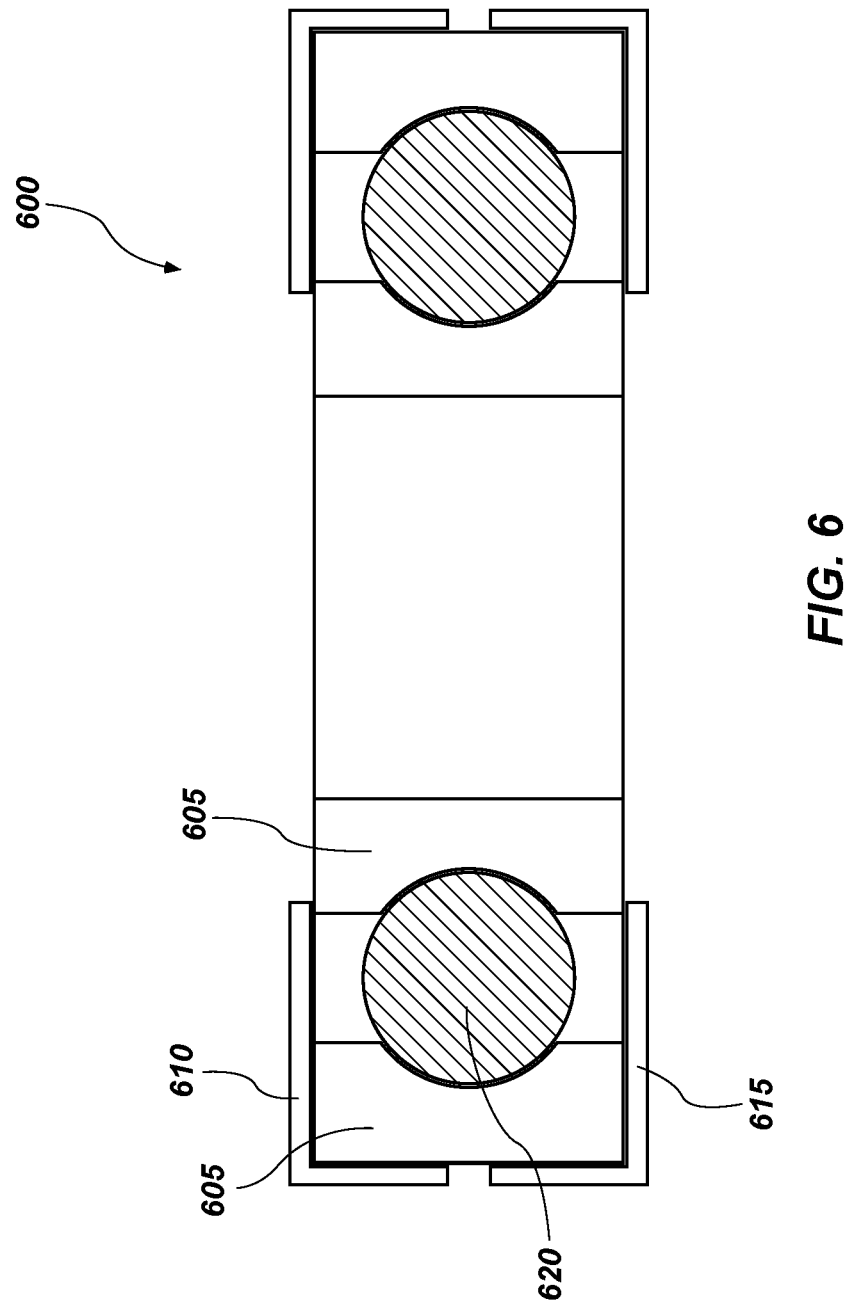
FIG. 6 illustrates a cutaway side view of a bearing system with magnetic shields in accordance with an illustrative embodiment.

As noted above, flywheel energy storage systems can include bearings. FIG. 6 illustrates a cutaway side view of a bearing system with magnetic shields in accordance with an illustrative embodiment. In alternative embodiments, additional, fewer, and/or different elements can be used. Bearing system 600 can include ball bearings 620, a raceway 605, an upper shield 610, and a lower shield 615. Bearing system 600 can be configured to surround a shaft or a shaft extension. Accordingly, raceway 605 can be an annular shape. Thus, the cutaway view of FIG. 6 illustrates two identical views (on the left and right side) inside of the circular bearing system 600.

Ball bearings 620 can be made of magnetic material, such as steel or iron. As noted above, magnetic fields can be used to suspend a rotor within the flywheel energy storage system. In some embodiments, ball bearings 620 can be within a magnetic field of one or more electromagnets. Changing the magnetic field of the electromagnets can induce eddy currents in the ball bearings 620. The eddy currents can cause the ball bearings 620 to create heat. High temperature of the ball bearings 620 can reduce the useable life of the ball bearings 620. Thus, in some embodiments, at least one of an upper shield 610 and a lower shield 615 can be used to protect the ball bearings 620 from one or more magnetic fields.

The upper shield 610 and the lower shield 615 can be installed on the stationary outer raceway 605 of the bearing system 600. The upper shield 610 and lower shield 615 can be made of steel with a high magnetic permeability. For example, silicon steel can be used. Other high permeability metals include Permalloy (which can be a nickel and iron magnetic alloy with about 80% nickel and about 20% iron), cobalt-iron, pure iron, and mu-metal (which can be a nickel and iron alloy with about 77% nickel, 16% iron, 5% copper, and 2% chromium and/or molybdenum). Other materials with a high magnetic permeability can alternatively be used. A permeability of about 2000 henries per meter (H/m) (or newtons per ampere squared (N/A$_2$)) can be considered "high." The upper shield 610 and the lower shield 615 can be comprised of a material with a lower resistance for magnetic flux than the resistance of magnetic flux in air. Accordingly, the majority of the magnetic flux can be routed to travel through the upper shield 610 and the lower shield 615 instead of the ball bearings 620. Because the upper shield 610 and lower shield 615 are stationary, they are less sensitive to magnetic fields and can experience fewer changing magnetic fields than ball bearings 620, thus reducing the generation of eddy currents, which can generate heat.

As shown in FIG. 6, the upper shield 610 and lower shield 615 can cover an outside edge of the raceway 605. In some embodiments, there can be a gap between the upper shield 610 and the lower shield 615, as shown in FIG. 6. In alternative embodiments, there can be no gap. The upper shield 610 and the lower shield 615 can extend around the entire annular raceway and, therefore, comprise an annular shape. Also as shown in FIG. 6, the upper shield 610 and the lower shield 615 can bridge a gap between the inner and outer raceways 605. In some embodiments, the upper shield 610 and the lower shield 615 can bridge the entire gap between the inner and outer raceways 605. In other embodiments, the upper shield 610 and the lower shield 615 can bridge a portion of the gap between the inner and outer raceways 605.

The upper shield 610 and the lower shield 615 can be pressed onto the raceway 605 and can comprise an interference fit. In some embodiments, the raceway 605 can be comprised of a material with low friction characteristics with the ball bearings 620, such as brass or polyimide plastic. In some embodiments, the raceway 605 can be comprised of a material with high magnetic permeability, such as a material comprising the upper shield 610 and the lower shield 615. In such embodiments, the upper shield 610 and the lower shield 615 may not be used.

After multiple cycles of loading a flywheel energy storage system by speeding up and slowing down the rotor, the rotor material can fatigue. The predicted useful life of the rotor can be determined by the size of a flaw or crack within the material of the rotor. In some embodiments, flaws inside the rotor can be detected by using non-destructive ultrasonic inspection techniques. In some embodiments, ultrasonic inspection of the rotor can be automatic, not require human intervention, and not require disassembly of the flywheel energy storage system.

Figure 9A:
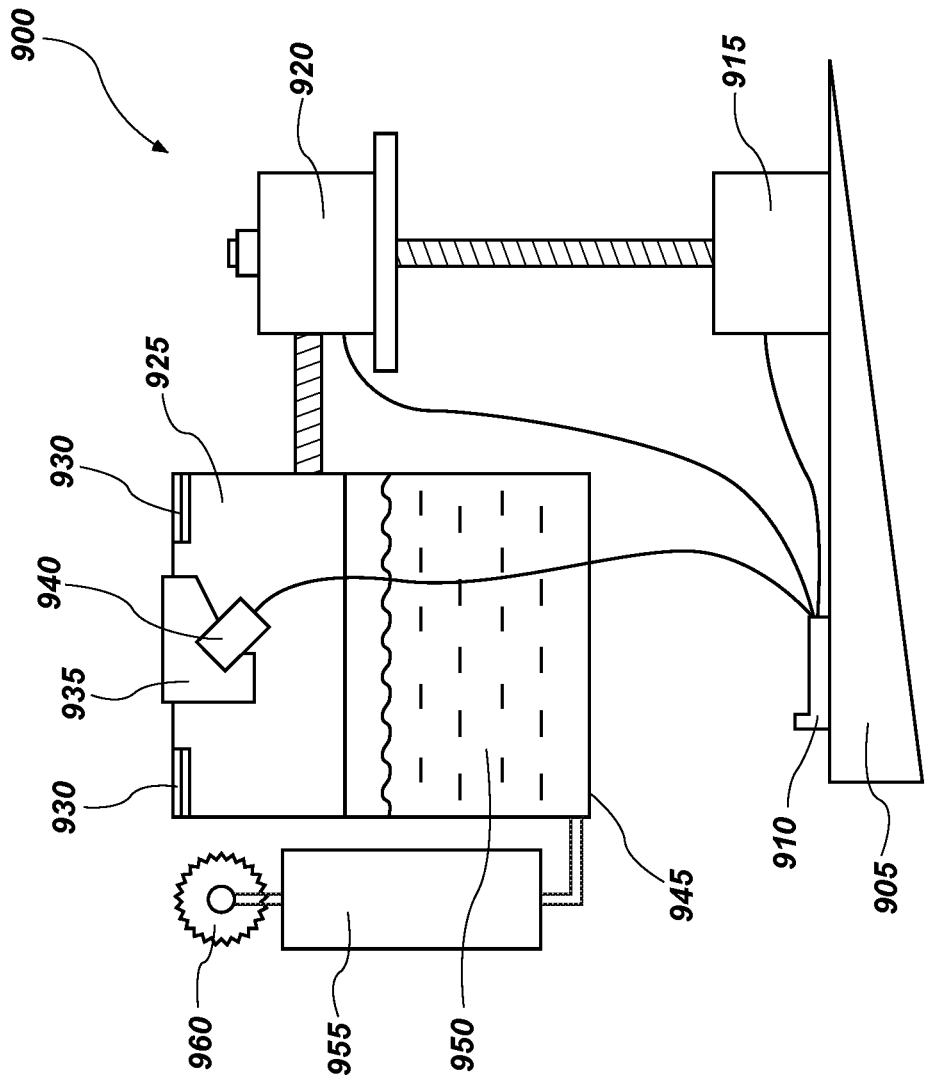
FIGS. 9a and 9b illustrate an automated ultrasonic rotor inspection system in accordance with an illustrative embodiment.
Figure 9B:
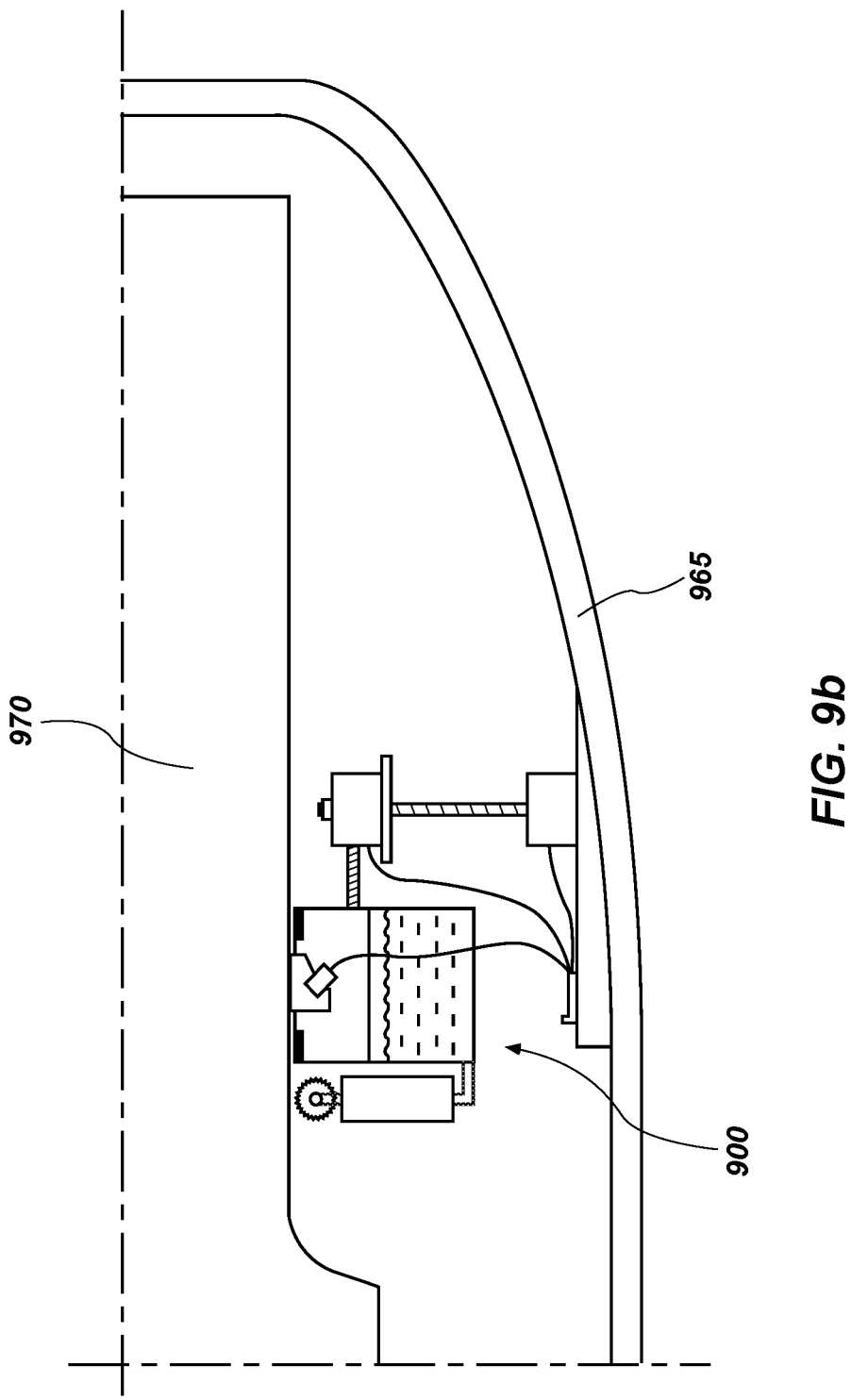

FIGS. 9a and 9b illustrate an automated ultrasonic rotor inspection system 900 in accordance with an illustrative embodiment. In alternative embodiments, additional, fewer, and/or different elements can be used. The ultrasonic rotor inspection system 900 can include a base 905, a microprocessor 910, a vertical electric motor 915, a horizontal electric motor 920, a transducer unit 925, magnets 930, an angled wave transferring media 935, an ultrasonic transducer 940, a reservoir 945, couplant gel 950, a pump 955, and a roller 960.

As shown in FIG. 9b, the ultrasonic rotor inspection system 900 can be installed within the flywheel energy storage system. For example, the ultrasonic rotor inspection system 900 can be installed within a housing of the flywheel energy storage unit (e.g., housing 110 or housing 965). The ultrasonic rotor inspection system 900 can include a microprocessor 910 (or other controller) configured to control the various elements of the ultrasonic rotor inspection system 900. For example, the microprocessor 910 can be configured to command the ultrasonic inspection unit to apply couplant on a surface of the rotor 970, raise the transducer unit to contact the rotor 970, and move the transducer unit on the rotor 970. Thus, the ultrasonic rotor inspection system 900 can be programmed to inspect the rotor 970 without a human operator and without disassembling the flywheel energy storage system. The cost of maintenance can be significantly reduced by using such a system. Inspection of the rotor 970 can be performed on a regular basis and/or when available (e.g., during a shutdown of the flywheel energy storage system).

In the configuration illustrated in FIG. 9a, the ultrasonic rotor inspection system 900 can be located beneath a portion of the rotor 970 to be inspected. In alternative embodiments, ultrasonic rotor inspection system 900 can be located above the portion of the rotor 970 to be inspected. In yet other embodiments, multiple ultrasonic rotor inspection systems 900 can be used.

In some embodiments, the rotor 970 can be slowed down from an operating speed for the ultrasonic scan to take place. However, the energy storage system need not be shut down. The scan can be done by slowing the rotor 970 to a speed of around 1 revolution per minute (rpm). In alternative embodiments, the rotor 970 can spin faster or slower than 1 rpm. In some embodiments, the scanned area can be within a six inch radius from the center axis of the rotor 970. In such an embodiment, the time to scan can be less than five minutes. In alternative embodiments, a larger or smaller radius can be scanned. Further, a different area can be scanned (e.g., an annular ring of the rotor 970, selected portions of the rotor 970, etc.). Additionally, in alternative embodiments, a scan time can be less than or greater than five minutes.

The ultrasonic rotor inspection system 900 can move in steps away from (or towards) the center of the rotor 970 every revolution of the rotor 970. Thus, the ultrasonic rotor inspection system 900 can scan a surface that is about six inches in radius from the rotor center. In alternative embodiments, the ultrasonic rotor inspection system 900 can scan an annularly shaped surface. Further, the radius of the surface can be greater than or less than six inches. The ultrasonic rotor inspection system 900 can send and receive a high frequency acoustic signal through the rotor 970. The ultrasonic rotor inspection system 900 can also move away from (or toward) the center axis of the rotor 970 as the rotor 970 revolves around the center axis. Accordingly, the ultrasonic rotor inspection system 900 can scan a spiral shape about the center axis. In alternative embodiments, different scanning shapes can be used. For example, concentric circles can be scanned.

The transducer unit 925 can include a high frequency ultrasonic transducer 940 and an angled wave transferring media 935. The transducer unit 925 can be configured to detect flaws (e.g., cracks, voids, inconsistent material, etc.) in the rotor 970. In some embodiments, the ultrasonic rotor inspection system 900 can be configured to detect flaws in a portion of the rotor 970 that is the most prone to fatigue or flaws. The minimal detectable flaw size can be determined by the frequency of the ultrasonic transducer 940 and the material of the rotor. For example, the equation below can be used to determine the minimal detectible flaw size:

$$\text{Minimum detectable flaw size} = \frac{\lambda}{2} = \frac{c}{2f}$$

$\lambda$ is the wavelength of the ultrasonic signal measured in meters (m), c is the speed of the ultrasonic wave in the rotor 970 material measured in meters per second (m/s), and f is the frequency of the transducer measured in Hertz.

The base 905 of the ultrasonic rotor inspection system 900 can support the ultrasonic rotor inspection system 900 and can be mounted to the lower housing 965. The vertical electric motor 915 can be configured to move the transducer unit 925 vertically to make contact with the surface of the rotor 970. The vertical electric motor 915 can also be configured to lower the transducer unit 925 away from the rotor 970. The transducer unit 925 can have one or more magnets 930 (e.g., two magnets 930). The magnets 930 can be located on either end of the transducer unit 925 and can be configured to provide a contact force between the rotor 970 and the transducer unit 925.

Couplant gel 950 can be contained in reservoir 945. The couplant gel 950 can be applied to the surface of the rotor 970 prior to the inspection such that the ultrasonic waves emitted from the transducer unit 925 can be effectively transferred from the transducer unit 925 to the rotor 970 and back to the transducer unit 925 through the couplant gel 950. The couplant gel 950 can be any suitable material configured to effectively transmit the ultrasonic waves. The couplant gel 950 can be pumped through the pump 955 (which can be an electric pump) onto roller 960. The roller 960 can be configured to apply the couplant gel 950 onto the surface of the rotor 970 that is to be scanned. The horizontal electric motor 920 can be configured to move the transducer unit 925 horizontally. The various motors and pumps can be controlled by the microprocessor 910. The microprocessor 910 can also send the sensed inspection data to another system to be inspected. The sensed inspection data can be transmitted using any suitable method, including wirelessly. For example, the sensed inspection data can be transmitted to controller and/or a data historian.

A flywheel energy storage system stores energy in the form of kinetic energy (e.g., a rotor can spin and have rotational momentum). The system can have resonant frequencies that may be within the domain of operational speeds. Resonant frequencies can cause amplified vibrations in the rotor and/or the system as a whole that can result in damage to various components and can generate heat. Accordingly, some embodiments can avoid, eliminate, or reduce resonating of the flywheel energy storage system, which, in turn, can improve the longevity of the components and/or the efficiency of the system.

Figure 10:
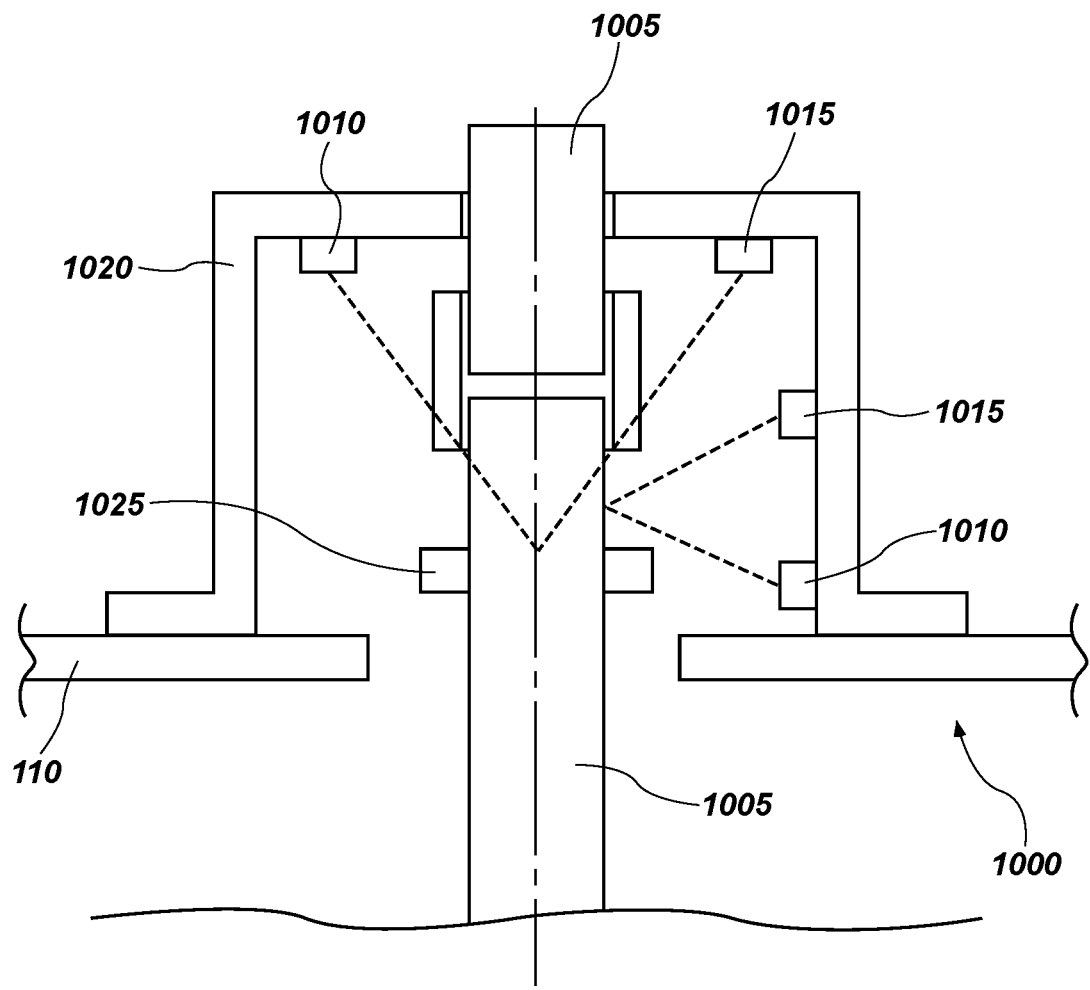
FIG. 10 illustrates a resonant frequency detection system in accordance with an illustrative embodiment.

FIG. 10 illustrates a resonant frequency detection system in accordance with an illustrative embodiment. In alternative embodiment, additional, fewer, and/or different elements can be used. The resonant frequency detection system 1000 can be located above the upper portion of the housing of a flywheel energy storage system (e.g., housing 110). The resonant frequency detection system 1000 can include a shaft 1005 with a shoulder 1025, one or more transmitters 1010, one or more receivers 1015, and a bell housing 1020.

The resonant frequency detection system 1000 can be used to determine if there is a resonant vibrational frequency of the shaft 1005 without contacting any part of the rotating shaft 1005 or the rotor (not shown in FIG. 10). As shown in FIG. 10, the resonant frequency detection system 1000 can include one or more transmitters 1010 and one or more receivers 1015. The transmitter 1010 can be configured to transmit light and, in some embodiments, can include a laser. The receiver 1015 can be configured to detect light, for example, light emitted by transmitter 1010. The transmitter 1010 can be configured to emit the light in a direction that will reflect off of the shaft 1005 and into the receiver 1015. As shown in FIG. 10, the shaft 1005 can include a shoulder 1025 that light can be reflected off of.

In some embodiments, the transmitter 1010 can emit a collimated laser light at a reflective surface of shaft 1005. The emitted light can be emitted in pulses. A baseline distance traveled by the light emitted by the transmitter 1010 and received by the receiver 1015 can be predetermined. The receiver 1015 can be a sensor array. The receiver can be configured to determine light intensity. As shown in FIG. 10, the transmitter 1010 can be paired with a respective receiver 1015 and the transmitter 1010 and the receiver 1015 can be on a plane that is parallel to a surface plane of the shaft 1005 (or shoulder 1025). The resonant frequency detection system 1000 can be configured to determine the distance between the plane of the receiver 1015 and the transmitter 1010 and the shaft 1005.

As noted above, the receiver 1015 can include a plurality of sensors, which can be pixel sensors. The resonant frequency detection system 1000 can include a controller (not illustrated in FIG. 10) that can receive information sensed or gathered by the resonant frequency detection system 1000. The sensor pixel that senses the highest average light intensity can be used to determine the distance of the shaft from the receiver 1015 and can be a reference for a change in distance.

The resonant frequency detection system 1000 can take measurements, for example, at least six hundred times every second (e.g., 600 Hertz (Hz)). The frequency of measurements can be based in part on the maximum range of resonant frequencies desired to be detected multiplied by a factor of 4. In some embodiments, the measurement sampling time can be determined in part by the rotation speed of the rotor shaft 1005. Further, in some embodiments, the measurement frequency can change based on a change in the rotor shaft 1005 speed. For example, the rotor shaft 1005 can spin at one thousand rpm (i.e., 16.6 Hz), and a minimum sampling frequency of 66.6 Hz can be established.

The total distance traveled by the shaft 1005 can be measured based on a number of pixels that the reflected beam has moved to. For example, a reference pixel can be a center pixel of a 9×9 pixel grid. When the rotor shaft 1005 is rotating with no vibrations or movement, the center pixel of the pixel grid can receive the highest average light transmitted by transmitter 1010. As the rotor shaft 1005 begins to vibrate or otherwise change horizontal or vertical position (rotational position can be ignored), the distance of the measured point on the shaft 1005 and the receiver 1015 can change. Accordingly, the angle of the reflected light and/or the location of the light hitting the receiver 1015 can change. Thus, the pixel in the 9×9 grid of the sensor that has the highest average sensed light can change and can be different than the center pixel.

Based on the change of the location of the highest measured light pixel, the resonant frequency detection system 1000 can determine the distance traveled of the measured point on the shaft 1005. Based on the distance traveled over time, the resonant frequency detection system 1000 can determine one or more vibration frequencies of the shaft 1005. Further, the resonant frequency detection system 1000 can determine if one or more of the vibration frequencies are a resonant vibration frequency. Based on the peaks and valleys of the movement of the shaft 1005 over time, velocity of the shaft 1005 can be determined. Further, acceleration of the shaft 1005 can be determined based on the change in velocity.

As noted above, resonant frequencies or vibrations can reduce efficiency and can increase wear of components. Resonant frequencies of a flywheel energy storage system can be controlled by changing the force applied to the bearings in such a system. One method of changing the force applied to the bearings can be to adjust stiffness of bearing cartridge springs that couple the rotor with the housing. The spring tension or stiffness can be adjusted to avoid resonance.

Figure 11A:
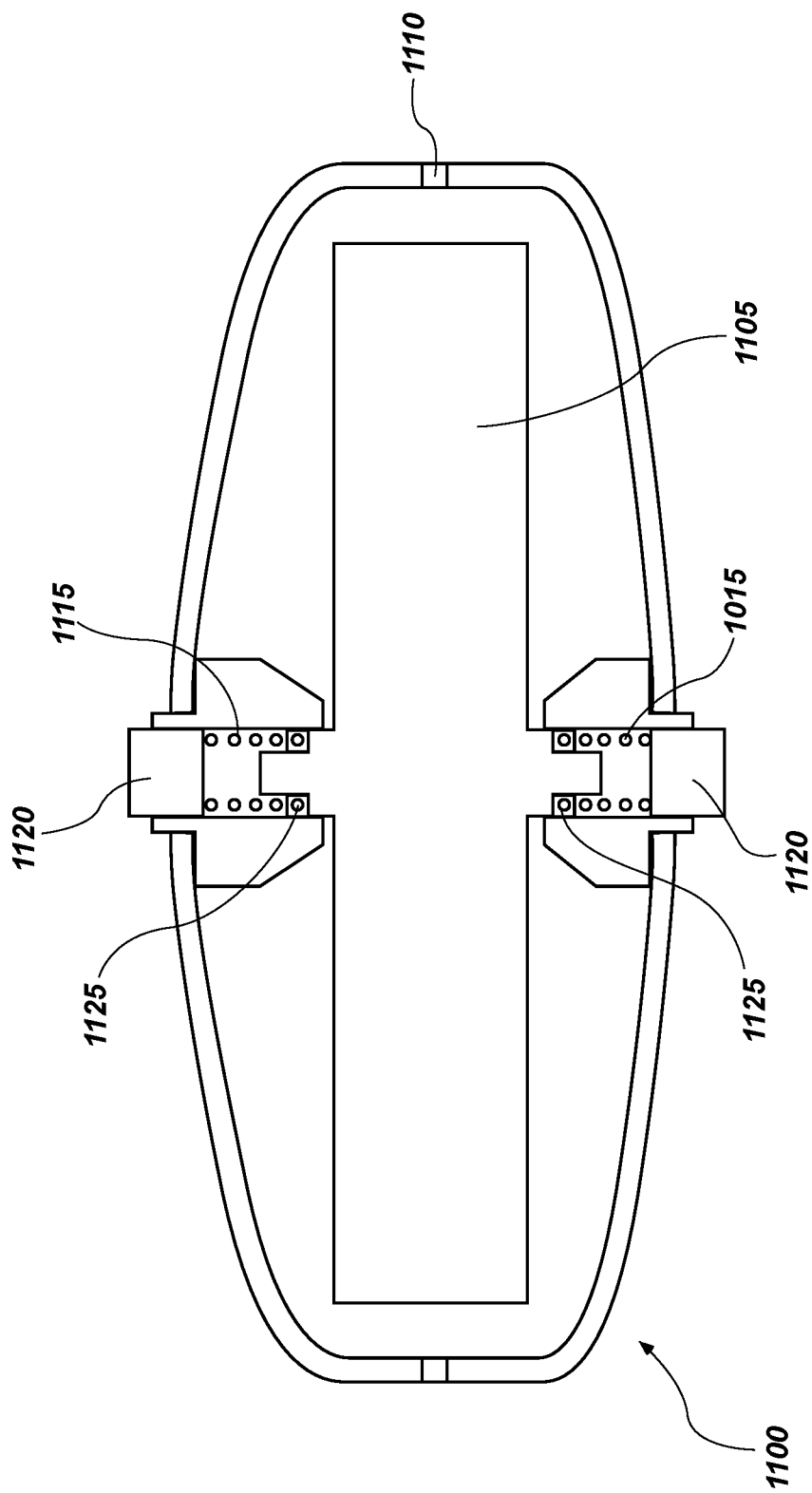
Figure 11B:
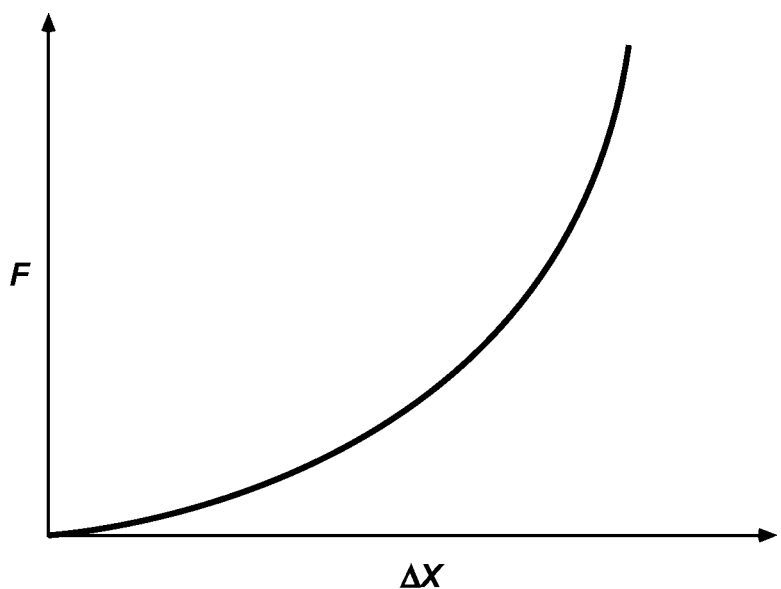
FIG. 11b is a graph showing the stiffness, F, of material against a distance the material is compressed, $\Delta x$, in accordance with an illustrative embodiment.

FIGS. 11a and 11c illustrate techniques for controlling resonant frequency and vibration in accordance with an illustrative embodiment. Alternative embodiments can include additional, fewer, and/or different elements. FIG. 11b is a graph showing the stiffness, F, of material against a distance the material is compressed, Δx, in accordance with an illustrative embodiment.

As shown in FIG. 11a, one method of controlling resonant frequency and vibration is by using springs 1115 to place a force on bearings 1125. Springs 1115 can be nonlinear springs such that the relationship between the amount of force exerted by springs 1115 and the compressed distance is nonlinear. One example of such a relationship is shown in FIG. 11b. As the spring 1115 gets compressed, the stiffness of the spring 1115 increases. A nonlinear elastic material such as an elastomer can have the property that different amounts of compression results in different amounts in a change in stiffness. In an elastic material, the stiffness does not change with the amount of compression. A given block of a nonlinear elastic material can be calibrated such that the applied displacement is correlated with the stiffness. An increase in stiffness can shift one or more resonant frequencies of the entire system into a higher range. The stiffness can be altered such that the one or more resonant frequencies are above the operating maximum speed of the rotor.

As shown in FIG. 11a, the springs 1115 can be configured to be seated on an adjustable block 1120, or other suitable seat. The adjustable block 1120 can be adjustable in relation to housing 1110, for example, by a controller. The springs 1115 can also be configured to exert a force on bearings

1125, which, in turn, exert a force on rotor 1105. The arrangement of FIG. 11*a* includes the springs 1115 on the upper portion of system 1100 and the bottom portion of the system 1100. In alternative embodiments, the springs 1115 can be located in just the upper portion of system 1100 or just the bottom portion of system 1100.

Thus, the tension force of the springs 1115 can be increased by adjusting the position of the adjustable block 1120. Accordingly, when the adjustable block 1120 of either end of system 1100 is moved toward the center of the system 1100, the rotor 1105 is coupled to the housing 1110 via a stiffer spring. The resonant frequencies of the system 1100 can be changed by altering the deflection of the springs 1115.

An alternative method for controlling resonant frequencies and vibrations with springs is shown in FIG. 11*c*. The system 1100 illustrated in FIG. 11*c* can be similar to the system 1100 illustrated in FIG. 11*a*, but springs 1115 can be replaced by magnetorheological (MR) fluid-filled spacers 1130. When applying a magnetic field to the MR fluid, the viscosity of the MR fluid can change based on the magnetic field applied and, thus, the stiffness of the MR fluid (and the stiffness of the coupling between the rotor 1105 and the housing 1110) can be changed. Although not illustrated in FIG. 11*c*, one or more electromagnets can be configured to selectively apply one or more magnetic fields to the MR fluid-filled spacers 1130.

The MR fluid-filled spacers 1130 can couple the rotor and housing together. The magnetic field of the electromagnet can be controlled by adjusting the amount of current flowing through the electromagnet. The adjustment can be controlled by a controller. The strength of the electromagnet can be directly proportional to the current flowing through the electromagnet. Accordingly, varying the current precisely can result in a precise force being applied by the electromagnet. In some embodiments, one electromagnet can be used for each of the MR fluid-filled spacers 1130. The MR fluid-filled spacers 1130 can comprise two annular disks with MR fluid between the two annular disks. An inside wall of the MR fluid-filled spacers can be the outer wall of a rotor shaft, a sleeve, a cartridge, etc. An outside wall of the MR fluid-filled spacers can be a sleeve, a housing, a cartridge, etc.

Figure 12A:
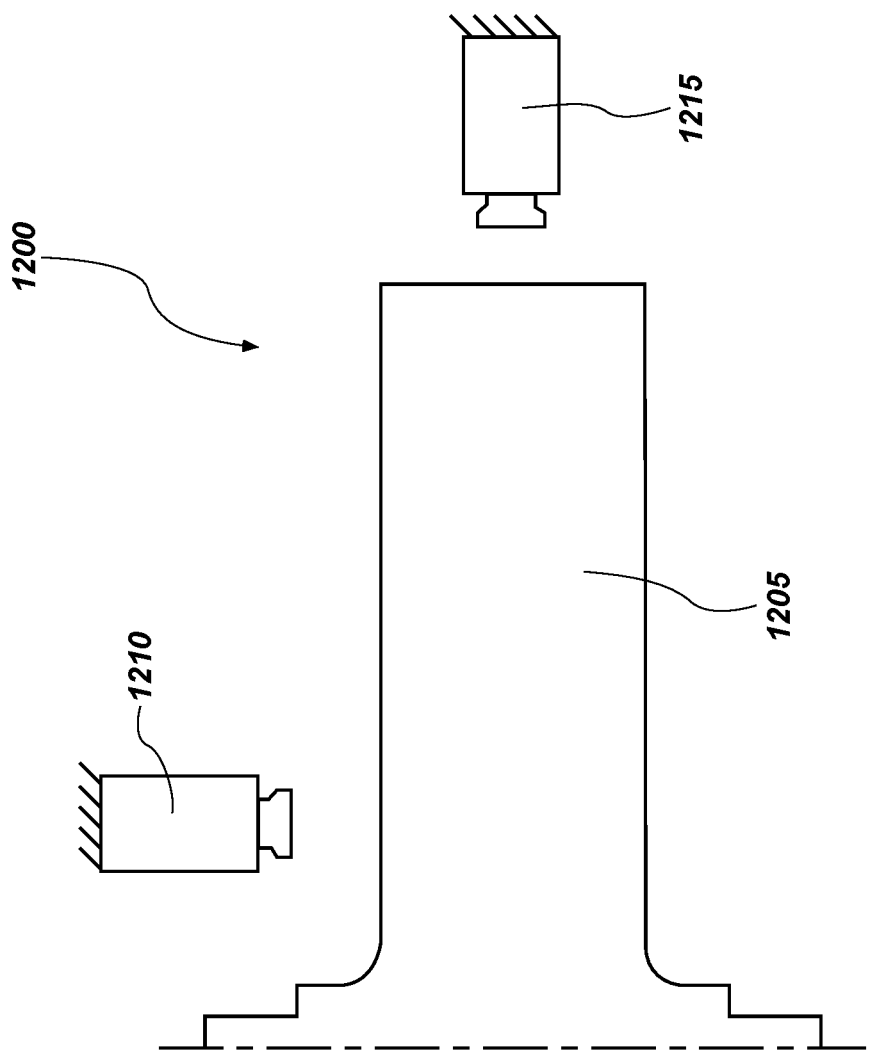
FIGS. 12a-12c illustrate a system configured to optically detect strain and displacement of a rotor in accordance with an illustrative embodiment.
Figure 12C:
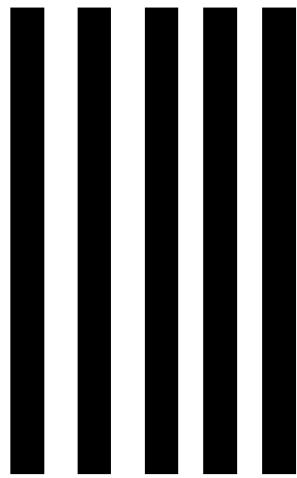
Figure 12B:
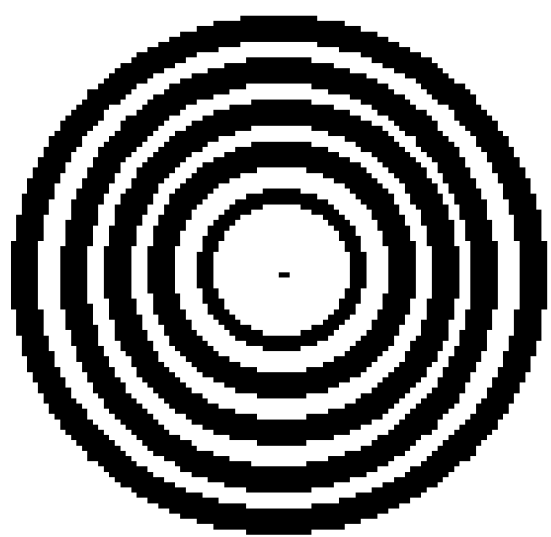

FIGS. 12*a*-12*c* illustrate a system configured to optically detect strain and displacement of a rotor in accordance with an illustrative embodiment. In alternative embodiments, additional, fewer, and/or different elements can be used. The optical recognition system 1200 can monitor the health of the rotor and/or control the position of the rotor 1205 during operation. The optical recognition system 1200 can include a rotor 1205, a vertical camera 1210, and a horizontal camera 1215. The vertical camera 1210 and the horizontal camera 1215 can be any suitable image capture device including a device configured to capture still images, a video camera, etc. In some embodiments, both the vertical camera 1210 and the horizontal camera 1215 can be used. In alternative embodiments, only one of the vertical camera 1210 or the horizontal camera 1215 can be used. In yet other embodiments, one or more vertical cameras 1210 can be used and/or one or more horizontal cameras 1215 can be used. The vertical camera 1210 and the horizontal camera 1215 can be high-speed cameras and can be configured to capture a clear image of the rotor 1205 while the rotor 1205 is spinning, for example, at 2,000 rpm.

The vertical camera 1210 can be configured to capture images of a top surface of the rotor 1205. In some embodiments, the vertical camera 1210 can be configured to capture a portion of a radius of the rotor 1205. In other embodiments, the vertical camera 1210 can be configured to capture the entire radius of the rotor 1205. The horizontal camera 1215 can be configured to capture images of a portion of an outer surface of the rotor 1205, as shown in FIG. 12*a*. The rotor 1205 can be comprised of a cylinder shaped portion and the horizontal camera 1215 can be configured to capture the entire height of a portion of the outer, circular portion of the cylinder shaped portion.

The top surface of the rotor 1205 (or a portion of the top surface of the rotor 1205) can be configured to display an optical pattern. One or more patterns on the rotor 1205 can be created, for example, using photolithography. The optical pattern can be configured to show a change in shape of the rotor 1205. For example, a pattern shown in FIG. 12*b* can be displayed on the top surface of the rotor 1205. The pattern can include concentric circles or annuluses of alternating or differing colors. For example, the alternating colors can be black and white, as shown in the example of FIG. 12*b*. The alternating bands can each have the same width. In alternative embodiments, the alternating bands can have different widths. For example, the bands closer to the center of the rotor 1205 can have a smaller (or wider) band width than the bands closer to the outer portion of the rotor 1205. In yet other embodiments, the black bands can have a first width, and the white bands can have a second width different than the first width. In alternative embodiments, different patterns can be used.

The side surface of the rotor 1205 can be configured to display an optical pattern configured to show a change in shape of the rotor 1205. For example, the pattern shown in FIG. 12*c* can be used. Alternating bands can be displayed on the side of the rotor 1205. The bands can run around the circumference of the rotor 1205. In alternative embodiments, bands can run the height of the outer surface of the rotor 1205. In some embodiments, the alternating bands can have alternating or different colors. In the example illustrated in FIG. 12*c*, the bands can alternate black and white. The alternating bands can each have the same width. In alternative embodiments, the alternating bands can have different widths. For example, the black bands can have a first width, and the white bands can have a second width different than the first width. In alternative embodiments, different patterns can be used.

The vertical camera 1210 and the horizontal camera 1215 can be configured to capture the respective patterns on the rotor 1205. The images from the vertical camera 1210 and the horizontal camera 1215 can be sent to a controller and/or a data historian. Any suitable method of transmission of the images can be used, including wireless transmission. The controller can be configured to perform pattern recognition and image processing to measure strain and displacement of the rotor 1205. The controller can receive two images of the rotor 1205. In some embodiments, a first image can be a baseline image taken, for example, when rotor 1205 is not spinning or is spinning relatively slowly. A second image can be a recently captured image while the rotor is at speed. In other embodiments, the two images can be consecutively captured images. The two images can be compared. For example, the width of a band of the pattern displayed on rotor 1205 can be measured in each image and can be compared to determine differences. A difference can indicate that the rotor 1205 has expanded, contracted, or otherwise changed shape. For example, when spinning, the rotor 1205 can expand radially. The vertical camera 1210 can be configured to measure the amount of expansion. The controller can be configured to, based on the determined change in shape of the rotor 1205, determine a strain of the rotor 1205. For example, a strain near the shaft or center axis of the rotor 1205 can be determined.

The controller can determine that stress of the rotor 1205 is greater than a threshold and, therefore, that the stress of the rotor 1205 should be reduced, for example, by slowing rotor 1205. The threshold can be, for example, a change in shape of 0.2%. In alternative embodiments, if the change in the band width is 0.2% or greater, the controller can determine that the stress of the rotor 1205 should be reduced. The controller can be configured to continuously monitor the change in shape of the rotor 1205 and check the shape against theoretical predictions from a computer model. The controller can be configured to determine vertical movement of the rotor 1205 based on images captured by the horizontal camera 1215.

As explained above, a flywheel energy storage system can be configured with a housing (e.g., housing 110) that can maintain at least a partial vacuum. The housing, however, is not entirely enclosed. For example, the flywheel energy storage system can include means for transferring rotational energy to the flywheel from outside of the housing. Such means can be, for example, via a shaft that extends through the housing. Accordingly, there can be a vacuum seal between the shaft and the housing to maintain vacuum pressure within the housing even when the shaft is spinning.

FIGS. 13a-13e illustrate a shaft extension with a vacuum seal in accordance with an illustrative embodiment. In alternative embodiments, additional, fewer, and/or different elements can be used. For the maximum vacuum seal and minimal wear, the surface of the rotating shaft 1350 can be hard and smooth. For example, the rotating shaft 1350 can be polished and can have a surface finish of less than 0.4 micron rms or 0.016 inch rms. The rotating shaft 1350 can also have a hardness greater than 55 on the Rockwell C scale. Such characteristics can be difficult to manufacture on a shaft of a rotor, for example, rotor 1305. However, shaft 1350 can be configured to attach to the rotor 1305.

Figure 13B:
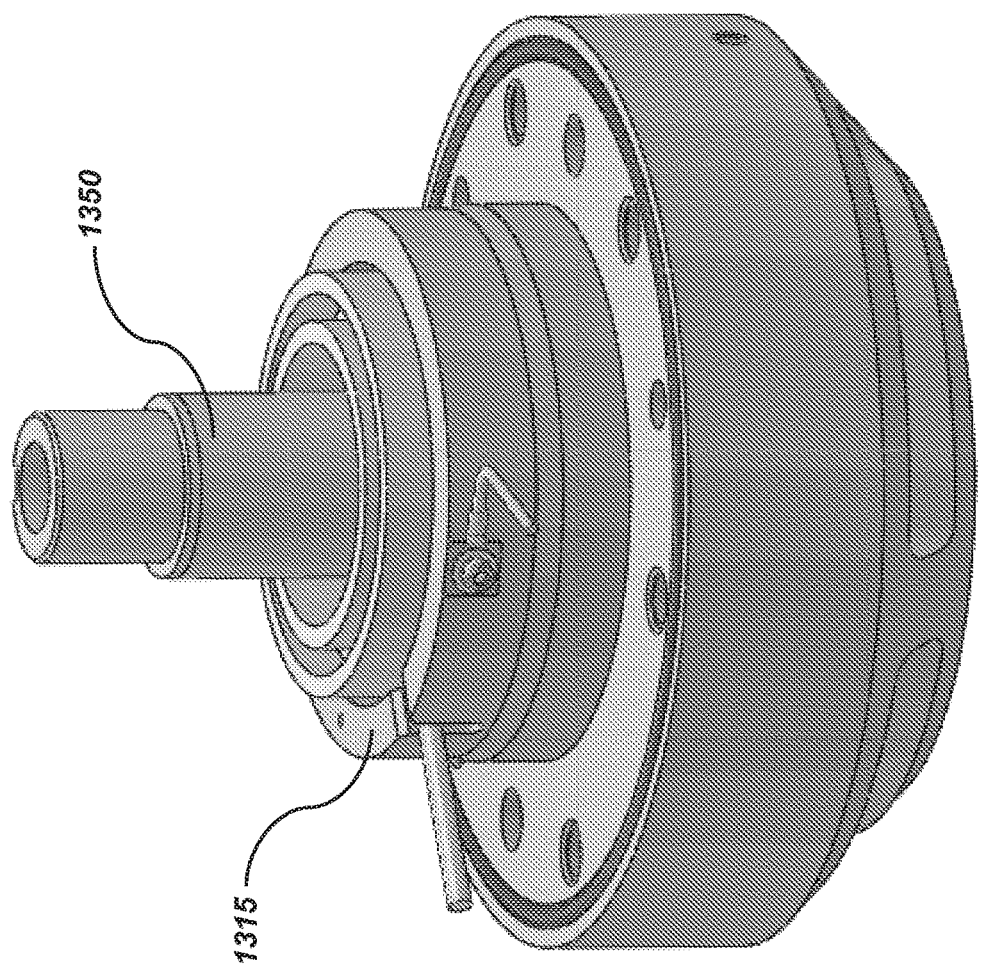
FIGS. 13a-13e illustrate a shaft extension with a vacuum seal in accordance with an illustrative embodiment.
Figure 13A:
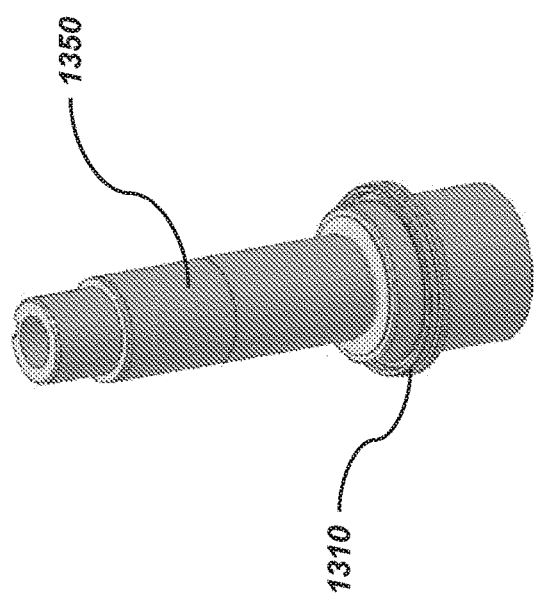
Figure 13C:
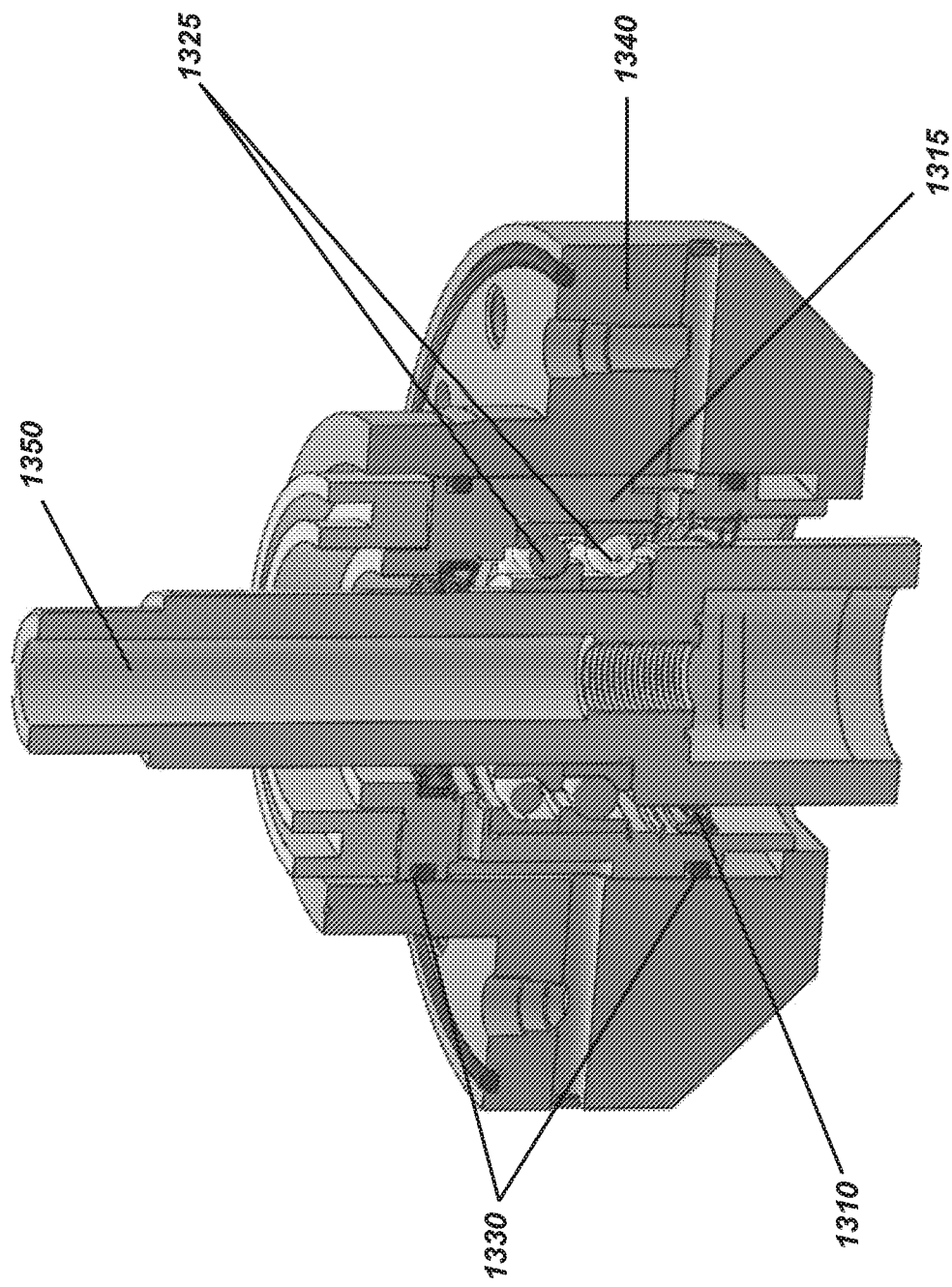
Figures 13D, 13E:
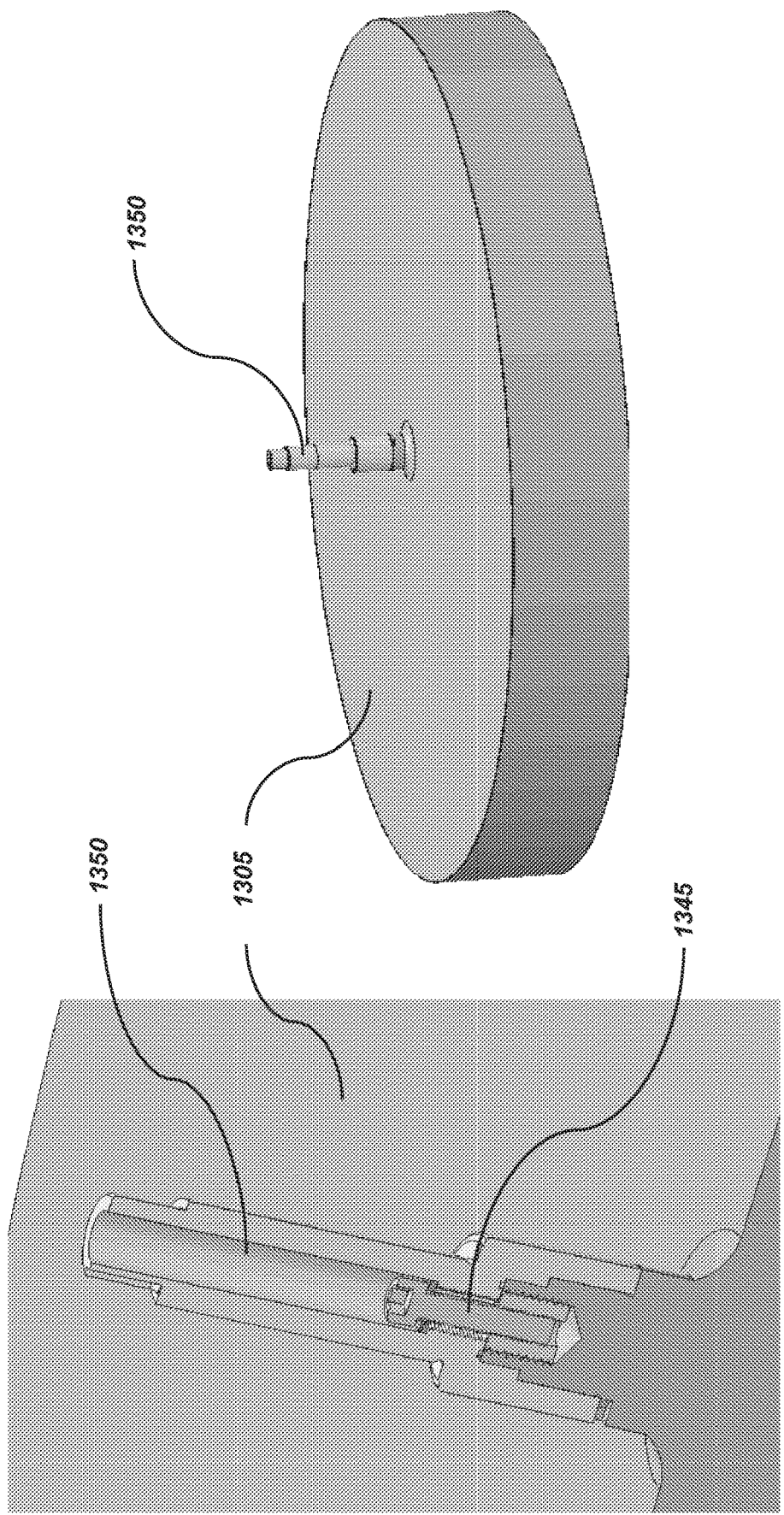

For example, shaft 1350 can be connected to rotor 1305 as shown in FIGS. 13d and 13e. An attachment means 1345 can be used to connect the shaft 1350 and the rotor 1305. Attachment means 1345 can include, for example, a shoulder bolt, a socket head cap screw, etc. The rotor 1305 can have a threaded slot configured to receive the attachment means 1345. In alternative embodiments, means other than threads can be used to receive the attachment means 1345. Further, mating surfaces can be formed into the rotor 1305 and the shaft 1350 such that the rotor 1305 and the shaft 1350 rotate together without slippage.

Figure 13F:
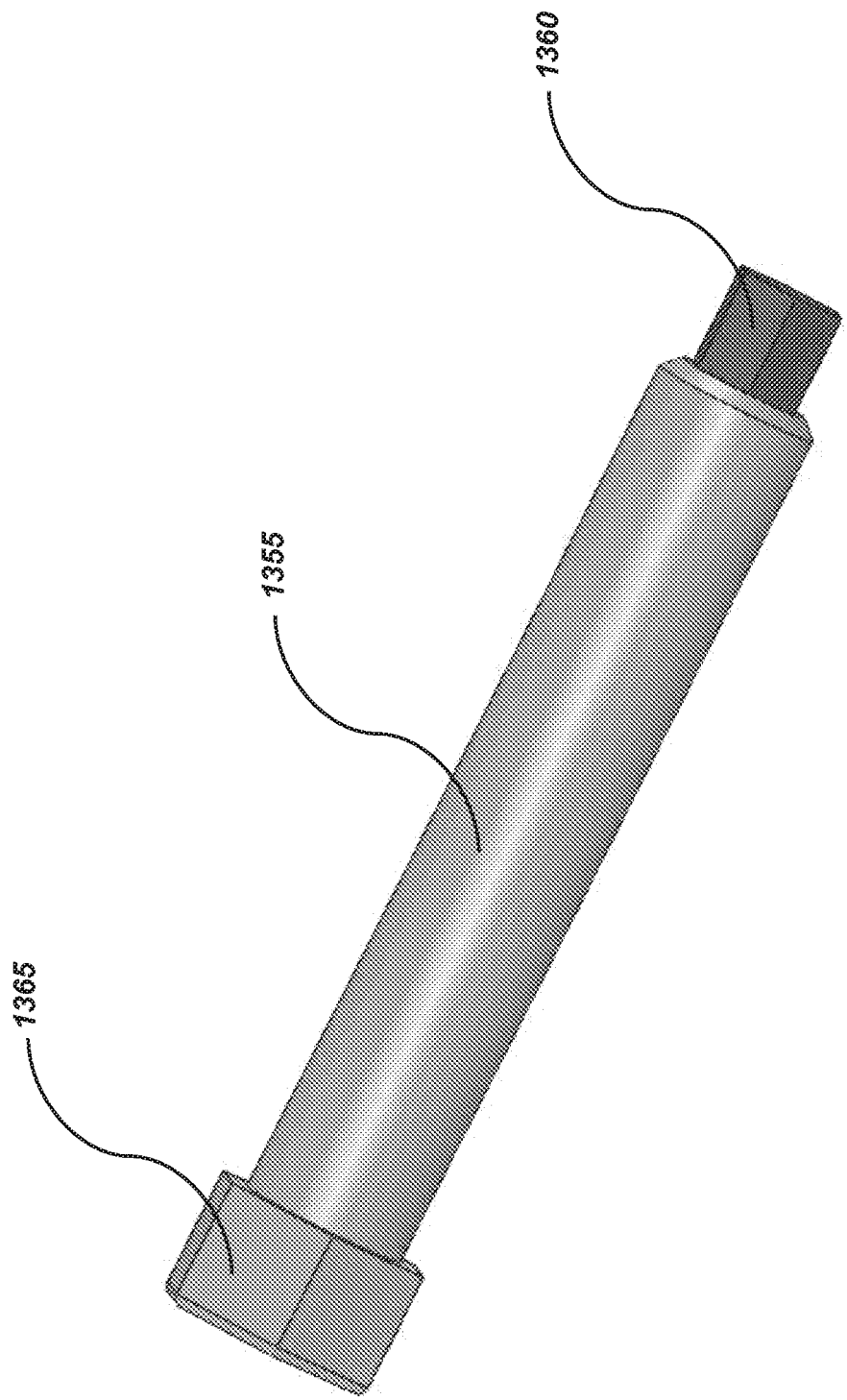
FIG. 13f illustrates a tool that can be used to tighten or loosen attachment means in accordance with an illustrative embodiment.

FIG. 13f illustrates a tool 1355 that can be used to tighten or loosen attachment means 1345 in accordance with an illustrative embodiment. Male end 1360 can be configured to be entered into a hollow portion of shaft 1350 and to be removably fixed to the attachment means 1345, as shown in FIG. 13d, to tighten or loosen the attachment means 1345, for example, by rotating the attachment means 1345. Top end 1365 can be configured to be received by another tool (not shown) such as a wrench, a socket (such as a one inch socket), a screw driver, etc. In the embodiment illustrated in FIG. 13f, male end 1360 can have a smaller diameter than top end 1365. In alternative embodiments, male end 1360 can include any suitable means to be removably fixed to the attachment means 1345, such as a female connection like a socket.

A surface of the shaft 1350 can be hardened and polished. As mentioned, the shaft 1350 (which can be an extension shaft) can be removably attached to a rotor. Accordingly, if the shaft 1350 is damaged or is excessively worn, the shaft 1350 can be replaced without removing the rotor from the housing. Furthermore, a removable shaft can ease maintenance and replacement of bearings 1325, seals 1330, vacuum seal 1310, etc. For example, as shown in FIGS. 13b and 13c, an inner cartridge 1315 can include bearings 1325, seals 1330, etc., and can be located inside of an outer cartridge 1340. The components illustrated in FIG. 13c can be the same as or similar to the components illustrated in FIG. 5a. The components illustrated in FIGS. 13a-13e can be implemented on an upper portion of a flywheel energy storage system and/or on a lower portion of the flywheel energy storage system.

The extension shaft 1350 can be in contact with a vacuum seal 1310. The vacuum seal 1310 can be fixed to the inner cartridge 1315. Thus, the vacuum seal 1310 can be stationary while the shaft 1350 spins with the rotor 1305. In alternative embodiments, the vacuum seal 1310 can be fixed to the shaft 1350.

As noted above, components of the flywheel energy storage system can be located in a lower section of the housing, such as bearings. Maintenance of such items can be facilitated (or may require) by lifting the housing off of the ground for access to such items.

Figure 14:
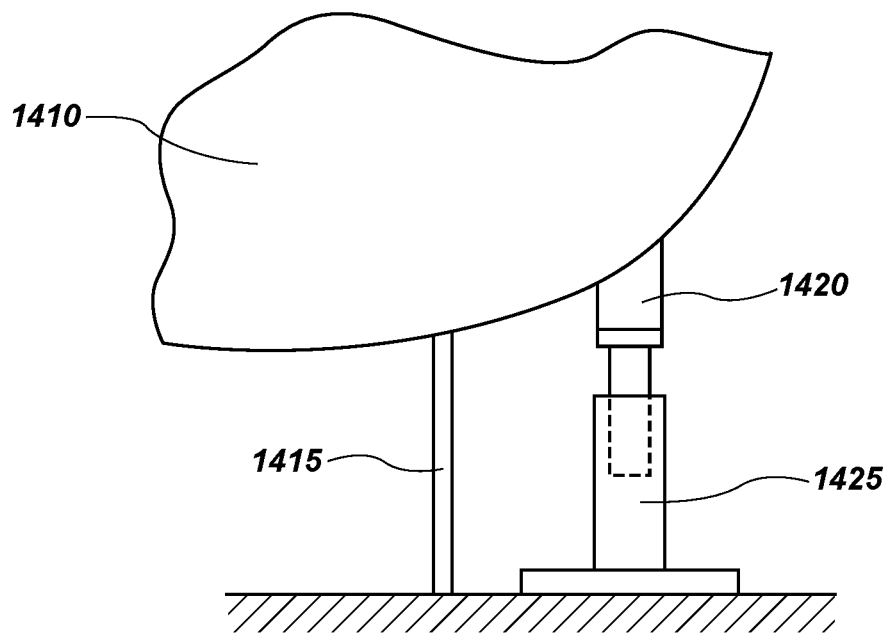
FIG. 14 illustrates a telescopic bottle jack configured to lift a portion of a housing in accordance with an illustrative embodiment.

FIG. 14 illustrates a telescopic bottle jack configured to lift a portion of a housing 1410 in accordance with an illustrative embodiment. In alternative embodiment, additional, fewer, and/or different elements can be used. The housing 1410 can include one or more legs 1415 configured to support the housing 1410 off of the ground. The legs 1415 can be rigid and can be fixed to the housing 1410. The housing 1410 can also include one or more jack posts 1420. The jack posts 1420 can be configured to lift the housing 1410 when force is applied to a bottom surface of the jack posts 1420, for example, by a hydraulic bottle jack 1425 (as shown in FIG. 14), a mechanical jack, or any other suitable device.

In some embodiments, one or more telescoping bottle jacks 1425 can be used to lift the housing 1410. In some embodiments, three of more jacks 1425 can support the housing 1410. The weight supported by the jacks 1425 can be over 15,000 lbs. Multiple jacks 1425 can be driven by a common hydraulic line to ensure even pressure is applied around housing 1410 and there is even vertical displacement. Thus, the housing 1410 can remain level while being lifted. The hydraulic line can be driven by any suitable means, for example, by a pump capable of supplying over 8,000 pounds per square inch (psi). The lifting capacity of the jacks 1425 can be determined by the total square area of the bottle jack pistons. In some embodiments, the jacks 1425 can extend to three times the height of the jacks 1425 in a compressed position.

The jacks 1425 can be removable from housing 1410 and, thus, can be field deployable. Flow restrictors can be used in the jacks 1425, the hydraulic lines, or the hydraulic pump to prevent the jacks 1425 from lifting or falling too quickly. Additionally, a pressure regulator can be used to prevent over pressurization in the hydraulic line. A mechanical locking mechanism can be used to maintain a height of the jacks 1425 if the hydraulic line loses pressure, for example, if the hydraulic line has a leak.

In some embodiments, a base of the jacks 1425 can be wide enough to prevent damage or compromising the structure supporting the jacks 1425, which can be made of wood. The base of the jacks 1425 can exert a pressure of less than 350 psi, which can be based on an ISO concentrated load test.

Figure 19:
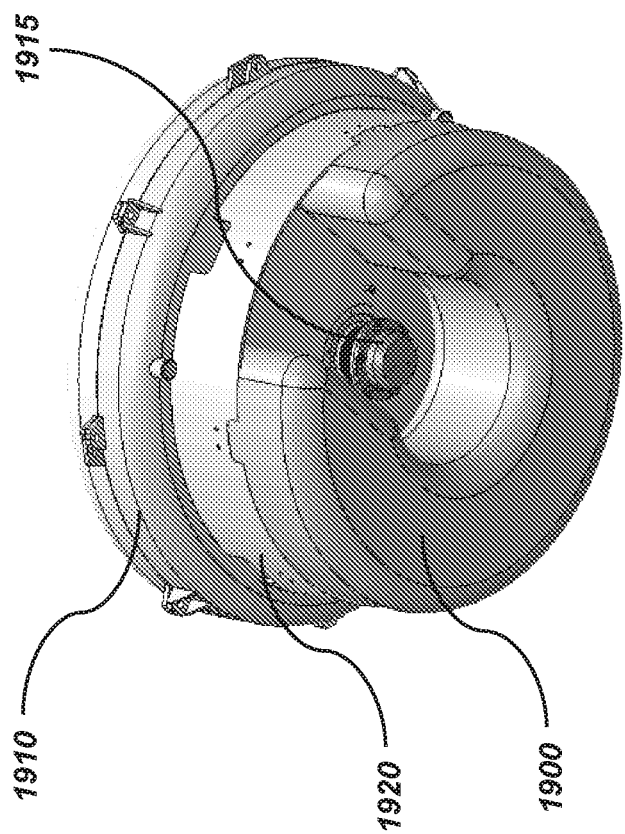
FIG. 19 illustrates a balloon configured to lift a housing and rotor in accordance with an illustrative embodiment.

In some embodiments, a balloon can be used to lift at least a portion of a flywheel energy storage system. FIG. 19 illustrates a balloon configured to lift a housing and rotor in accordance with an illustrative embodiment. In alternative embodiments, additional, fewer, and/or different elements can be used. For illustrative purposes, FIG. 19 illustrates a balloon 1900 from the bottom without any ground. A housing 1910 can house a rotor. The housing 1910 can be lifted for a variety of reasons, including maintenance of portions of the flywheel energy storage system that are located at the bottom of the housing 1910, such as a lower cartridge 1915, which can include bearings, a load sensor, means for lifting the rotor, etc.

A skirt 1920 can be located beneath the housing 1910. The skirt 1920 can be any suitable shape. The embodiment illustrated in FIG. 19 shows a skirt 1920 that is annular. In some embodiments, the skirt 1920 can be connected to the housing 1910 at points around the housing 1910, such as jack posts 1420. Inside skirt 1920, and below housing 1910 can be a balloon 1900. FIG. 19 illustrates the balloon 1900 in an inflated state. However, the balloon 1900 can be placed within the skirt 1920 in an uninflated state.

The balloon 1900 can be inflated and can contact the bottom surface of the housing 1910. As the balloon 1900 continues to inflate, the balloon 1900 can apply equal pressure around skirt 1920. Thus, the balloon 1900 can center itself about the housing 1910 as the balloon 1900 inflates. As the balloon 1900 fills the area defined by the housing 1910, the skirt 1920, and the ground, the balloon 1900 can press up on the housing 1910, thereby lifting the housing 1910. The balloon 1900, in an inflated state, can extend beyond the skirt 1920, thereby lifting the skirt 1920 from the ground. Balloon 1900 can include an opening. That is, the balloon 1900 may not be a complete annulus. The opening can be an access opening, allowing access to bottom portions of the housing 1910, such as lower cartridge 1915. The opening can be any suitable size, such as large enough for a human hand and/or arm, large enough for a human torso, etc.

In some embodiments, an air pressure inside the balloon can be approximately 20 psi and can lift the housing 1910 approximately 15 inches. In other embodiments, pressures of less than or greater than 20 psi can be used and the housing 1910 can be lifted more than or less than 15 inches. Once the housing 1910 is lifted, solid stands can be used to support the housing 1910.

As discussed above, flywheel energy storage systems can be placed in various locations around the world and can be indoors or outdoors. However, in some embodiments, the flywheel energy storage system works optimally when the housing and rotor are level. Accordingly, some embodiments can include features to adjust the height and/or orientation of the flywheel energy storage system.

Figure 15:
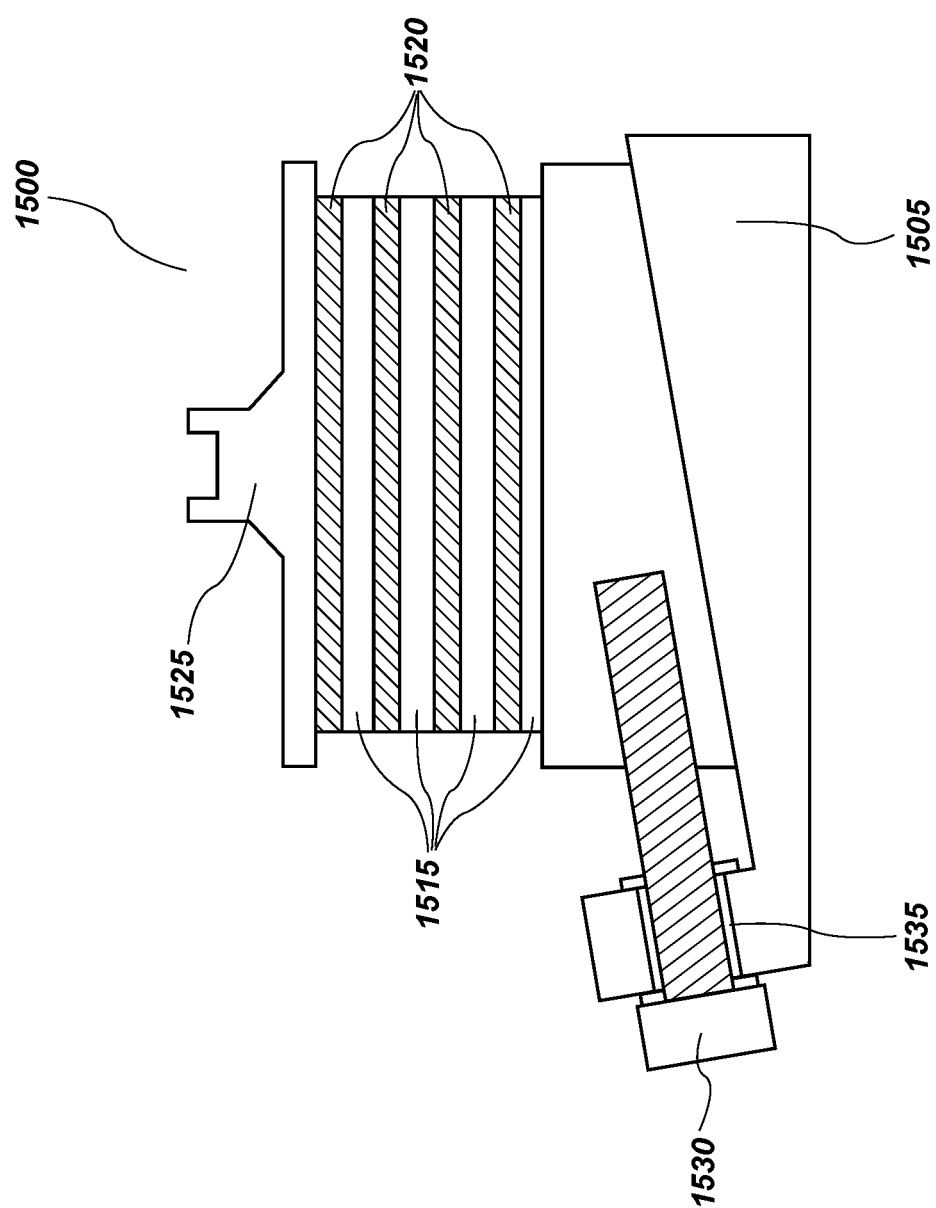
FIG. 15 illustrates a seismic isolator in accordance with an illustrative embodiment.

Furthermore, flywheel energy storage systems can be used for energy security during natural hazards, such as earthquakes, to provide power when grid power is not available. Thus, in some embodiments, the flywheel energy storage system, including the housing, can be structurally sound and continue to operate during and after earthquakes. FIG. 15 illustrates a seismic isolator 1500 in accordance with an illustrative embodiment. In alternative embodiments, additional, fewer, and/or different elements can be used.

One or more seismic isolators 1500 can support the flywheel energy storage system. The seismic isolators 1500 can provide a lower natural frequency of oscillation of the flywheel energy storage system than the shaking of earthquakes. Accordingly, the seismic isolators 1500 can protect the flywheel energy storage system by damping the horizontal and vertical oscillations caused by earthquakes. The height of each seismic isolator 1500 can be adjustable so that the housing can remain level even when deployed on uneven ground.

Seismic isolator 1500 can include a base 1505, a wedge 1510, reinforcing layers 1515, isolation layers 1520, and a rest 1525. The base 1505 can include a ramp with an angle equal to an angle of the wedge 1510. Thus, if the bottom of base 1505 is placed on a level surface, the top of the wedge 1510 can also be level. On top of the wedge 1510 can be alternating layers of reinforcing layers 1515 and isolation layers 1520. The number of total layers can be one, two, three, five, ten, twenty, etc. Reinforcing layers 1515 can be configured to provide structural rigidity to the seismic isolator 1500 and can be comprised of a rigid material, such as stainless steel.

Isolation layers 1520 can be configured to absorb or reduce vibrations traveling through seismic isolator 1500. The isolation layers 1520 can be comprised of a material that does not transfer vibrations well, such as rubber. The shape of the alternating layers can be designed such that the compressive strain of the alternating layers is less than 10%. On top of the alternating layers can be a rest 1525 that can be configured to receive a foot of the flywheel energy storage system (e.g., legs 1415). The rest 1525 can be configured to distribute compressive force from the foot of the flywheel energy storage system evenly throughout the alternating layers.

The overall height of the isolation layers 1520 can be enough such that the natural period of oscillation of the isolators with the flywheel energy storage system resting on the one or more isolation layers 1520 on top is above the natural period of oscillation of most or all earthquakes. The natural frequency (A) of a system such as a flywheel mass supported by the isolators can be determined by the following equation:

$$f_n = \frac{1}{2\pi}\sqrt{\frac{k}{m}}$$

k is the axial stiffness of each isolator measured in newtons per meter (N/m) and m is the mass of the flywheel energy storage system shared by each isolator measured in kilograms (kg) (where the total mass of the flywheel energy storage system shared by each isolator is M/n, where M is the total mass of the flywheel energy storage system and n is number of seismic isolators).

The axial stiffness, k can be determined by the following equation:

$$k = \frac{AE}{l}$$

A is the cross-sectional area of the isolator (the footprint) measured in square meters (m²), E is the modulus of elasticity of the rubber measured in pascals (Pa) or newtons per square meter (N/m²), and l is the total height of the isolation layers 1520 measured in meters (m). The desired value of $f_n$ can be larger than the earthquake frequency, which can be about 1 Hz. The equations above can be used to determine the number of isolation layers 1520 and the thickness of each isolation layer 1520.

The reinforcing layers 1515 can be used to increase the vertical rigidity of the seismic isolator 1500. The reinforcing layers 1515 and the isolation layers 1520 can be laminated together.

Seismic isolator 1500 can also include a screw 1530 mounted to the base 1505 and can screw into wedge 1510. A bushing 1535 can be configured to allow screw 1530 to rotate without moving in relation to the base 1505. For example, an inner surface of bushing 1535 can be threaded and can be configured to receive threads of the screw 1530. An outer surface of bushing 1535 can be smooth and can rotate within a bore of the base 1505. The bushing 1535 can have flanges on one of or both ends of bushing 1535 to prevent the bushing 1535 from moving laterally through the bore while allowing the bushing 1535 to rotate within the bore. The screw 1530, the base 1505, and the wedge 1510 can be configured (as shown in FIG. 15) such that when screw 1530 is rotated, the wedge 1510 can move across the base 1505 and be raised or lowered compared to the bottom surface of base 1505, depending upon the direction of rotation of the screw 1530.

As discussed above, a flywheel energy storage system can include a motor/generator that, in some embodiments, can be located above the housing and the rotor of the flywheel energy storage system. Thus, in such embodiments, the shaft of the motor/generator can be on the bottom of the motor/generator. In some embodiments, the end of the shaft of the motor/generator can be lubricated, even while spinning. Such lubrication can include grease. However, when spinning, the lubricant can spin off of the shaft or, when not spinning, the lubricant can drip off, due to gravity.

Figure 16:
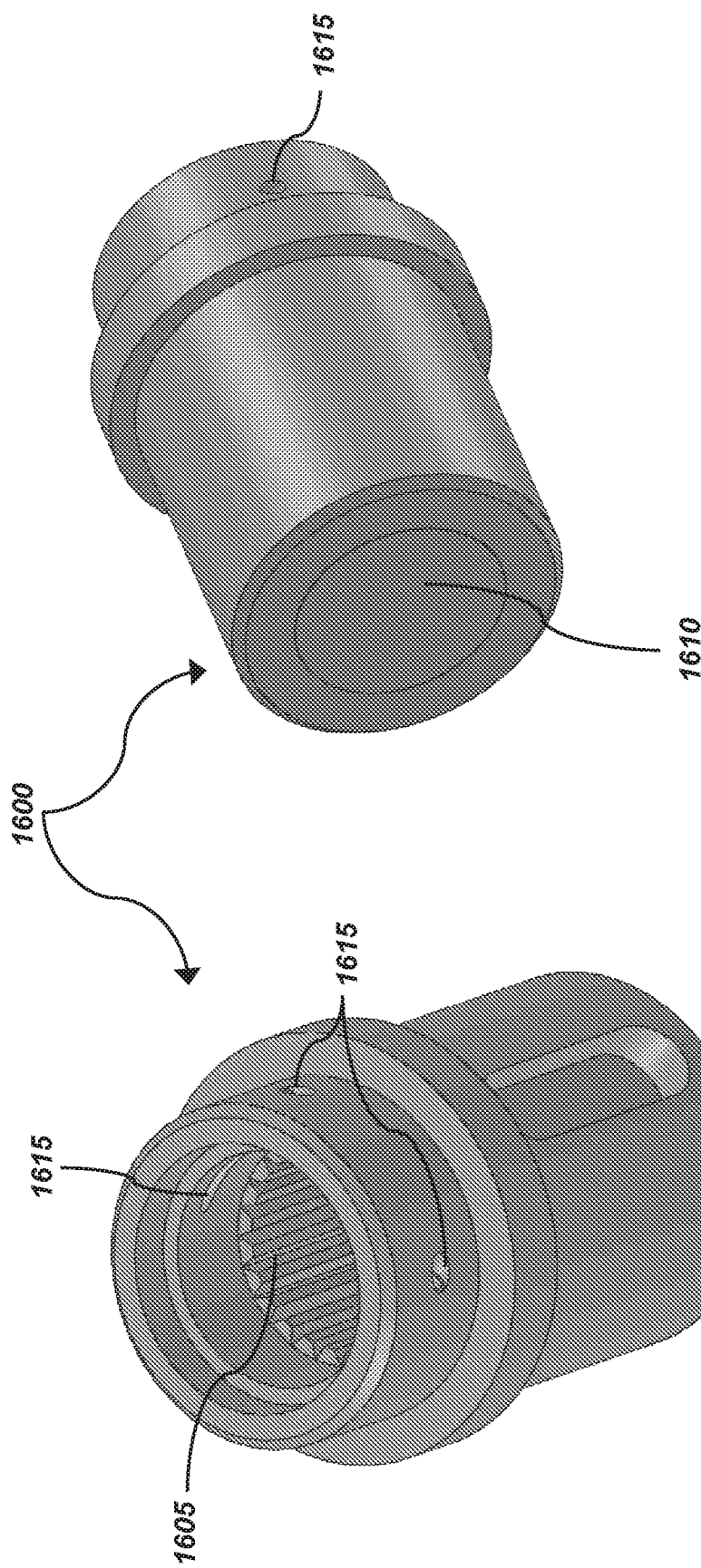
FIGS. 16a and 16b illustrate an internally splined shaft cap in accordance with an illustrative embodiment.

FIGS. 16*a* and 16*b* illustrate an internally splined shaft cap 1600 in accordance with an illustrative embodiment. In alternative embodiments, additional, fewer, and/or different features may be used. The internally splined shaft cap 1600 can be used to maintain lubricant on the shaft of the motor/generator. The internally splined shaft cap 1600 can slide over the shaft of the motor/generator, and splines 1605 can align with splines of the shaft of the motor/generator. Bottom section 1610 can be installed on the internally splined shaft cap 1600 after the internally splined shaft cap 1600 has been installed on the shaft of the motor/generator. For example, the bottom section 1610 can be welded to the internally splined shaft cap 1600. In some embodiments, the bottom section 1610 can be installed after grease or other lubrication has been applied to the shaft of the motor/generator.

Figure 17:
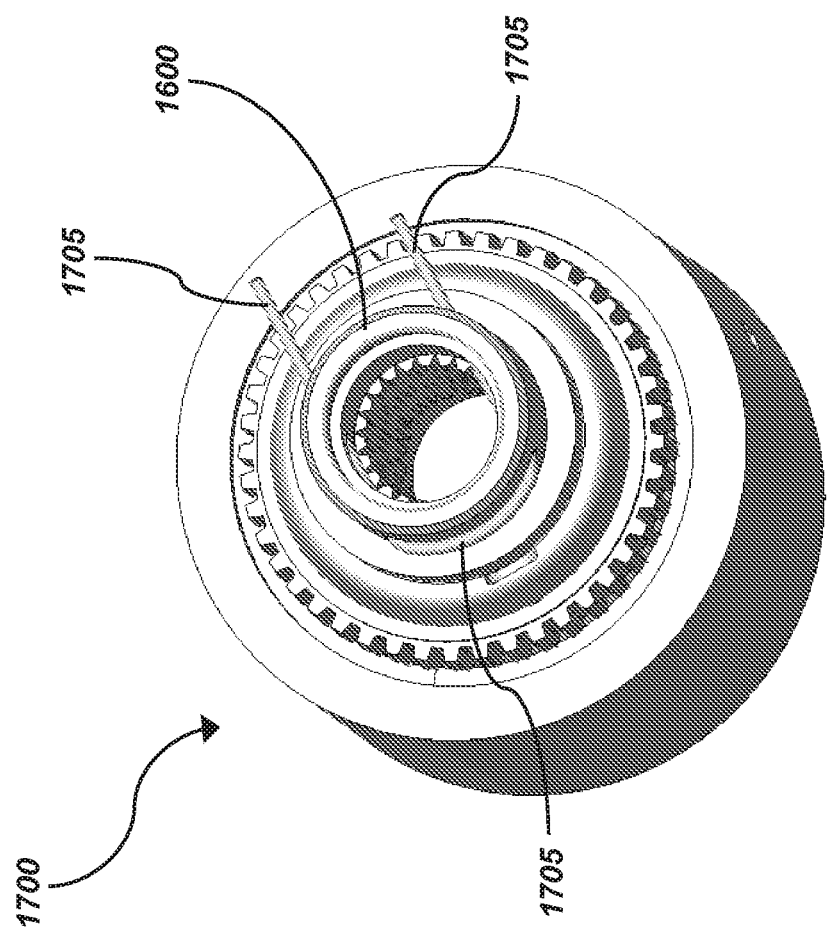
FIG. 17 illustrates a motor coupler in accordance with an illustrative embodiment.

The internally splined shaft cap 1600 can include bores 1615. The bores 1615 can extend through the walls of the internally splined shaft cap 1600. The bores 1615 can be exposed by the internal bore of the internally splined shaft cap 1600. FIG. 17 illustrates a motor coupler 1700 in accordance with an illustrative embodiment. In alternative embodiments, additional, fewer, and/or different elements can be used. The bores 1615 can be configured to accept a wire clip 1705 or other fastening material, such as a machined clip. The shaft of the motor/generator can have machined portions on opposite sides of the shaft. The machined portions can allow the wire clip to pass through the internally splined shaft cap 1600. However, the machined portions of the shaft of the motor/generator can be only on a portion of the length of the shaft. Thus, after the wire clip 1705 is installed, when gravity pulls down on the internally splined shaft cap 1600, the wire clip 1705 will hang on the machined portion of the shaft of the motor/generator and can prevent the internally splined shaft cap 1600 from falling off of the shaft of the motor/generator.

Figure 18A:
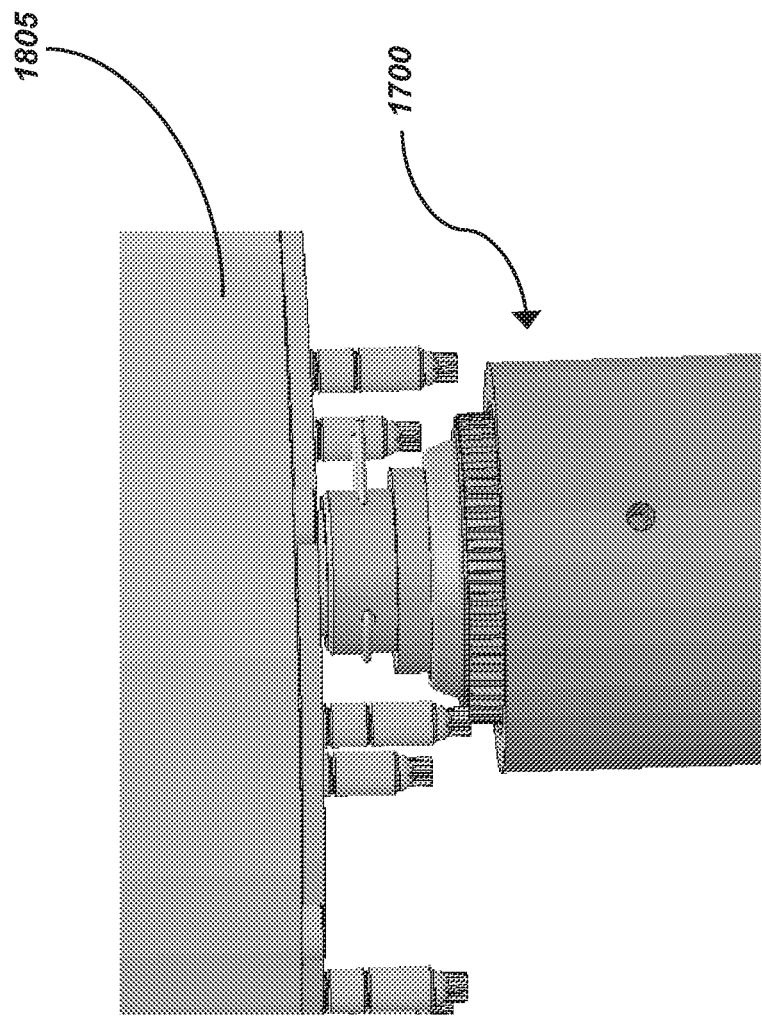
FIGS. 18a and 18b illustrate a motor coupler installed on a motor/generator in accordance with an illustrative embodiment.
Figure 18B:
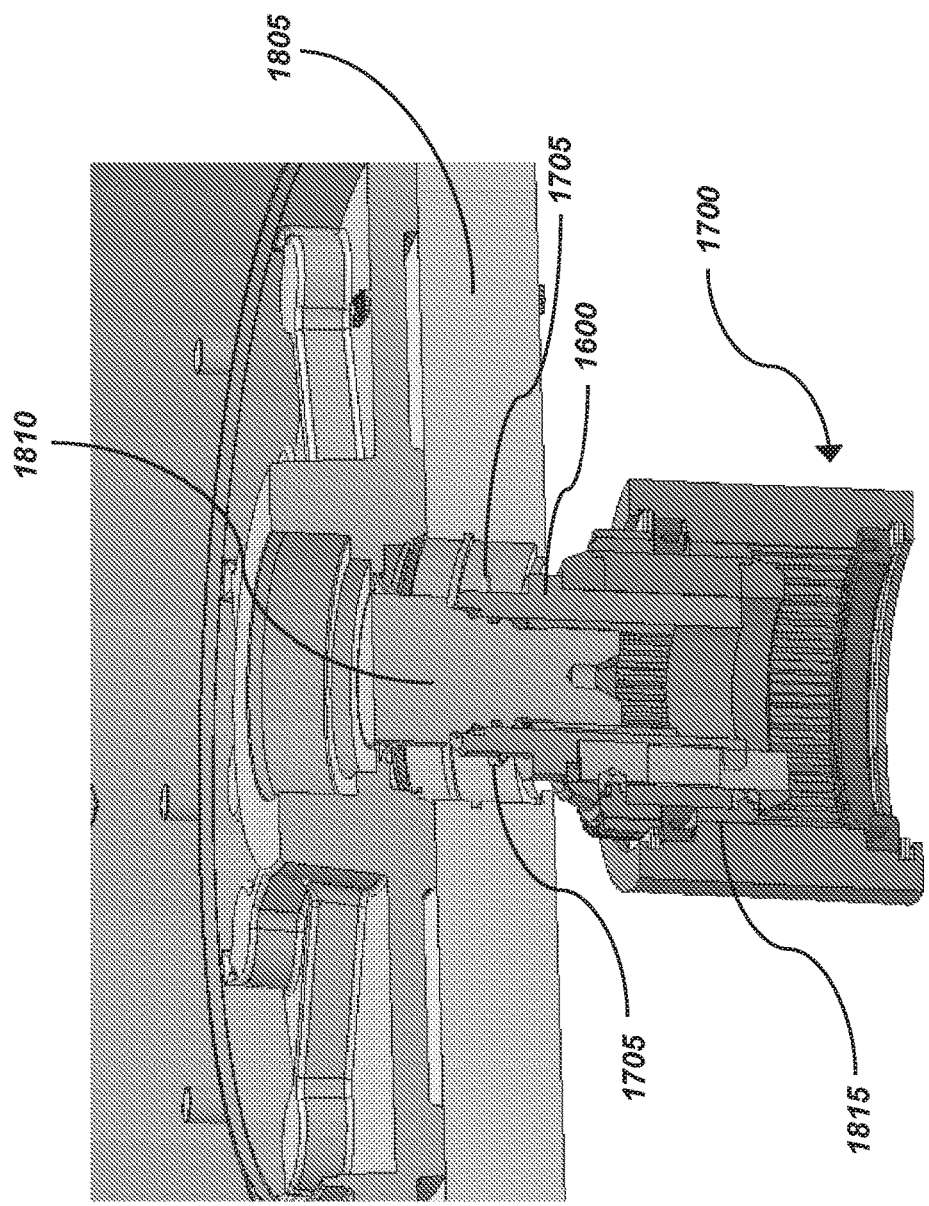

FIGS. 18*a* and 18*b* illustrate the motor coupler 1700 installed on a motor/generator in accordance with an illustrative embodiment. In alternative embodiments, additional, fewer, and/or different elements can be used. FIGS. 18*a* and 18*b* are views of the motor coupler 1700 of FIG. 17 installed on a motor 1805. FIG. 18*a* shows the outside of the motor coupler 1700, and FIG. 18*b* is a cross-sectional view of the motor coupler 1700. Motor shaft 1810 can be the shaft of the motor/generator. The motor coupler 1700 can include a coupling piece 1815 configured to couple the internally splined shaft cap 1600 with another axially rotating shaft, such as a shaft of a rotor of a flywheel energy storage system, an extension of such a rotor, a decoupling device, etc.

As noted above, a flywheel energy storage system can be configured to store energy from an electrical grid. The flywheel energy storage system, thus, can translate electrical line energy into rotational kinetic energy. For example, electrical line power can be 120 Volts (V), 240 V, 4 kV, 13 kV, 26 kV, 69 kV, 138 kV, 230 kV, 345 kV, 500 kV, 765 kV, etc. The electrical line power can have alternating current. In some embodiments, an inverter can be used to convert electrical line power into a useable electrical power form by an electric motor and/or generator. In some embodiments, the inverter can convert direct current power into a variable frequency alternating current power for use by the motor/generator. The electric motor can then translate the electrical power to rotational kinetic energy, which can be stored as kinetic energy.

Figure 20:
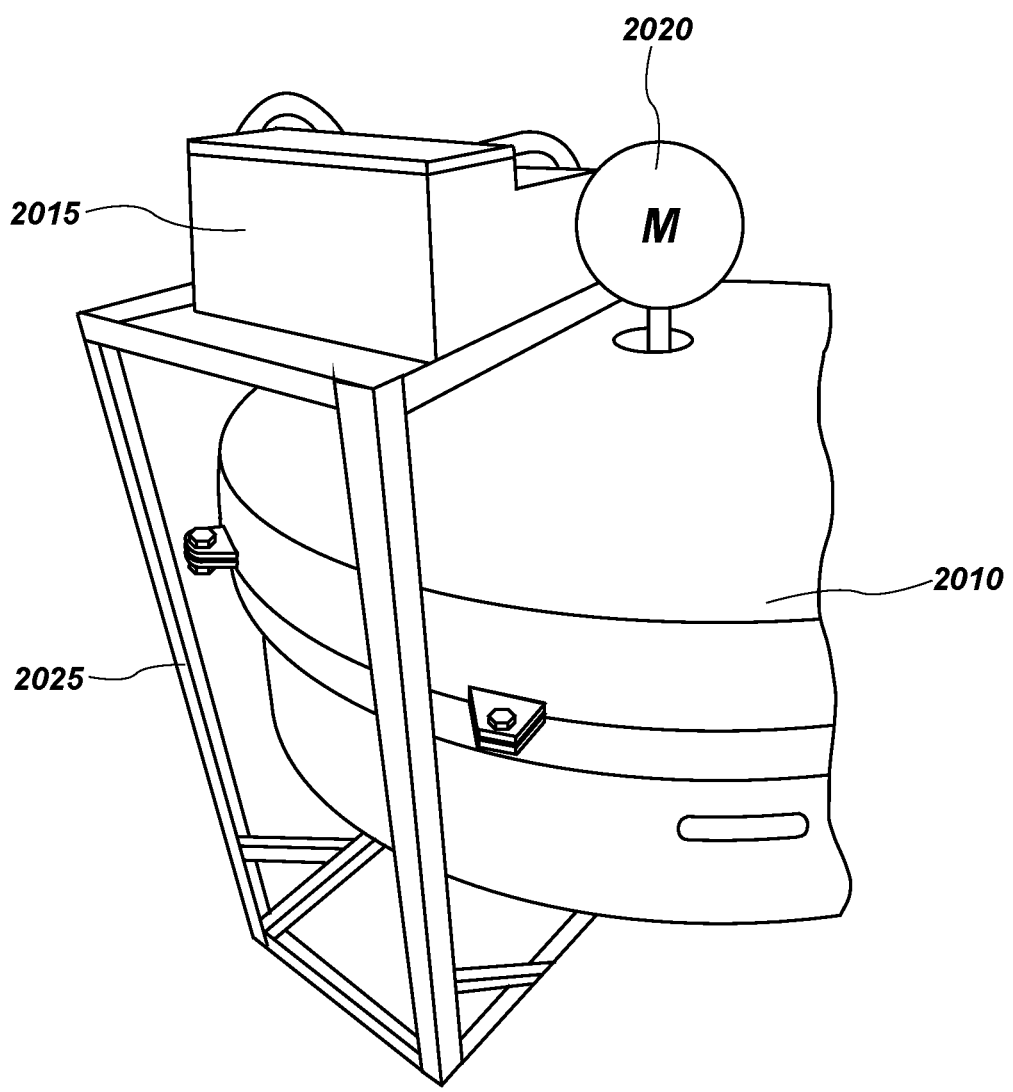
FIG. 20 illustrates a mounting location of an inverter and a housing in accordance with an illustrative embodiment.

FIG. 20 illustrates a mounting location of an inverter and a housing in accordance with an illustrative embodiment. In alternative embodiments, additional, fewer, and/or different elements can be used. In some embodiments, locating an inverter 2015 in close proximity to a motor 2020 can minimize transmission losses and electrical noise generation. However, in some embodiments, the motor 2020 can operate with vibrations that can be harmful to the inverter 2015. For example, excessive vibrations in the inverter 2015 can cause electrical shorts and/or other damage or stress. Further, if the inverter 2015 and the motor 2020 share an electrical ground, electrical noise and/or ground loops can be amplified and can affect electronics and/or overall performance.

As shown in FIG. 20, in some embodiments, inverter 2015 can be supported by a stand 2025. The stand 2025 can be structurally independent from housing 2010. Accordingly, a minimal amount of vibrations can be transferred from the housing 2010 and the motor 2020 to the inverter 2015. The stand 2025 can also be configured to locate the inverter 2015 in close proximity to the motor 2020. As shown in FIG. 20, the inverter 2015 can be located above housing 2010 and next to motor 2020. Accordingly, in some embodiments, the electrical wires connecting the inverter 2015 to the motor 2020 can be less than two feet in length each.

In some embodiments, to obtain maximum efficiency from a flywheel energy storage system, a center axis of the motor can be aligned with the center axis of the rotor. Aligning the axes of the motor and rotor can reduce the load on bearings and couplings. In some embodiments, the weight of a motor can be greater than one hundred pounds. Thus, in such embodiments, it can be difficult and time consuming to handle and accurately align the axes. Further, maintenance can require that the motor be removed from its mounting position, for example, to facilitate assembly of bearings, couplings, or other components.

Figure 21B:
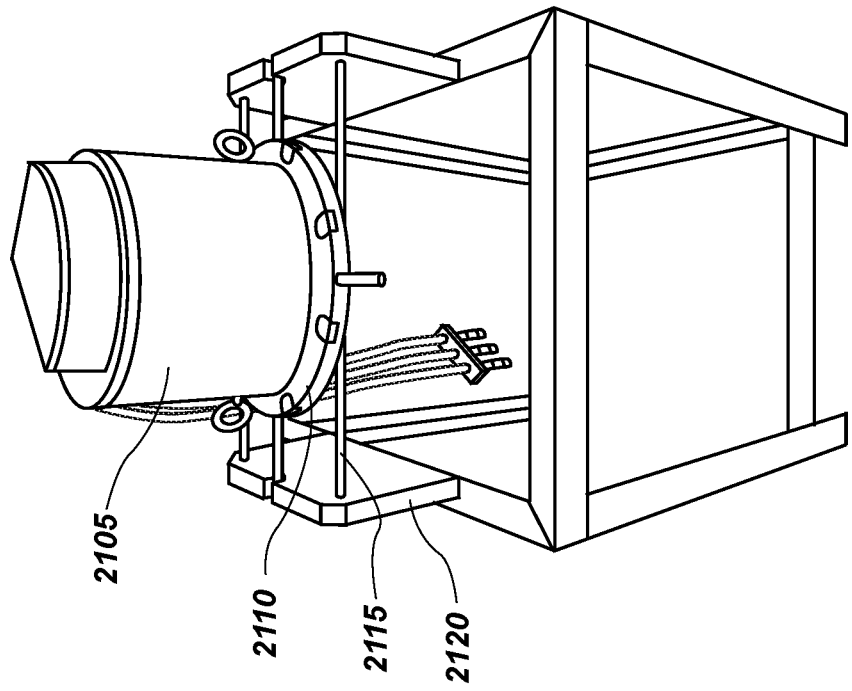
FIGS. 21a and 21b illustrate a motor mount in accordance with an illustrative embodiment.
Figure 21A:
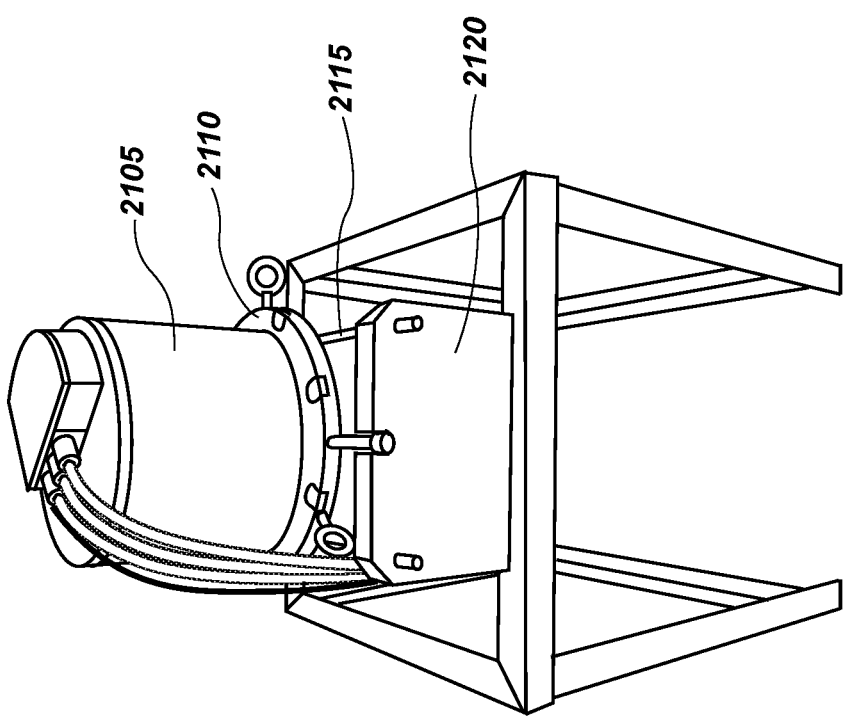

FIGS. 21a and 21b illustrate a motor mount in accordance with an illustrative embodiment. FIGS. 21a and 21b show the motor mount in views that are offset by ninety degrees. In alternative embodiments, additional, fewer, and/or different elements can be used. A motor mount can include side plates 2120, cross-members 2115, and a seat 2110 configured to support a motor 2105.

Side plates 2120 can be fixed to a housing of a flywheel energy storage system (not shown in FIGS. 21a and 21b), for example, via a weld, bolts, etc. Two or more cross-members 2115 can span the distance between two or more side plates 2120. The seat 2110 can be fixed to the cross-members 2115. A center axis of the seat 2110 can be aligned with a center axis of a rotor (not shown in FIGS. 21a and 21b). The seat 2110 can be configured to receive the motor 2105 such that an axis of the motor 2105 is also aligned with the center axis of the rotor. Thus, each time that the motor 2105 is mounted onto the seat 2110, the motor 2105 is aligned with the rotor. Seat 2110 can also include one or more fasteners that can be configured to fix the motor 2105 to the motor mount. For example, as shown in FIGS. 21a and 21b, eye bolts can be used to secure the motor 2105.

Figure 22A:
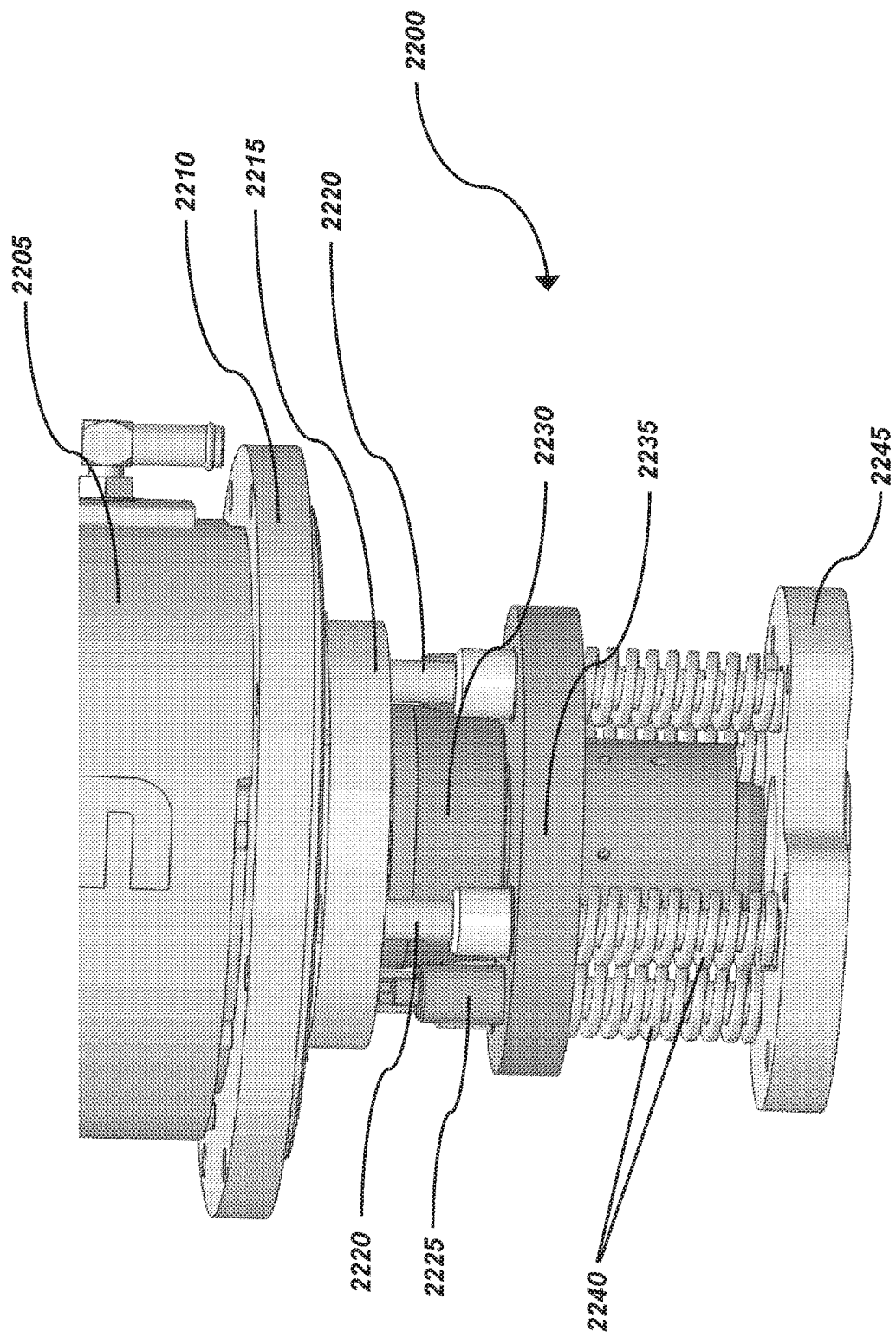
FIGS. 22a-22c illustrate a clutch system in accordance with an illustrative embodiment.
Figure 22B:
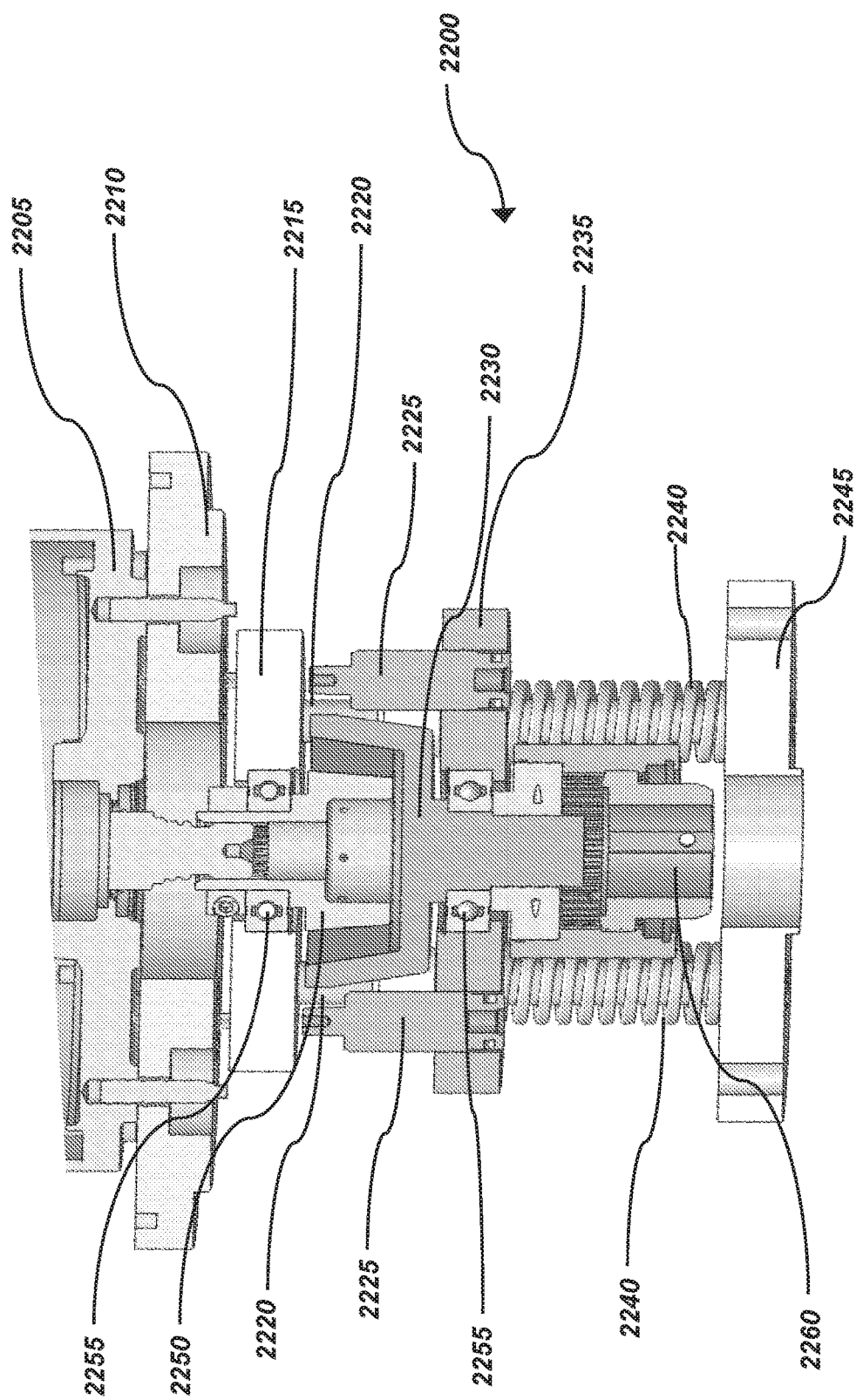
Figure 22C:
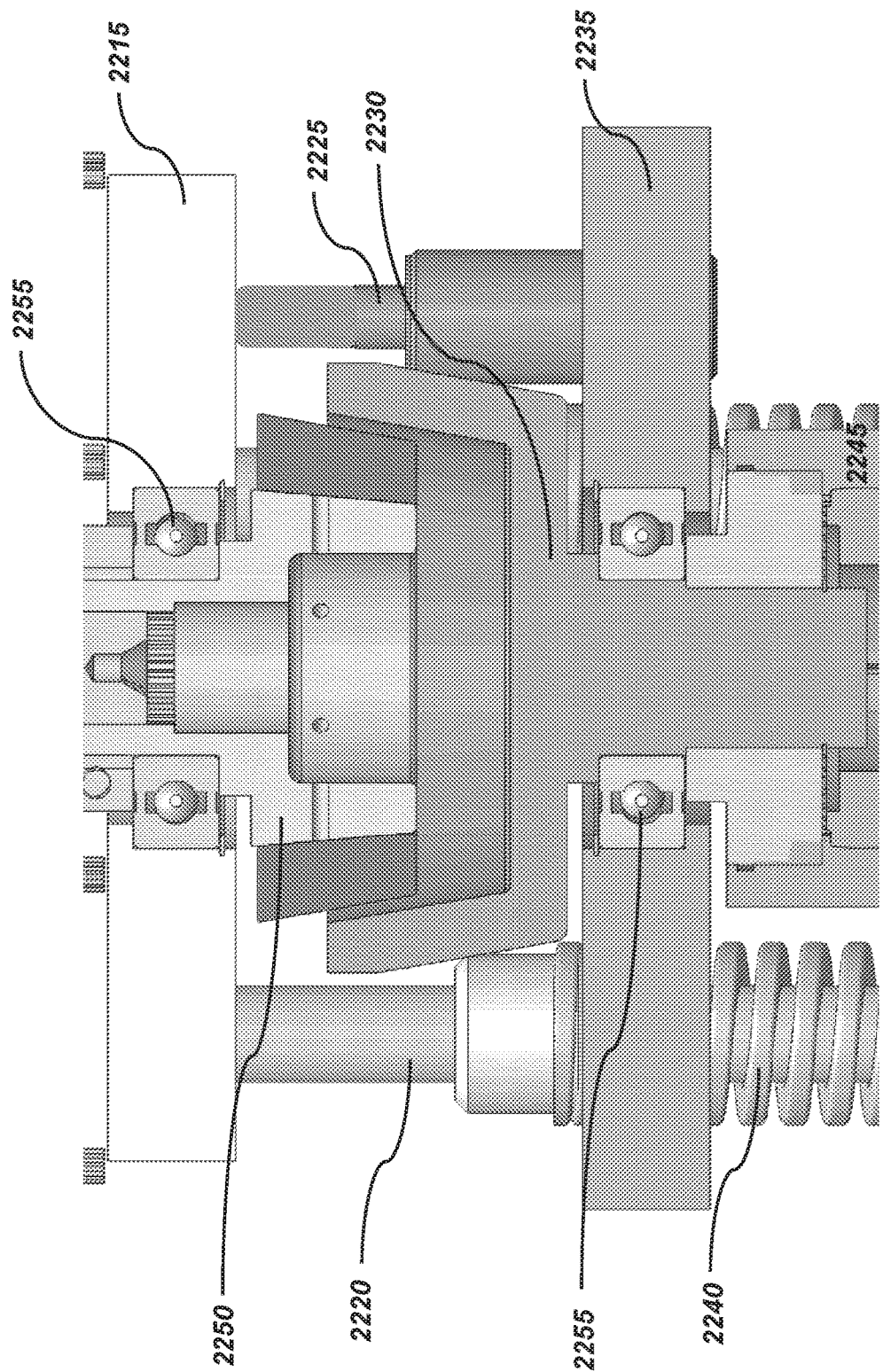

In some embodiments, the motor of a flywheel energy storage system can be decoupled from the rotor during operation. FIGS. 22a-22c illustrate a clutch system in accordance with an illustrative embodiment. FIG. 22b is a cutaway view of the outside view of FIG. 22a. FIGS. 22a and 22b show the clutch system in an engaged state. FIG. 22c shows the clutch system in a disengaged state. In alternative embodiments, additional, fewer, and/or different elements can be used. A clutch system 2200 can include a motor 2205, a motor seat 2210 (such as seat 2110), an upper base 2215, one or more shafts 2220, one or more hydraulic pistons 2225, a rotor clutch cup 2230, an intermediate base 2235, one or more springs 2240, a lower base 2245, a motor clutch cone 2250, one or more sets of bearings 2255, and a coupler 2260.

The clutch system 2200 can be configured to selectively engage and disengage the motor 2205 with the rotor (not shown) connected via coupler 2260. FIGS. 22a and 22b show the clutch system 2200 in a position that engages the motor 2205 and the rotor. FIG. 22c shows the clutch system 2200 in a position that disengages the motor 2205 and the rotor. Compared to the FIGS. 22a and 22b, the hydraulic piston 2225 is extended and there is a gap between the motor clutch cone 2250 and the rotor clutch cup 2230. The upper base 2215, the intermediate base 2235, and the lower base 2245 can be rigidly fixed to a housing of the flywheel energy storage system. Thus, the upper base 2215, the intermediate base 2235, and the lower base 2245 do not rotate with the motor 2205 and or the rotor.

Attached to a shaft of the motor 2205 can be the motor clutch cone 2250. The motor clutch cone 2250 can be configured to be received by the rotor clutch cup 2230. The mating surfaces of the motor clutch cone 2250 and the rotor clutch cup 2230 can be frictional surfaces such that when the motor clutch cone 2250 and the rotor clutch cup 2230 are pressed together, the motor 2205 shaft and the rotor are rotationally fixed and spin together. The rotor clutch cup 2230 can be configured to move away from (down) the motor clutch cone 2250 such that the mating surfaces of the motor clutch cone 2250 and the rotor clutch cup 2230 are not engaged and the shaft of the motor 2205 and the rotor can spin independently from one another.

The upper base 2215 and the lower base 2245 can be separated by and rigidly fixed to shafts 2220. Thus, the upper base 2215 and the lower base 2245 do not move in relation to one another. The intermediate base 2235 can be configured to move vertically between the upper base 2215 and the lower base 2245 along shafts 2220. Springs 2240 can be configured to provide an upward vertical force on the intermediate base 2235 sufficient to press together the rotor clutch cup 2230 and the motor clutch cone 2250 such that the shaft of the motor 2205 and the rotor spin together. As shown in FIG. 22b, the intermediate base 2235 can be annularly shaped with an inside bore. Within the inside bore of the intermediate base 2235 can be bearings 2255 and the rotor clutch cup 2230. The bearings 2255 can allow the rotor clutch cup to spin within the intermediate base 2235. The coupler 2260 can be configured to rotationally couple the rotor clutch cup 2230 and the rotor (not shown in FIG. 22b) but allow the rotor clutch cup 2230 to move vertically. The coupler 2260 can slide along a shaft of the rotor. The intermediate base 2235, bearings 2255, rotor clutch cup 2230, and the coupler 2260 can move vertically together as a unit.

As shown in FIG. 22b, one or more hydraulic pistons 2225 can be mounted between the intermediate base 2235 and the upper base 2215. The hydraulic pistons 2225 can be configured to provide a force to push the intermediate base 2235 and the upper base 2215 apart. Accordingly, the hydraulic pistons 2225 can provide a force to overcome the force of the springs 2240, which push the intermediate base 2235 toward the upper base 2215. FIGS. 22a and 22b show the hydraulic pistons 2225 in a compressed state. When hydraulic pistons 2225 are extended, the intermediate base 2235 and, thus, the rotor clutch cup 2230 move away from the motor clutch cone 2250 and the motor 2205 shaft and the rotor are rotationally disengaged. Hydraulic pistons 2225 can be retracted, thereby engaging the rotor and the motor 2205.

Figure 23:
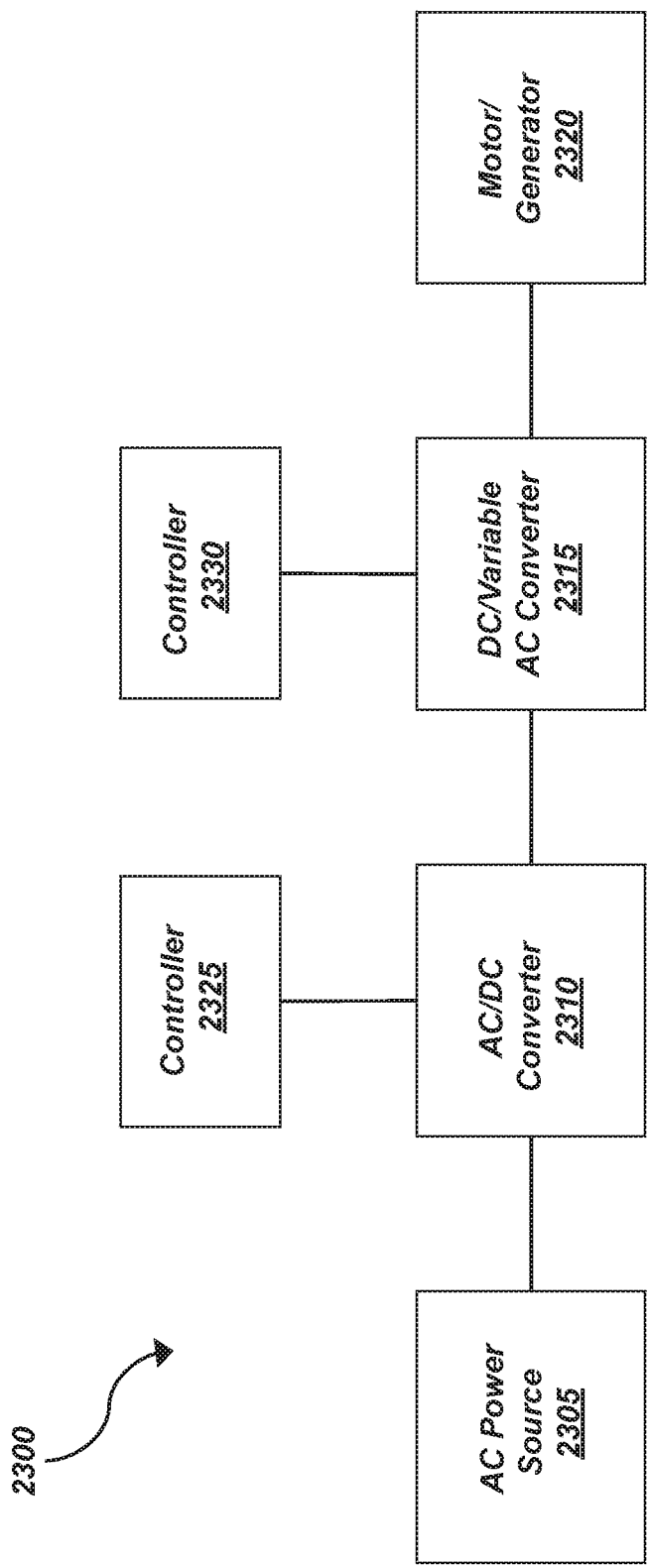
FIG. 23 is a block diagram of a power conversion system in accordance with an illustrative embodiment.

As mentioned above, a flywheel energy storage system can store energy received from an electrical power source, such as an electrical power grid, and can provide energy to the electrical power grid. FIG. 23 is a block diagram of a power conversion system in accordance with an illustrative embodiment. In alternative embodiments, additional, fewer, and/or different elements can be used. Further, the use of a block diagram is not meant to be limiting with respect to the connections between blocks. A power conversion system 2300 can include an alternating current (AC) power source 2305, an AC/direct current (DC) converter 2310, a DC/variable AC converter 2315, a motor/generator 2320, a controller 2325, and a controller 2330. The power conversion system 2300 can be configured to transfer energy from the AC power source 2305 to the motor/generator 2320 and from motor/generator 2320 to the AC power source 2305.

The AC power source 2305 can be, for example, line power from an AC power grid. For example, electrical line power can be 120 Volts (V), 240 V, 480 V, 4 kV, 13 kV, 26 kV, 69 kV, 138 kV, 230 kV, 345 kV, 500 kV, 765 kV, etc. In some embodiments, the AC power grid can be three-phase. In other embodiments, the AC power can be in any suitable form. In some embodiments, the AC power source 2305 can be AC power received from a solar energy to an AC power converting device.

The AC/DC converter 2310 can be electrically connected to the AC power source 2305. When energy is transferred into the flywheel energy storage system, the AC/DC converter 2310 can be configured to convert the AC power from the AC power source 2305 into DC power. The DC power can be any suitable form, such as 900 V. When energy is transferred from the flywheel energy storage system to the AC power source 2305, the AC/DC converter can be configured to convert DC power into AC power that is compatible with the AC power of the AC power source 2305.

The AC/DC converter 2310 can include high efficiency transistors such as silicon carbide metal-oxide-semiconductor field-effect transistors (MOSFET). The transistors can be switched at a high, constant frequency (e.g., greater than 30 kHz). By using high efficiency transistors switched at a high, constant frequency, electrical and mechanical noise can be reduced. For example, a traditional AC/DC converter can have about 3 amperes of electrical noise amplitude, but by using high efficiency transistors switched at a high, constant frequency, the electrical noise can be reduced to 0.3 ampere. Similarly, mechanical noise of about 60 decibels (dB) can be reduced to about 20 dB. Further, conversion efficiency can be increased, thereby reducing conversion losses and heat. Conversion efficiency can be increased from about 94% efficient to about 98% efficient. Additionally, because a constant switching frequency is used, electrical noise in the system can be identified, targeted, and isolated using appropriate electrical filters. The switching transistors can be controlled by controller 2325.

The AC/DC converter 2310 can be electrically connected to the DC/variable AC converter 2315. The more energy that is stored in a flywheel, the faster the flywheel (or rotor) spins. Thus, a variable speed motor can be used to transfer electrical energy into kinetic energy and to transfer kinetic energy into electrical energy. The speed of the motor/generator 2320 can match the speed of the flywheel. One method of varying the speed of the motor/generator 2320 is to vary the frequency of the power used to drive the motor/generator 2320. Similarly, when transferring energy from the flywheel into electrical energy, the speed of the flywheel can slow down as the momentum of the flywheel is converted into electricity and, therefore, the speed of the motor/generator 2320 can slow down. Accordingly, the frequency of the power output by the motor/generator 2320 can change along with the change in speed.

The DC/variable AC converter 2315 can be configured to convert DC power from the AC/DC converter 2310 into AC power for the motor/generator 2320. The AC power for the motor/generator 2320 can be of a frequency that matches the speed of the motor/generator 2320 and/or the flywheel. Thus, the frequency of the AC power on the motor/generator 2320 side of the DC/variable AC converter 2315 can vary. The DC/variable AC converter 2315 can also be configured to receive AC power from the motor/generator 2320, which can vary based on the rotational speed of the motor/generator 2320, into DC power that is compatible with the DC power of the AC/DC converter 2310.

The DC/variable AC converter 2315 can include high efficiency transistors such as silicon carbide MOSFETs. The transistors can be controlled via controller 2330. In some embodiments, controller 2325 and controller 2330 can be the same device. In some embodiments, pulse width modulation (PWM) can be used to convert DC power to variable frequency AC power and to convert variable frequency AC power into DC power. In some embodiments, the transistors are cycled from an ON state to an OFF state at regular intervals. That is, the total time for each transistor for a single ON/OFF cycle can be constant. Thus, for example, when converting DC to AC, the amount of time that each transistor is in the ON state can determine the output AC power frequency, current, etc. Accordingly, the longer that the transistors are in the ON state, the less time the transistors are in the OFF state.

Such a method can be described as pulse width modulation. Pulse width modulation can create harmonics and electrical noise in the electrical system (e.g., on both the DC side and the AC side) that can vary based on the amount of power and/or the frequency of the AC power side. When one or more pulse width modulation devices (e.g., AC/DC converter 2310, or other DC/variable AC converter 2315 of other flywheel energy storage systems) are used in a system, electrical noise and losses can increase. Further, because the harmonics and noise can vary based on the instantaneous pulse width, it can be difficult to identify and filter the harmonics and/or noise out of the system.

Accordingly, in some embodiments, transistors of the DC/variable AC converter 2315 can be switched using frequency modulation. That is, each transistor can be turned ON for a fixed time. The fixed time can depend on the frequency of the electrical signal. For example, for a frequency of 12.5 kHz, the ON time can be 40 microseconds at a 50% power level. To alter the AC frequency power and/or frequency, the frequency that each transistor is turned ON can be appropriately modified. That is, the amount of time that each transistor is OFF can be altered. Using frequency modulation, system noise and harmonics can be more readily identified and reduced (e.g., via electrical filters).

Motor/generator 2320 can be a motor in that the motor/generator 2320 can convert electrical energy into rotational energy, and the motor/generator 2320 can be a generator in that the motor/generator 2320 can convert rotational energy into electrical energy. Motor/generator 2320 can be a single device (e.g., one shaft and one set of electrical coils). In alternative embodiments, motor/generator 2320 can include a motor device and a generator device. Motor/generator 2320 can be a variable speed motor/generator, as described above. Motor/generator 2320 can use single phase, 2-phase, 3-phase, etc., power.

Figure 24A:
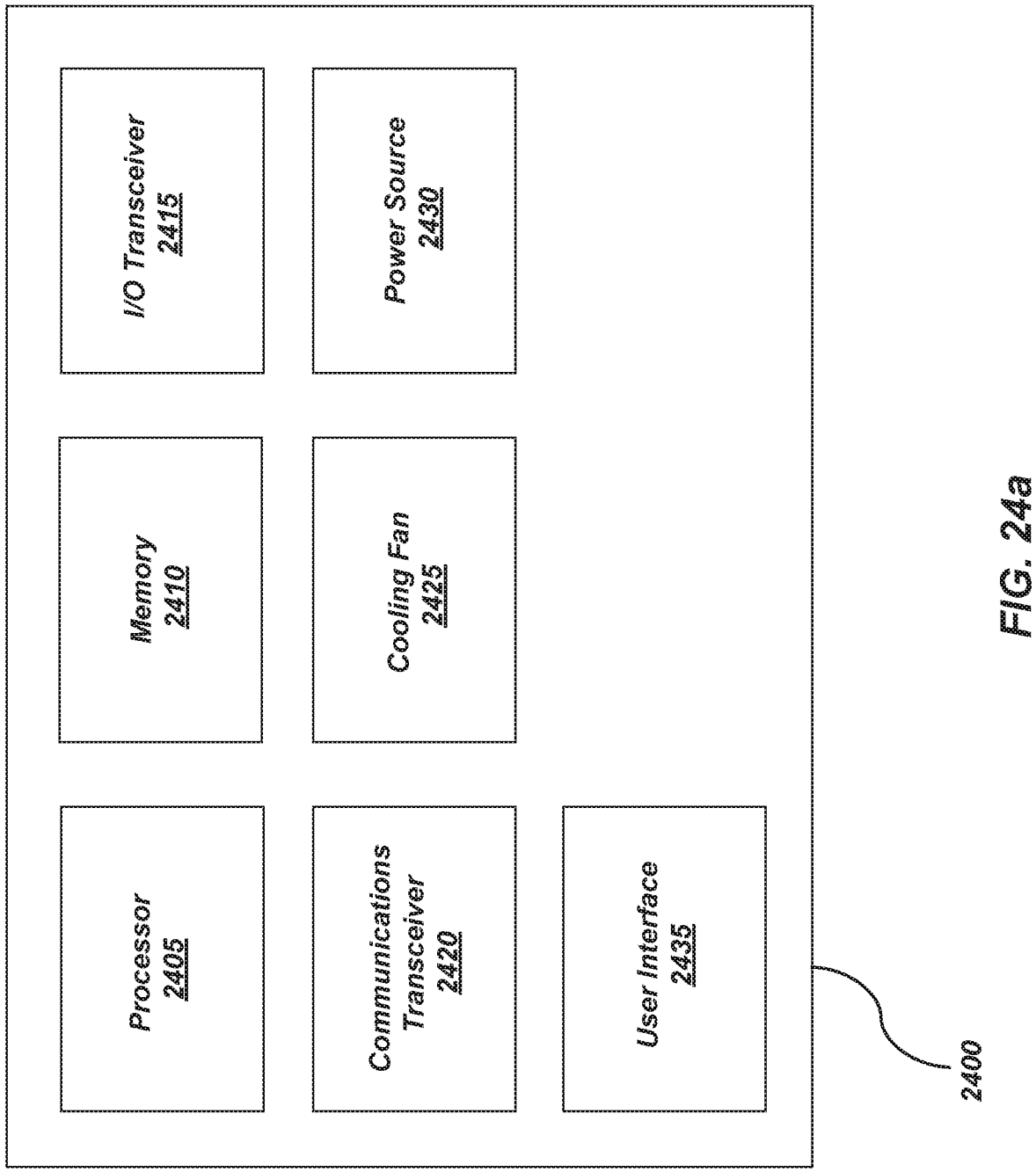
FIG. 24a is a block diagram of a controller in accordance with an illustrative embodiment.

As mentioned, various aspects of a flywheel energy storage system can be controlled, monitored, communicated with, etc., with one or more controllers. FIG. 24a is a block diagram of a controller in accordance with an illustrative embodiment. In alternative embodiments, additional, fewer, and/or different elements may be used. A controller 2400 can include a processor 2405, a memory 2410, an input and/or output (I/O) transceiver 2415, a communications transceiver 2420, a cooling fan 2425, a power source 2430, and a user interface 2435. A flywheel energy storage system can use one or more controllers 2400 to control and/or monitor the various components of the flywheel energy storage system.

In some embodiments, controller 2400 can include processor 2405. Processor 2405 can be configured to carry out and/or cause to be carried out one or more operations described herein. Processor 2405 can execute instructions as known to those skilled in the art. The instructions may be carried out by one or more special purpose computers, logic circuits (e.g., programmable logic circuits (PLC)), and/or hardware circuits. Thus, processor 2405 may be implemented in hardware, firmware, software, or any combination of these methods. The term "execution" is the process of running an application or the carrying out of the operation called for by an instruction. The instructions may be written using one or more programming language, scripting language, assembly language, etc. Processor 2405 executes an instruction, meaning that it performs the operations called for by that instruction. Processor 2405 operably couples with memory 2410, communications transceiver 2420, I/O transceiver 2415, power source 2430, user interface 2435, etc., to receive, to send, and to process information and to control the operations of the controller 2400. Processor 2405 may retrieve a set of instructions from a permanent memory device such as a read-only memory (ROM) device and copy the instructions in an executable form to a temporary memory device that is generally some form of random-access memory (RAM). Controller 2400 may include a plurality of processors that use the same or a different processing technology. In an illustrative embodiment, the instructions may be stored in memory 2410.

In some embodiments, controller 2400 can include memory 2410. Memory 2410 can be an electronic holding place or storage for information so that the information can be accessed by processor 2405 as known to those skilled in the art. Memory 2410 can include, but is not limited to, any type of random-access memory (RAM), any type of read-only memory (ROM), any type of Flash memory, etc., such as magnetic storage devices (e.g., hard disk, floppy disk, magnetic strips, etc.), optical discs (e.g., compact disc (CD), digital versatile disc (DVD), etc.), smart cards, Flash memory devices, etc. Controller 2400 may have one or more computer-readable media that use the same or a different memory media technology. Controller 2400 may have one or more drives that support the loading of a memory medium such as a CD, a DVD, a Flash memory card, etc.

In some embodiments, controller 2400 can include a communications transceiver 2420. Communications transceiver 2420 can be configured to receive and/or transmit information. In some embodiments, communications transceiver 2420 can communicate information via a wired connection, such as an Ethernet connection, one or more twisted pair wires, coaxial cables, fiber optic cables, etc. In some embodiments, communications transceiver 2420 can communicate information via a wireless connection using microwaves, infrared waves, radio waves, spread spectrum technologies, satellites, etc. Communications transceiver 2420 can be configured to communicate with another device using cellular networks, local area networks, wide area networks, the Internet, etc. In some embodiments, one or more of the elements of controller 2400 communicate via wired or wireless communications. Communications transceiver 2420 can be used to transmit information to a remote database. Such information can include a historical record of measurements, commands, errors, faults, etc. In some embodiments, communications transceiver 2420 can be configured to transmit status information to another communications device, such as a server or other computing device that can allow for remote control of controller 2400. Communications transceiver 2420 can be used to transmit information to a human machine interface (HMI), a supervisory control and data acquisition (SCADA) system, operations management and production information management software, etc.

In some embodiments, controller 2400 can include an I/O transceiver 2415. The I/O transceiver 2415 can be configured to communicate with and/or receive information from one or more sensors, devices, etc. The I/O transceiver 2415 can further be configured to transmit information to automated valves, motors, actuators, etc. The I/O transceiver 2415 can be configured to send and transmit discrete information, analog information, digital information, etc. The I/O transceiver can include multiple cards and/or communication ports.

In some embodiments, controller 2400 can include one or more cooling fans 2425. Controller 2400 can further include one or more sensors configured to sense a temperature of one or more parts of controller 2400 and/or an ambient temperature of controller 2400. Cooling fans 2425 can be configured to circulate air to cool components of controller 2400. In some embodiments, a liquid cooling system can be used with cooling fans 2425. For example, cooling fans 2425 can be configured to push air through a radiator. Liquid can be configured to transfer heat from one or more electrical components to the radiator.

In some embodiments, controller 2400 can include power source 2430. Power source 2430 can be configured to provide electrical power to one or more elements of controller 2400. In some embodiments, power source 2430 can include an alternating power source, such as available line voltage (e.g., 120 Volts alternating current at 60 Hertz in the United States). Power source 2430 can include one or more transformers, rectifiers, etc., to convert electrical power into power useable by the one or more elements of controller 2400, such as 1.5 Volts, 8 Volts, 12 Volts, 24 Volts, etc. Power source 2430 can include one or more batteries.

In some embodiments, controller 2400 can include user interface 2435. User interface 2435 can be configured to receive and/or provide information from/to a user. User interface 2435 can be any user interface known in the art. User interface 2435 can be an interface for receiving user input and/or machine instructions for entry into controller 2400, as known to those skilled in the art. User interface 2435 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc., to allow an external source, such as a user, to enter information into controller 2400. User interface 2435 can be used to navigate menus, adjust options, adjust settings, adjust display, etc.

User interface 2435 can be configured to provide an interface for presenting information from controller 2400 to external systems, users, or memory. For example, user interface 2435 can include an interface for a display, a printer, a speaker, alarm/indicator lights, a network interface, a disk drive, a computer memory device, etc. User interface 2435 can include a color display, a cathode-ray tube (CRT), a liquid crystal display (LCD), a plasma display, an organic light-emitting diode (OLED) display, etc.

Controller 2400 can be configured to detect when a sensor malfunction occurs. Inaccurate or false readings can lead to premature wear and/or degradation of one or more parts of a flywheel energy storage system. Sensor malfunctions can be caused by a variety of factors, for example, electrical noise, environmental hazards, physical damage, corrosion, circuit degradation, device degradation, etc.

Various methods can be used to determine whether a sensor is functional and operating properly. For example, range limits can be set. If a sensor provides a reading that is outside of the range limits, the controller 2400 can determine that the sensor is malfunctioning. The range limits can be set to limits that are within a predictable limit. For example, if a load cell is configured to measure the load on a bearing, which is expected to be within 0-400 lbs, where 400 lbs is the upper limit of what the load cell is expected to read even if the system is not operating ideally, then a reading of 4,000 lbs from the load cell can indicate that the sensor is malfunctioning. Similarly, a reading of −300 lbs can indicate that the sensor is malfunctioning. In some embodiments, any reading that is outside of the range limits can be used to determine that the sensor is malfunctioning. In other embodiments, a reading that is outside a predetermined threshold (e.g., 110% of the maximum expected reading)

can be used to determine that the sensor is malfunctioning. Although load cells are used in this example, such a technique can be used with any type of sensor, such as pressure transducers, temperature detectors, vacuum detectors, accelerometers, displacement gauges, etc.

In some embodiments, sensors can be configured to send information to the controller 2400. The controller 2400 can be configured to monitor the frequency of information sent to the controller 2400 by each sensor. For example, a sensor can be configured to transmit information to the controller 2400 once every millisecond. If the controller 2400 receives information from the sensor once every millisecond for, for example, five days, and then receives information from the sensor once a second, the controller 2400 can determine that the sensor is malfunctioning. Any suitable delay in expected information can be used, for example, less than a millisecond, one millisecond, two milliseconds, ten milliseconds, one second, one minute, etc.

In some embodiments, one sensor reading can be verified by one or more other sensor readings. For example, two pressure transducers can each measure vacuum of a housing. If the readings from the two pressure transducers are similar or within a tolerance range (and there is no other indication of failure), then the controller 2400 can determine that the two pressure transducers are operating properly. If the two readings from the pressure transducers do not match, then the controller 2400 can determine that one or both of the pressure transducers are not operating properly.

In another example, an oil flow sensor reading can be verified by calculating expected oil flow based on other sensors, such as pressure sensors, temperature sensors, whether a pump is on, etc. In other examples, hydraulic pressure of a piston configured to lift a rotor and load cells on upper bearings can be used to verify each other; magnetic flux strength, load cells, and electromagnet current can be used to verify each other; electrical relays and current meters can be used to verify each other; rotational speed sensors and accelerometers can be used to verify each other; etc.

In some embodiments, a variance in sensor readings can be used to determine sensor malfunction. For example, a pressure transducer can, for a time, indicate that a housing pressure is 15 inches of mercury (in. Hg), plus or minus 0.5 in. Hg. Thus, the reading from the pressure transducer can range from 14.5 in. Hg to 15.5 in. Hg and can fluctuate. However, if the pressure transducer sends a signal indicating exactly 14.7 in. Hg for, for example, one second, the controller 2400 can be configured to determine that the pressure transducer is malfunctioning. That is, the controller 2400 would expect the pressure reading to fluctuate several times within the one second and, when the pressure reading does not fluctuate, the controller 2400 can determine that a malfunction has occurred.

One or more sensors can be used to control one or more devices. For example, a pressure transducer can be configured to measure the vacuum of a housing. Based on the reading from the pressure transducer, controller 2400 can turn on and off a vacuum pump configured to create a vacuum inside the housing. That is, if the pressure inside the housing is above an upper threshold, based on the reading from the pressure transducer, the controller 2400 can turn the vacuum pump on to reduce the pressure in the housing. Similarly, once the pressure in the housing is below a lower threshold, the controller 2400 can turn the vacuum pump off. Such a system is a closed loop. That is, the controller 2400 is configured to turn on and off a vacuum pump based on readings from a pressure transducer such that the pressure inside the housing is at a set point and/or within an upper threshold and a lower threshold. Although the previous example uses a pressure transducer and a vacuum pump, any closed loop system can be used.

If controller 2400 determines that a sensor is malfunctioning, the controller 2400 can switch a control loop using the sensor from a closed loop to an open loop. With a malfunctioning sensor, a closed loop can be more stable and/or safer. In an open loop, the controller 2400 can no longer control based on the sensor reading. Using the example above, if the pressure transducer malfunctions, the controller 2400 can turn the vacuum pump off and leave the vacuum pump off.

Controller 2400 can be configured to determine one or more efficiency measurements and/or data points. The efficiency measurements can be used to assess system performance, degradation, and component performance and can be used to determine optimal performance parameters as well as diagnosing impending wear and/or failure of subsystems and components.

System and/or component efficiency can be determined dynamically and/or in real time. Information gathered by the one or more sensors of the system can be used to calculate efficiencies. Further, the information gathered by the one or more sensors can be used to trigger alerts, warnings, etc., and can be displayed on a user interface, stored in a system historian, etc.

The controller 2400 can be configured to calculate equations based on theoretical system efficiencies and calculate the expected loss from each of the various components and/or processes. Information received from the one or more sensors can be compared against the theoretical and/or expected calculations to determine whether the system is operating as expected or if one or more components is degraded, worn out, malfunctioning, destroyed, etc.

For example, the aerodynamic drag power loss expected by the spinning flywheel (relative to the measured drag power loss at 6350 rpm) can be determined by the following equation:

$$P_{drag} = 1.444 p \left( \frac{w^2}{6350^2} \right)$$

$P_{drag}$ is the expected aerodynamic drag force on the flywheel in kilowatts (kW), p is the pressure within the housing measured in millibar, and w is the rotational speed of the rotor in revolutions per minute.

The expected heat flux loss with oil used to transfer heat can be determined by the following equation:

$$Q = \frac{\dot{V}}{2}(.0615)(1.858)(\Delta T)$$

Q is the expected heat flux loss in watts (W), $\dot{V}$ is the oil flow rate in gallons per minute, $\Delta T$ is the difference between the temperature of the oil input to the bearings and the temperature of the oil output by the bearings in degrees Celsius.

The controller 2400 can track the amount of energy consumed by various components such as a radiator fan, a cooling pump, a hydraulic pump, a vacuum pump, an electromagnet, power consumption of the controller 2400, etc. Such components consume power that can be considered to be parasitic losses to the flywheel energy storage system. The instantaneous voltage and current consumed by such components can be integrated continuously to determine the power consumed. The controller 2400 can be configured to track metrics of various systems, subsystems, components, etc. Such metrics can be used, for example, to determine when maintenance should be performed.

Such metrics can also be used to trigger system alerts. One or more users (e.g., operators) can be alerted if a system or component falls outside of an acceptable threshold. The alert can notify, for example, the manufacturer or operator of malfunctions so that, for example, repairs can be performed.

Such metrics can be used to log data in a historian. The historian can be, for example, a database or server that is located remotely from the flywheel energy storage system. In alternative embodiments, the historian can be local. The historian can include data from multiple flywheel energy storage systems. Such data can be used to determine causes of failures, performance of components over time, etc.

By tracking various processes and/or components, the lifespan of components can be predicted. For example, if a system malfunction occurs and bearings undergo abnormally high stress, the expected life of the bearings can be reduced. Accordingly, one or more users can be alerted that the bearings should be replaced earlier than normal. Thus, the residual life of various components can be determined by the controller 2400 by tracking data received by the one or more sensors. By identifying premature wear of components, preventative maintenance can be performed, thereby reducing the number of complete/catastrophic failures that lead to downtime and/or unscheduled maintenance.

The controller 2400 can include a setup mode. The setup mode can provide a step-by-step method to calibrate a flywheel energy storage system and/or the various components. The controller 2400 can communicate with a technician through, for example, user interface 2435. For example, user interface 2435 can be a portable computing device such as a laptop computer, a smartphone, a tablet, etc. The user interface 2435 can include text, images, pictures, audio, video, etc., to communicate to/with the technician. The setup mode can be configured to walk a technician through proper setup of flywheel/rotor gap size, hydraulic and/or oil valve positions, oil pressure, etc. Such instructions can include a calibration and/or tuning mode that can assist technicians with such tasks. The setup mode can be an independent mode from an operational mode.

The setup mode can walk a technician through one or more calibration and/or tuning methods. The controller 2400 can be configured to be interactive such that the next step in the method can be determined by the result of the previous method. Accordingly, the calibration and/or tuning steps can be different for different flywheel energy storage systems depending upon which components are used, the state of such components (e.g., whether the components were properly installed and/or working properly), etc.

In some embodiments, one or more calibrations and/or tuning can be performed automatically by the controller 2400 without any user input. For example, for calibrating a load cell, the controller 2400 can be configured to remove the load (e.g., the rotor) from the load cell to determine a zero reference point. Further, the controller 2400 can be configured to put the load cell under the load of the rotor to determine a load reference point. Based on the zero reference point and the load reference point, the controller 2400 can determine a relationship slope and offset for the load cell output curve. Further, the controller 2400 can be configured to monitor the output of one or more sensors to determine whether the one or more sensors should be recalibrated.

As noted above, a data historian can be used to store historical information regarding sensor readings, input and output values of the controller 2400, programming modes, system status, etc. The data historian can have one or more elements illustrated in FIG. 24*a* such as a processor, memory, communications transceiver, etc. Such information can be used to discover subtle anomalies that can be difficult to discover by viewing real-time data. Further, the stored information can be examined to discover causes of such anomalies. That is, the historical data can be used as a diagnostic aid for determining the cause of faults, errors, malfunctions, etc. As discussed above, one or more control loops can be used by the controller 2400 to maintain set points and/or threshold ranges. The status of the control loops (e.g., sensor input, target, output value, etc.) can be stored in the data historian.

The data historian can be configured to store data for a period of time such as a week, a month, a year, a decade, etc., or can be configured to store data from the beginning of use of the controller 2400. Further, the data historian can be configured to store differing resolutions of data based on the age of the data. For example, the data historian can be configured to store the readings from a sensor with a resolution of one second (e.g., one second between readings) for the previous twenty-four hours, with a resolution of one minute for the week prior to the twenty-four hours, and with a resolution of five minutes for remainder of the stored data. Further, different sources of data can have differing resolutions.

The data historian can also store software performance metrics. For example, one or more methods or operations can be run on controller 2400. Each method or operation can include multiple steps. Which step the controller 2400 is in can be stored in the data historian with a timestamp. For example, controller 2400 can control a hydraulic piston system such as the system 400 described above with respect to FIG. 4*a*. The controller 2400 can be configured to be in one of four steps or modes, as shown in FIG. 4*b*. Which step or mode the controller 2400 is in can be stored in the data historian. The storage of the step or mode can be performed at regular intervals, such as once every half second, once a second, once every five seconds, once every minute, etc. In some embodiments, the storage of the step or mode can be triggered by an event, such as switching from one step or mode to another.

Data of performance of the controller 2400 can be stored in the data historian. For example, data such as processing resources can be recorded (e.g., memory usage, disk usage, processing time, processor usage, etc.). Further, the controller 2400 can monitor and track such information. Accordingly, if one or more processing resources drops below a predetermined threshold (or is above a predetermined threshold, depending upon the metric), the controller 2400 can take one or more actions to remedy the lack of resources. For example, the controller 2400 can kill, shut down, discontinue, etc., applications or processes that are nonessential to free up processing capability. The controller 2400 can delete log data from memory to free up memory.

The historical data of the controller 2400 metrics stored in the historian can be used to make changes to programming of the controller 2400. For example, the historical data can be used to debug software run on the controller 2400. Memory leaks or other resource leaks (e.g., a failure of a resource to be made available after the resource has been used) can be determined by evaluating the performance statistics of the controller 2400 over a period of time, such as a month.

Figure 24B:
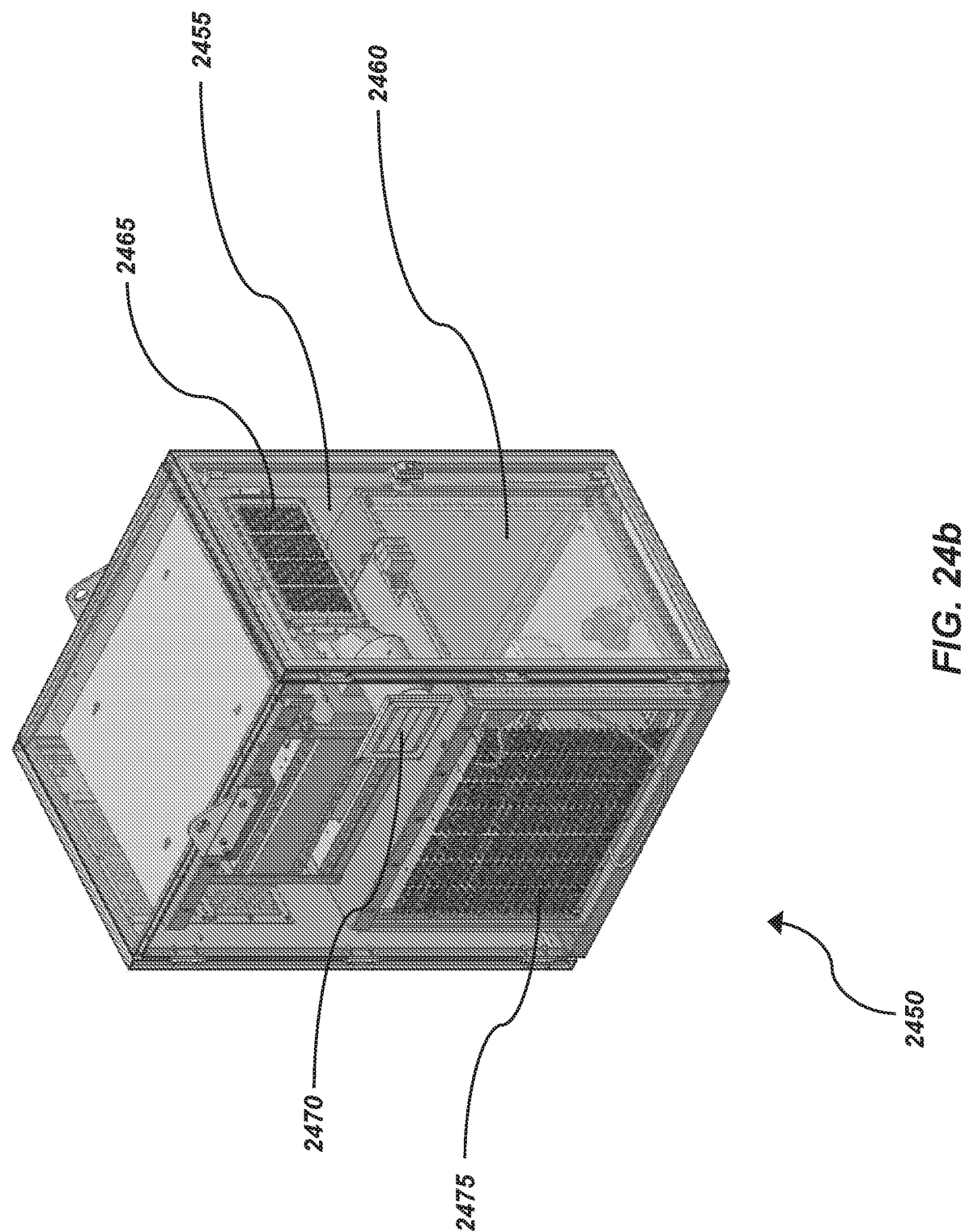
FIG. 24b is an illustration of an electronics enclosure in accordance with an illustrative embodiment.

FIG. 24b is an illustration of an electronics enclosure 2450 in accordance with an illustrative embodiment. In alternative embodiments, additional, fewer, and/or different elements can be used. The enclosure 2450 can be configured to house one or more components of controller 2400. Enclosure 2450 can include an upper portion 2455 and a lower portion 2460. Upper portion 2455 can include a fresh air inlet 2465, which can include a filter and an exhaust port 2470. The fresh air inlet 2465 and the exhaust port 2470 can be configured to circulate air, via, for example, cooling fan 2425, to cool one or more components of controller 2400.

The enclosure 2450 can include a radiator 2475, which can be configured to use a liquid to cool one or more elements of controller 2400. In some embodiments, the radiator 2475 and associated cooling lines can be in lower portion 2460. Thus, components cooled by radiator 2475 can also be located in lower portion 2460. Accordingly, if a coolant leak occurs, coolant can be isolated to the lower portion 2460, thereby protecting components in upper portion 2455. High voltage power electronics such as one or more power converters can be located in the upper portion 2455. A partition can be used to separate the upper portion 2455 and the lower portion 2460. Enclosure 2450 can be configured to be located indoors or outdoors. For example, enclosure 2450 can be configured to keep rain, snow, etc., and insects, spiders, wildlife, etc., outside of the enclosure.

As noted above, a flywheel energy storage system can include one or more sets of bearings that can be used to reduce rotational friction of a rotor or other materials. However, such bearings are not perfect and can produce heat. An oil cooling system can be used to maintain a target bearing temperature, thereby extending the life of the bearings and improving efficiency of the flywheel energy storage system.

Figure 25A:
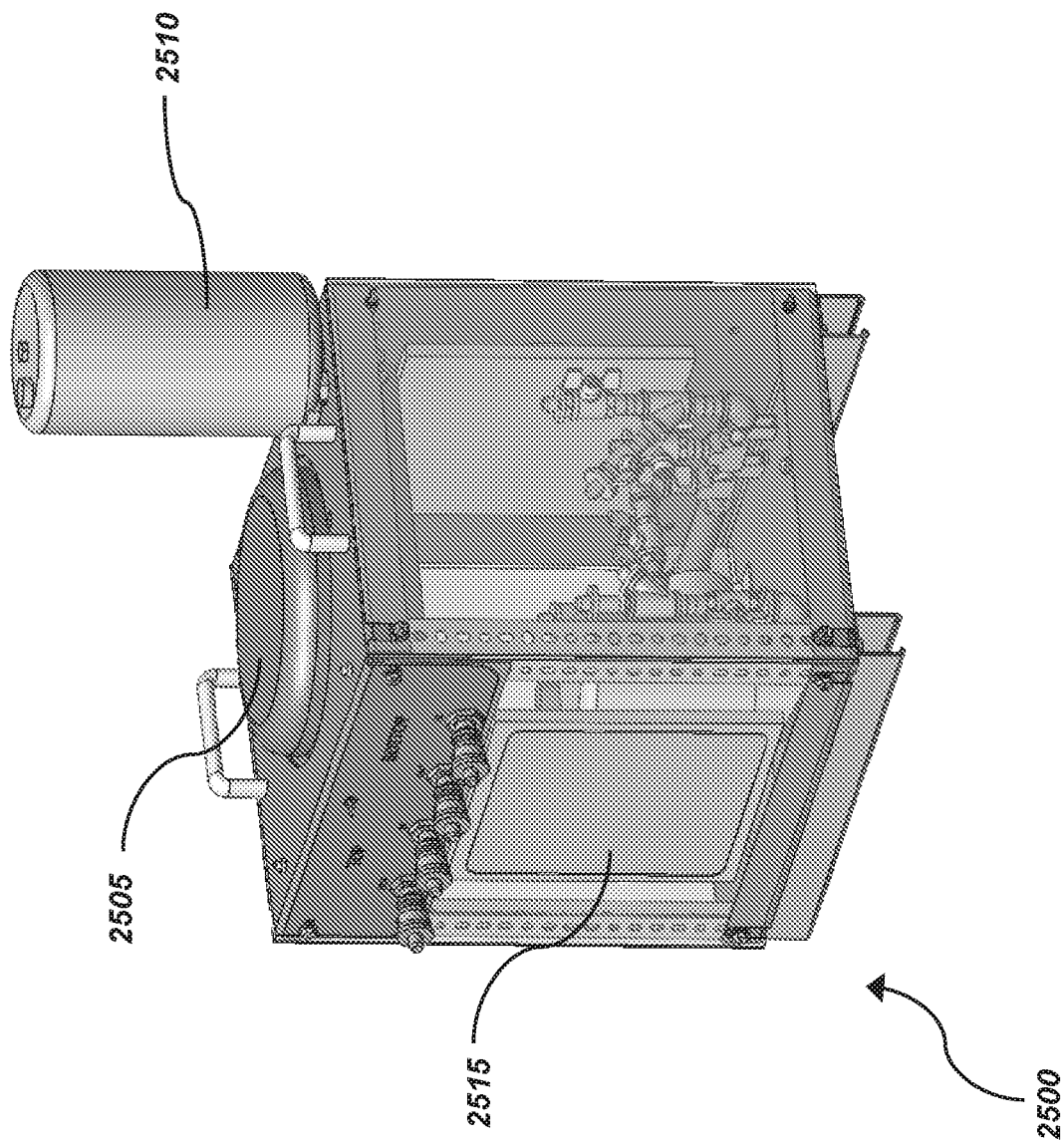
FIG. 25a illustrates an oil cooling system in accordance with an illustrative embodiment.

FIG. 25a illustrates an oil cooling system in accordance with an illustrative embodiment. In alternative embodiments, additional, fewer, and/or different elements can be used. An oil cooling system 2500 can be configured to provide over 1000 watts of cooling capacity. The oil cooling system 2500, which can include a controller, can monitor cooling performance by measuring flow, pressure, temperature, etc. In some embodiments, a controller (e.g., controller 2400) can be used to monitor cooling performance and/or control components of the oil cooling system 2500. The oil cooling system 2500 can work in concert with a flywheel energy storage device to provide stable operation.

The cooling capacity of the oil cooling system 2500 can be adjustable through pulse width modulation of a cooling fan 2505. For example, a rotational speed of the cooling fan 2505 can be increased to increase the cooling capacity of the oil cooling system 2500. An inline bypass valve can be used to adjust pressure and flow of oil in the lines and/or pipes. Leaks in the system can be detectable through a magnetic buoy in reservoir 2510. For example, if oil in the reservoir 2510 is below a minimum threshold, then a controller can determine that there is a leak in the oil cooling system.

The oil cooling system 2500 can include a radiator 2515 configured to cool the oil flowing through the oil cooling system 2500. A fan (not shown) can be configured to flow air through the radiator 2515. Although the radiator 2515 is shown as being oriented vertically in FIG. 25a, radiator 2515 can be oriented in any suitable manner, for example, horizontally.

Figure 25B:
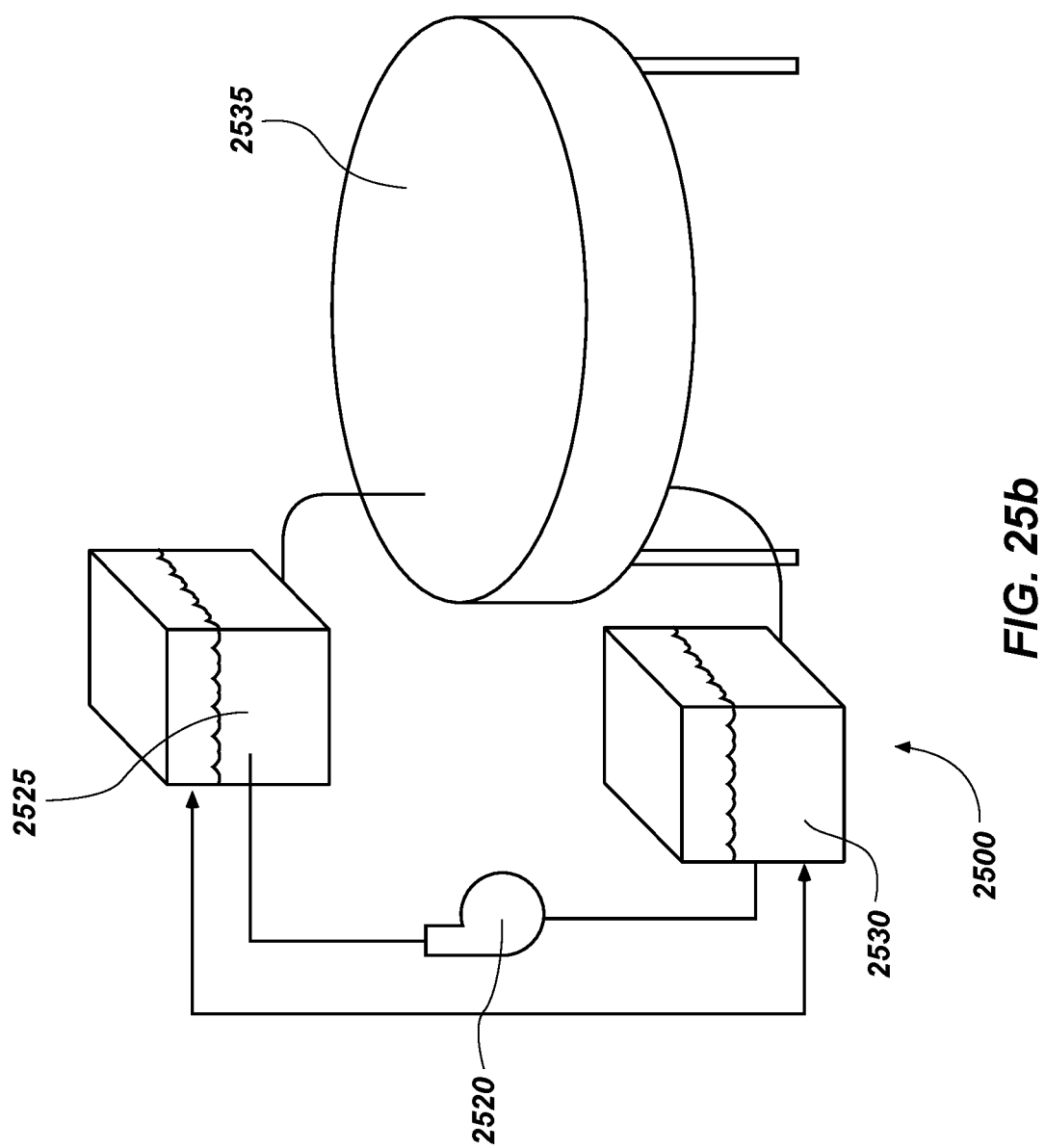
FIG. 25b is a block diagram of an oil cooling system in accordance with an illustrative embodiment.

FIG. 25b is a block diagram of an oil cooling system in accordance with an illustrative embodiment. In alternative embodiments, additional, fewer, and/or different elements can be used. Housing 2535 can include one or more sets of bearings that can be oil cooled via oil cooling system 2500. The oil cooling system 2500 can include an upper reservoir 2525, a lower reservoir 2530, and a pump 2520. Although not illustrated, the oil cooling system 2500 can include one or more filters configured to filter the oil. For example, an oil filter can be located between the pump 2520 and the upper reservoir 2525.

A controller can be configured to operate valves of the oil cooling system 2500 (if used), the pump 2520, receive signals from sensors such as float and/or level sensors, etc. The controller can also be configured to maintain a record or keep track of the number of duty cycles that the oil cooling system 2500 has operated. For example, the number of duty cycles can be used to determine when the oil filter should be changed.

In some embodiments, a positive pressure oil system 2500 can be used in which the pump 2520 can force oil to flow through the entire system, including bearings. In an alternative embodiment, such as the embodiment illustrated in FIG. 25b, a gravity fed system can be used. A gravity fed system can use little power and can be efficient.

The upper reservoir 2525 can be located above the bearings to be lubricated and/or cooled. The lower reservoir 2530 can be located below the bearings to be lubricated. Oil stored in the upper reservoir 2525 can be fed via gravity down through pipes, lines, hoses, etc., to the bearings, through the bearings, and to the lower reservoir 2530. The controller can monitor the levels in one of or both of the upper reservoir 2525 and the lower reservoir 2530. When the oil level in the upper reservoir 2525 is below a threshold, and/or if the oil level in the lower reservoir 2530 is above a threshold, pump 2520 can be turned on. The pump 2520 can be configured to pump oil from the lower reservoir 2530 to the upper reservoir 2525. When the upper reservoir 2525 has reached a certain threshold, and/or if the lower reservoir 2530 is below a certain threshold, the controller can turn the pump 2520 off.

The height at which the upper reservoir 2525 is mounted can determine the amount of flow of oil through the bearings. For example, the higher the upper reservoir 2525 is mounted, the more oil will flow through the bearings. The appropriate height can be determined based on experimental data and the amount of heat that is being generated by the bearings. Hydrostatic pressure is based on the height required. For instance, if the upper reservoir 2525 is installed at a height of 2 m above the bearings, the oil pressure at the bearings can be about 2.5 psi. The lines, hoses, pipes, etc., configured to transfer the oil can be oversized such that the lines, hoses, pipes, etc., are capable of flowing 1.5 times the required amount of oil for the system.

In some embodiments, compressed air can be used to increase the pressure within the upper reservoir 2525. The increased pressure can be used force more oil through the bearings, thereby increasing oil flow, lubrication, and cooling of the bearings. The controller can monitor the temperature of the oil leaving the bearings. If the oil is above a threshold, the controller can determine that compressed air should be added to the upper reservoir 2525 to increase oil flow.

Figure 26:
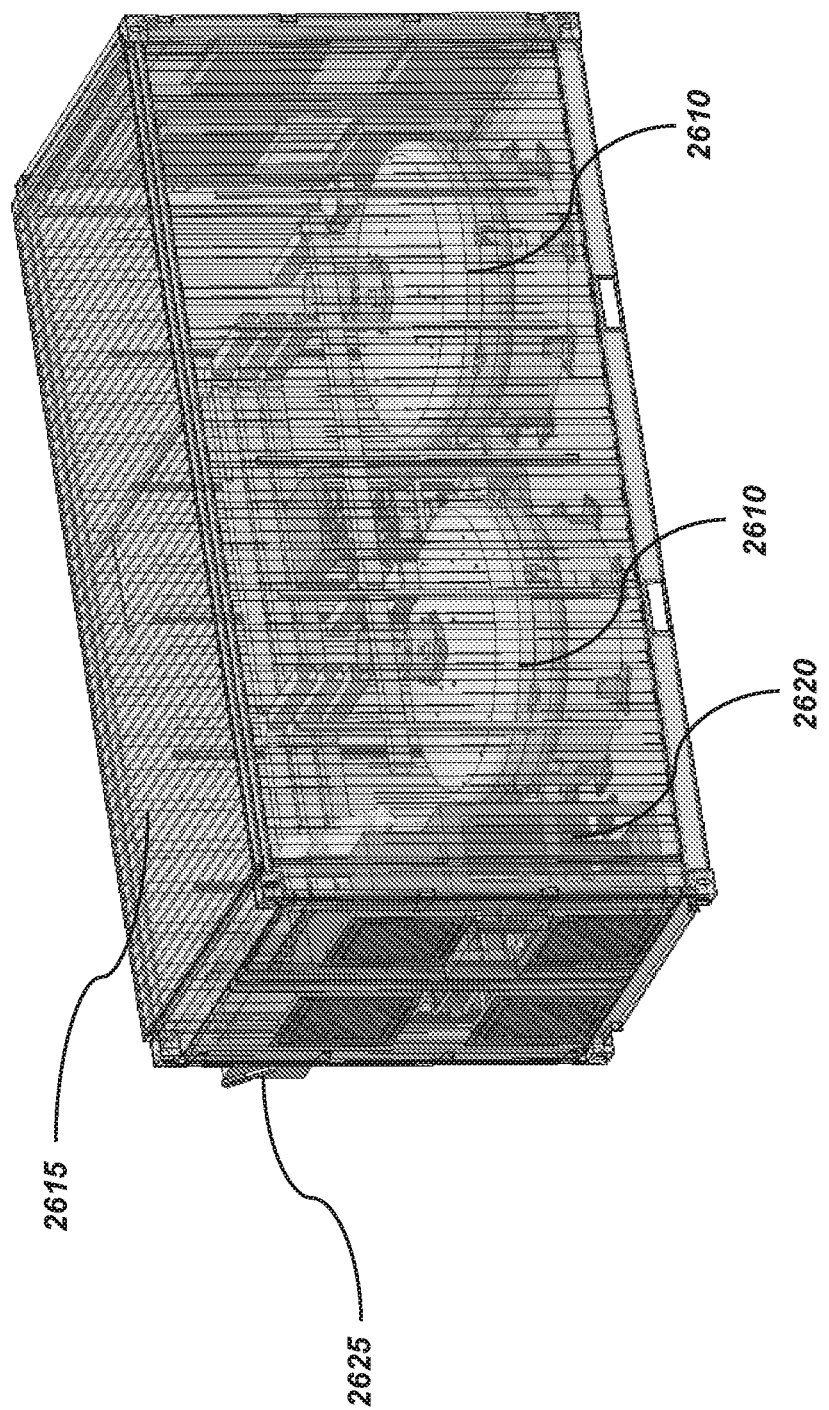
FIG. 26 illustrates a portable enclosure for multiple flywheel energy storage systems.

As discussed above, in some embodiments, one or more energy storage systems (or portions of the one or more energy storage systems) can be housed in a single housing. In some embodiments, the housing can be portable. For example, the housing can include an intermodal container (also known as a container, a freight container, an ISO container, a shipping container, a hi-cube container, a box, a sea container, a container van, a Conex container, etc.) that can be configured to be shipped. FIG. 26 illustrates a portable enclosure for multiple flywheel energy storage systems. In alternative embodiments, additional, fewer, and/or different elements can be used.

A shipping container 2615 can have six sides that enclose an inner area. The shipping container 2615 can have one or more doors, access panels, etc., on one or more sides of the shipping container 2615. In the example illustrated in FIG. 26, two sets of doors on opposing sides of the shipping container 2615 can be used. In some embodiments, one or more of the sides (e.g., the top) of the shipping container 2615 can be removable.

The shipping container 2615 can be configured to house and/or enclose one or more flywheel energy storage systems with housings 2610. In the example illustrated in FIG. 26, two energy storage systems can be housed in the shipping container 2615. The shipping container 2615 can include associated electronics, controllers, etc. In some embodiments, controls 2620 can be used to run the one or more flywheel energy storage systems. Electrical disconnects and/or shut-off switches 2625 can be located outside of the shipping container 2615.

In some embodiments, a plurality of shipping containers 2615 can be used in a system of flywheel energy storage systems. The plurality of shipping containers 2615 can be spaced apart. In some embodiments, the plurality of shipping containers 2615 can be stacked.

As discussed above, parasitic energy losses (e.g., running a controller, an electromagnet, pumps, automated valves, sensors, motors, etc.) of a flywheel energy storage system can reduce the efficiency of the storage system. Thus, in some embodiments, one or more energy sources can be used to provide energy to compensate for the parasitic energy losses. Further, if the one or more energy sources produce more energy than needed to compensate for the parasitic energy losses, additional energy can be stored in the flywheel energy storage system and/or sent to the electrical grid. Thus, in some embodiments, light energy that would otherwise be absorbed by housing 2705 and turned into heat, thereby heating the flywheel energy storage systems and or the environment of such systems, can be converted into electricity usable by the flywheel energy storage systems.

FIGS. 27a-27e illustrate housings with an integrated power source in accordance with an illustrative embodiment. In alternative embodiments, additional, fewer, and/or different elements can be used. A housing 2705 can house one or more flywheel energy storage systems. The housing 2705 can be, for example, shipping container 2615. As shown above, one or more solar panels 2710 can be mounted to a top surface of the housing 2705. The solar panels 2710 can include photovoltaic cells configured to convert light (e.g., sunlight) into electricity. In alternative embodiments, solar panels 2710 can be mounted on any surface of the housing 2705. In some embodiments, the solar panels 2710 are not mounted on the housing 2705 and can be independent of the housing 2705.

In some embodiments, the solar panels 2710 can lay flat on a surface of the housing 2705. In some embodiments, the solar panels 2710 can have a plurality of positions. For example, the solar panels 2710 can be flat on a surface of the housing 2705, for example, in a recess of the housing 2705, during shipment. The solar panels 2710 can be deployed by supporting the solar panels 2710 at a point along axis 2715 by one or more supports 2720. In the example illustrated in FIG. 27a, axis 2715 can be through a center portion of the solar panels 2710. In other embodiments, axis 2715 can be anywhere on solar panels 2710, for example, along an edge of the solar panels 2710.

The solar panels 2710 can be rotatable about axis 2715. In some embodiments, one or more motors can be used to rotate the solar panels 2710 about the axis 2715. For example, one or more pyranometers 2725 can be used to measure solar radiation flux density and/or broadband solar irradiance. The pyranometers 2725 can be used to track the position of the sun and/or the direction from which the most intense light energy is coming. Based on a reading from the pyranometers 2725, the one or more motors can rotate the solar panels 2710 about the axis 2715 such that the active surfaces of the solar panels 2710 (e.g., the surfaces configured to receive light energy to be converted to electricity) face the direction from which the most intense light is coming. The pyranometers 2725 can be mounted in any suitable location. In the example shown in FIG. 27a, two pyranometers 2725 can be located on opposite corners of the top of housing 2705.

Figure 27A:
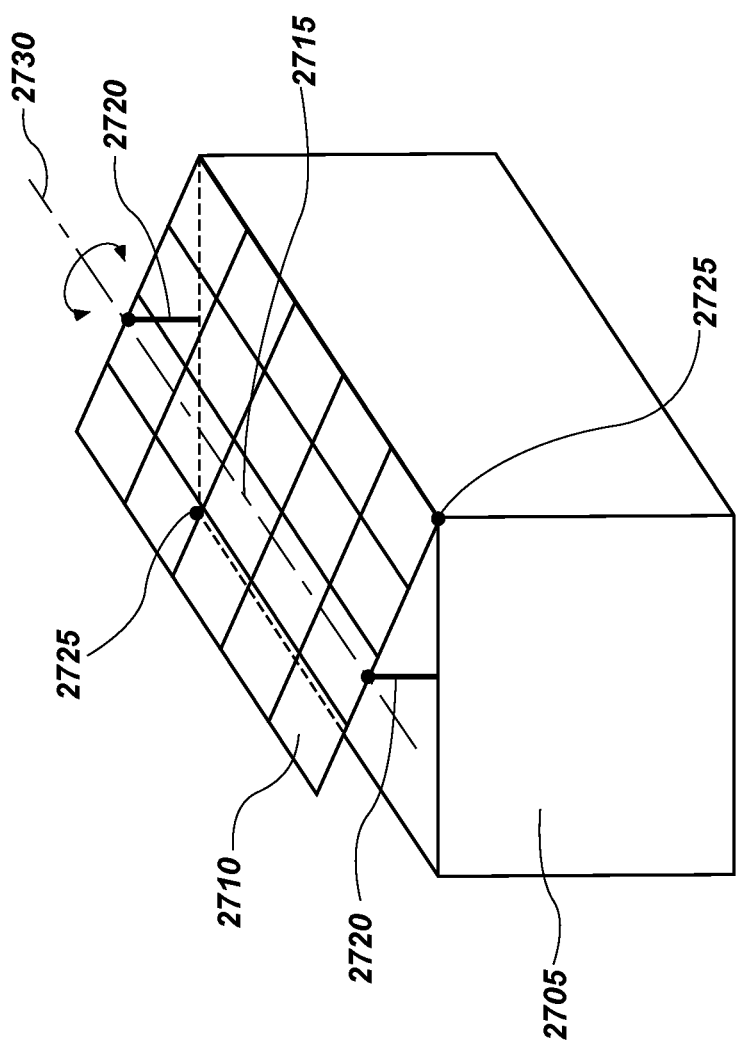
FIGS. 27a-27e illustrate housings with an integrated power source in accordance with an illustrative embodiment.
Figure 27C:
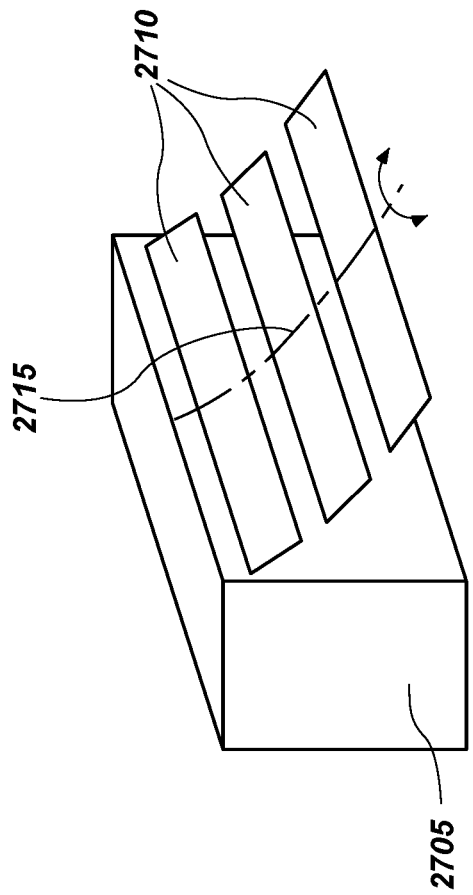
Figure 27B:
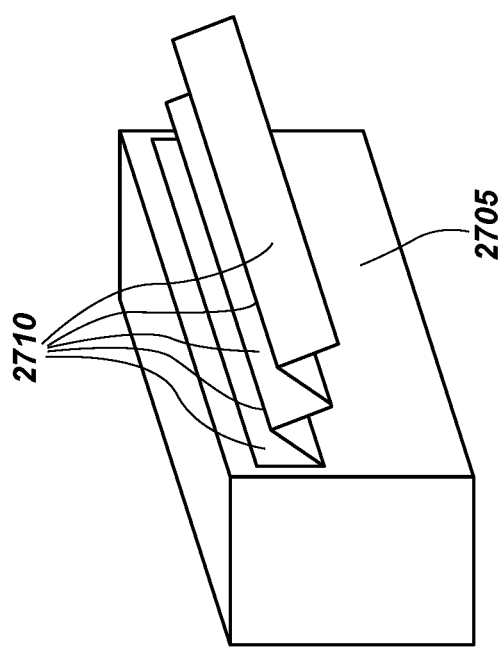

FIGS. 27b and 27c illustrate an accordion style deployment of solar panels in accordance with an illustrative embodiment. In alternative embodiments, additional, fewer, and/or different elements may be used. The solar panels 2710 can include multiple panels that can fold up into a storage compartment of housing 2705. As shown in FIG. 27b, the solar panels 2710 can be expanded in an accordion style. That is, the multiple panels of the solar panels 2710 can be connected via hinges that have axes of rotation that are in the same or opposite direction.

In a stored position, the multiple panes can be stacked together with the multiple panes facing alternating directions. As shown in FIG. 27c, the solar panels 2710 can be deployed such that the active surfaces are facing in the same direction. Furthermore, a support structure can support the solar panels 2710 such that the solar panels 2710 can rotate about an axis 2715. For example, the support structure can be a support with a center axis that is the axis 2715. As shown in FIG. 27c, the distance from the ground of each end of the support can be different. In some embodiments, the distance from the ground of each end of the support can be the same. In some embodiments, the distance from the ground of each end of the support can be changeable, for example, by one or more motors (not shown in FIG. 27c). For example, the height of one or both ends of the support can be adjusted to face the active surfaces of the solar panels 2710 towards the direction of the sun. As discussed above, one or more pyranometers 2725 can be used to determine the direction that the solar panels 2710 should face for maximum efficiency.

Figure 27D:
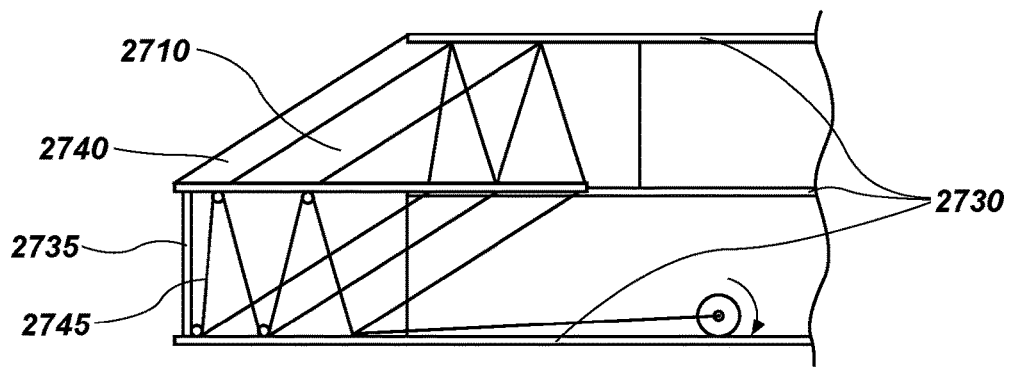
Figure 27E:
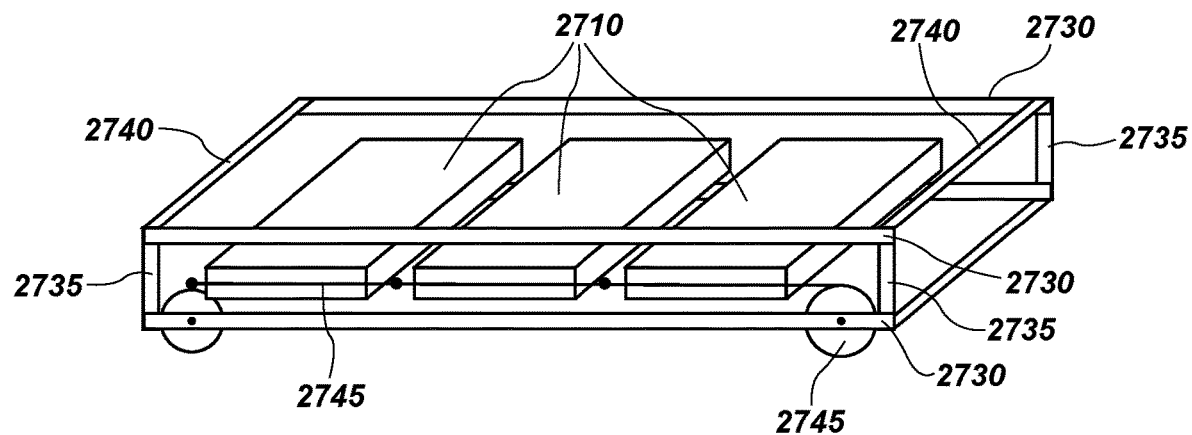

FIGS. 27d and 27e illustrate housing 2705 for deploying solar panels 2710 in accordance with an illustrative embodiment. In alternative embodiments, additional, fewer, and/or different elements can be used. As shown in FIG. 27d, multiple solar panels 2710 can have a storage position that is vertical and, as shown in FIG. 27e, can have a deployed position that is horizontal. Although three solar panels 2710 are illustrated, any suitable number of panels can be used, such as two, four, five, ten, etc.

A dynamic frame can include longitudinal rails 2730, horizontal rails 2740, and vertical rails 2735. In the storage position, the upper longitudinal rails 2730 and upper horizontal rails 2740 can be further away from the lower longitudinal rails 2730 and the lower horizontal rails 2740 than when in the deployed position. A cable 2745 can be run through guides (not illustrated in FIGS. 27d and 27e) that alternate from the upper end to the lower end of the frame, as shown in FIGS. 27d and 27e. The cable 2745 can be any suitable cable such as a rope, a steel cable, etc. The guides can be rings, holes, slots, etc., in the longitudinal rails 2730. Ends of the solar panels 2710 can be connected to the upper and lower longitudinal rails such that the connection points can be rotated and can slide along the longitudinal rails.

The cable 2745 can be attached to a winch 2748 or other device configured to provide tension to cable 2745. The winch 2748 can be configured to rotate a spool, thereby retracting the cable 2745. As the cable 2745 is retracted by the winch 2748, the upper and lower horizontal rails 2740 can move closer together. As the upper and lower horizontal rails 2740 move closer together, the solar panels 2710 can move from the storage position (vertical) to the deployed position (horizontal) by sliding down the longitudinal rails 2730. The longitudinal rails 2730, the horizontal rails 2740, and/or the vertical rails 2735 can be lockable such that the rails 2730, 2740, 2735 do not move with respect to one another. Accordingly, the rails 2730, 2740, 2735 can be locked in the storage position and/or the deployed position.

As discussed above, a flywheel energy storage system can be connected to an electrical power grid. Energy from the power grid can be used to power various components of the flywheel energy storage system such as motors, actuators, pumps, electromagnets, sensors, controllers, etc. However, if energy is not available from the grid (e.g., during a power failure, a blackout, down power lines, etc.), the flywheel energy storage system can be used to provide backup power to the various components.

For example, if power is lost to a vacuum pump configured to maintain a vacuum within the housing in which is a flywheel spinning at, for example, 6,000 rpm, damage can occur to the system. For example, air coming into the housing can contact the spinning flywheel and heat up. The heat from the air can increase the pressure of the housing, which can cause damage. For example, if enough pressure is built up, the top portion of the housing can blow off. Further, if power is lost to the electromagnet configured to levitate the flywheel, the flywheel can drop onto lower bearings while spinning and heat and/or damage the bearings. Thus, in some instances, maintaining power to some components can be useful when grid power is unavailable.

Figure 28:
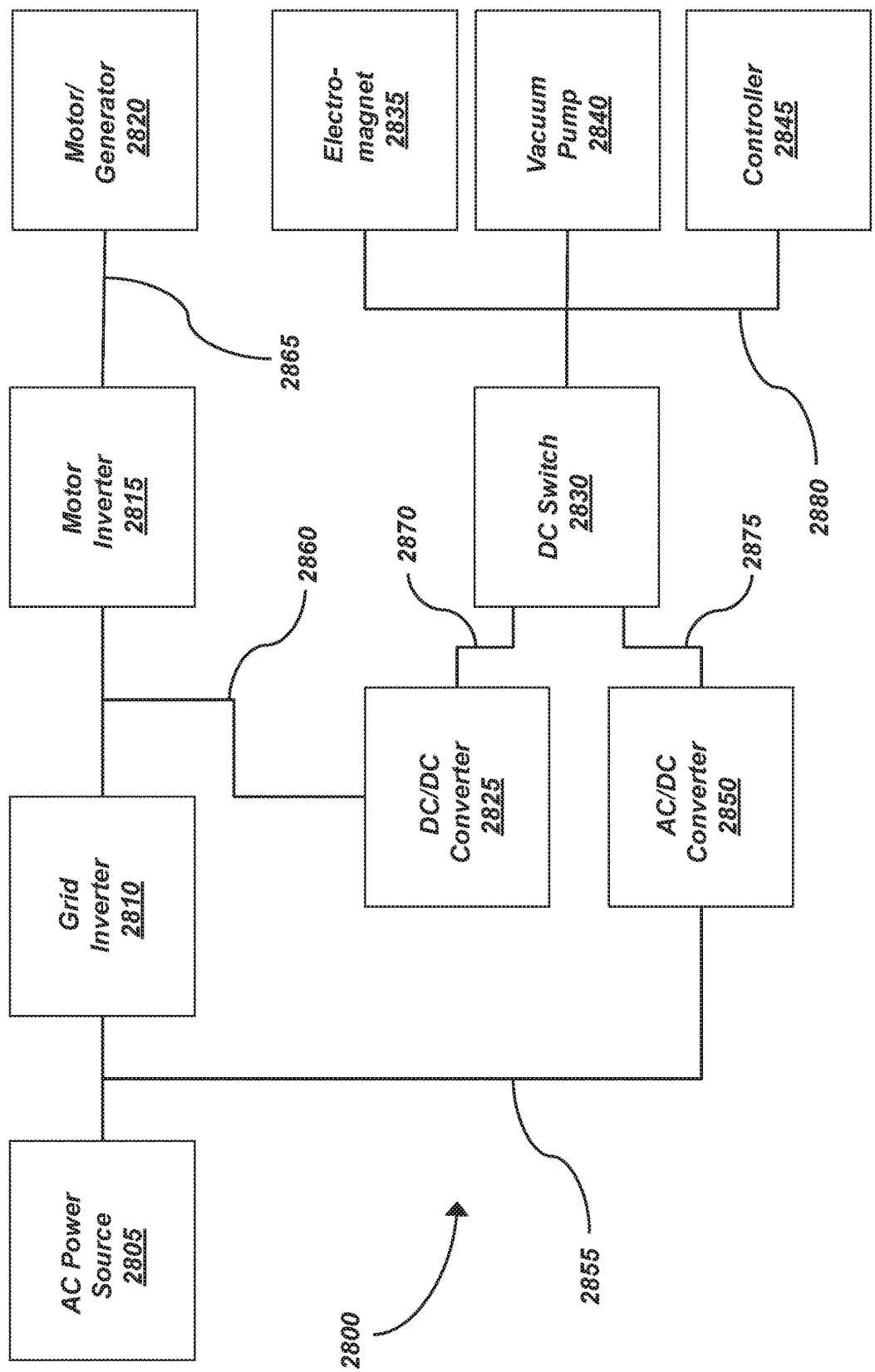
FIG. 28 is a block diagram of various electrical components of a system configured to provide backup power in accordance with an illustrative embodiment.

FIG. 28 is a block diagram of various electrical components of a system configured to provide backup power in accordance with an illustrative embodiment. In alternative embodiments, additional, fewer, and/or different elements can be used. Backup system 2800 can include an AC power source 2805, a grid inverter 2810, a motor inverter 2815, a motor/generator 2820, a DC/DC converter 2825, a DC switch 2830, an electromagnet 2835, a vacuum pump 2840, a controller 2845, and an AC/DC converter 2850. Such components can be electrically connected by line 2855, line 2860, line 2865, line 2870, line 2875, and line 2880, as shown in FIG. 28.

The AC power source 2805 can be any suitable power source such as an electrical grid. In some embodiments, the AC power source 2805 can be the AC power source 2305. Line 2855 can be an electrical line configured to transmit grid power, such as 480 VAC. The grid inverter 2810 can be configured to convert the grid power into DC power. In some embodiments, the grid inverter 2810 can be the AC/DC converter 2850. Line 2860 can be configured to transmit DC power, such as 900 VDC. The motor inverter 2815 can be configured to convert DC power into a variable AC power for motor/generator 2820 and be configured to convert the variable AC power form the motor/generator 2820 into DC power. Line 2865 can be configured to transmit variable AC power suitable to run the motor/generator 2820 and to supply power generated by motor/generator 2820. In some embodiments, the motor inverter 2815 can be the DC/variable AC converter 2315 and the motor/generator 2820 can be the motor/generator 2320.

When grid power is available from the AC power source 2805, the backup system 2800 can be configured to use the AC/DC converter 2850 to convert grid power into DC power suitable to run one or more components, such as the electromagnet 2835, the vacuum pump 2840, the controller 2845, etc. Although not illustrated in FIG. 28, the DC power can be suitable for various other components. Further, in some embodiments, the electromagnet 2835, the vacuum pump 2840, and the controller 2845 can use different DC power (e.g., different voltages), AC power, etc.

When grid power is not available from the AC power source 2805, the motor/generator 2820 can convert rotational energy supplied by a rotor into electricity. Such electricity can be converted by the motor inverter into DC power, which can be sent to the DC/DC converter 2825 via line 2860. The DC/DC converter can be configured to convert DC power output by the motor inverter 2815, such as 900 VDC, to DC voltage suitable for the electromagnet 2835, the vacuum pump 2840, the controller 2845, etc. For example, line 2870 and line 2855 can be configured to transmit 360 VDC.

The DC switch 2830 can be configured to transmit power from either or both the DC/DC converter 2825 and the AC/DC converter 2850 to the electromagnet 2835, the vacuum pump 2840, the controller 2845, etc. For example, when grid power is available, DC switch 2830 can be configured to transmit power from the AC/DC converter 2850 to the various components. When the grid power is not available, the DC switch 2830 can be configured to switch from the AC/DC converter 2850 to the DC/DC converter 2825 to provide power to the various components.

In some embodiments, the AC/DC converter 2850 is not used. In such embodiments, the DC/DC converter 2825 can transmit power directly to the various components (or via one or more other power converters) without using the DC switch 2830. In such embodiments, when grid power is not available, the motor/generator 2820 can be configured to supply power to the electrical system.

In some embodiments, both the DC/DC converter 2825 and the AC/DC converter 2850 can be used to provide backup power to one another. For example, if the AC/DC converter 2850 fails, the DC/DC converter 2825 can be used to provide power to the DC switch 2830. If the DC/DC converter fails, the AC/DC converter 2850 can be used to provide power to the DC switch 2830. Accordingly, in some embodiments, the DC/DC converter 2825 can be the primary source of power to the DC switch 2830 and in some embodiments, the AC/DC converter 2850 can be the primary source for power to the DC switch 2830. The DC switch 2830 can be configured to select power from either the DC/DC converter 2825 or the AC/DC converter 2850, depending upon which supply has the highest voltage and/or is available. The DC switch 2830 can be controlled by a controller, such as controller 2845 or controller 2400.

As discussed above, flywheel energy storage systems can provide line power when an AC power source (such as from a power generation station, a generator, a power plant, etc.) fails. Thus, when the power source fails, the flywheel energy storage system can switch to provide power. However, some systems rely on constant, uninterrupted power from the grid.

Accordingly, some embodiments can provide a fast switching mechanism that can provide such power without a complete loss of power.

A controller, such as controller 2400, can be configured to monitor the electrical power of the grid. For example, the controller can monitor amperage, voltage, and phase of the grid electricity. Thus, when grid power fails, the flywheel energy storage system can be configured to detect the failure and, in response to detecting the failure, supply power to the grid that matches the grid power in at least one of voltage, amperage, and phase. That is, an inverter, such as the AC/DC converter 2310 or the grid inverter 2810, can be configured to output power to the grid that has the same phase as the grid power.

The controller can monitor the voltage of the grid. When the grid voltage drops below a threshold, the controller can be configured to provide power to the grid from the energy stored in the flywheel energy storage system. Thus, voltage on the grid can be maintained above (or slightly below) the threshold. One or more circuit interrupters (e.g., circuit breakers) can be used to prevent a power above an upper threshold from being supplied to the grid by one or more flywheel energy storage systems.

Similarly, some power grids can receive power from fluctuating and/or unreliable energy sources such as wind or solar. Accordingly, in some instances, a sudden drop in power generated by the unreliable energy sources can be replaced by an on-demand power generator. However, in some instances, the on-demand power generator cannot ramp-up fast enough to provide enough power to the grid if an unreliable energy source suddenly fails to produce the required power. In such instances, a momentary drop in power can occur and can be detrimental to some loads. Accordingly, in such instances, energy stored in flywheel energy storage systems can be used to provide power to the grid after an unreliable power source reduces the power produced and before the on-demand power source is capable of replacing the unreliable power source as a source of power to the grid. Thus, constant and uninterruptable power can be provided on the grid.

In some embodiments, the controller can be configured to monitor the power output by a power source. The power source can be an unreliable power source such as a wind turbine or a bank of photovoltaic cells. If the magnitude of active and/or reactive power output to the power grid by the power source drops below a threshold, the controller can be configured to supply power to the grid from the flywheel energy storage systems.

In some embodiments, the controller can be configured to monitor the power load of an electrical system. For example, the power load can be the load of a household, a building, a processing plant, a warehouse, etc. In some instances, power generating companies can charge customers (e.g., power consumers) more money per kilowatt hour during peak demand times than during non-peak demand times. Thus, in some embodiments, one or more flywheel energy storage systems can be configured to store power received from the AC grid during non-peak demand times. The controller can monitor the AC load of an electrical system. If the AC load is above a threshold (for example, a threshold triggering higher electricity rates), energy can be provided to the AC load by the one or more flywheel energy storage systems. Thus, while the AC load can fluctuate, power used by the AC load from the power generator can remain below a threshold. Further, while actual the AC load can fluctuate, the power supplied to the AC load by the power generator can be more consistent over time with fewer fluctuations.

Harmonic distortion of an electrical circuit can be caused by non-linear loads. Harmonic distortion of an electrical signal causes the actual signal to deviate from the intended signal. Harmonic distortion can have detrimental effects on electrical equipment and can increase the amount of power consumed by a load. Harmonic distortion correction systems can be configured to reduce the amount of harmonic distortion. Some harmonic distortion correction systems can reduce the apparent power of loads. In some instances, harmonic distortion correction systems are implemented on the power generation side of the circuit as opposed to the load side of the circuit. In some embodiments of the present disclosure, a harmonic distortion correction system can be used on the load side of an electrical circuit, for example, at an electrical power customer's location.

As discussed above, a controller can monitor the power of an electrical grid. For example, one or more sensors can measure active and reactive power of electrical lines. The controller can detect and quantify the amount of harmonic distortion in the line power. The controller can use a harmonic distortion correction system to adjust the active and reactive power output by the flywheel energy storage system to cancel out or minimize the harmonic distortion of the line.

To output active power, energy can be converted from kinetic energy of a flywheel to a motor/generator such as motor/generator 2820. That is, the kinetic energy of the flywheel can be used to apply torque to the shaft of the generator, thereby causing the generator to output electrical energy. The electrical power output by the generator has active power. A capacitor can be placed in parallel with the generator. The capacitor can be connected to the circuit via a switch. The controller can alternate the position of the switch (which can be an electronic switch comprising transistors) from closed to open according to the amount of reactive power the flywheel energy storage system should output to minimize or eliminate harmonic distortion.

The amount of output power output by a generator can be determined by using the following equation:

$$\text{Power} = (\text{Torque} \times \text{Speed}) 9549$$

Power can be measured in kilowatts and can be the output of the generator. Torque can be the amount of torque in newton meters applied to a shaft of the generator by the spinning flywheel. Speed can be the rotational speed of the shaft of the generator (and, therefore, the speed of the flywheel in some embodiments) in revolutions per minute. The speed can be measured by a Hall effect sensor. The controller can be configured to receive signals from the Hall effect sensor indicating a voltage difference across an electrical conductor. In some embodiments, the Hall effect sensor can be configured to determine the speed of the flywheel. The controller can determine an amount of active power to be applied to the grid based on readings of the electrical characteristics of the grid power. The controller can also read the speed of the flywheel. Thus, using the equation above, the controller can determine the amount of torque to be applied to the motor to generate the proper amount of active power. The controller can vary the applied torque by varying the power delivered from the generator. The controller can measure the power output by the generator (e.g., volts and amperes) and the rotational speed of the motor. The torque is proportional to the power divided by the rotational speed.

The controller can be configured to determine the amount of reactive power that should be output by the flywheel energy storage system to minimize or eliminate harmonic distortion in the grid. As noted above, a capacitor can be connected in a circuit along with the generator, and a switch can alternately open and close, thereby exposing the capacitor to the circuit. The controller can be configured to modify the duty cycle of such switching to modify the amount of reactive power output by the flywheel energy storage system. The controller can use the following equation to determine how much reactive power (e.g., capacitance) should be output by the flywheel energy storage system:

$$C=Q/(2\times\pi\times f\times V^2)$$

C can be the capacitance in microfarads, Q can be the amount of reactive power of the grid in kilovolts-amperes reactive (kVAR), f can be the grid frequency in Hertz (Hz), and V can be the root means squared alternating current voltage (AC $V_{rms}$). The amount of reactive power added to the circuit by the capacitor can be determined to increase the power factor of the grid to (or near) 1.0.

The controller can also be configured to calculate the reduction in the amount of active power in the grid by the following equation:

$$\Delta P=(P_{TOTAL}^2-Q_{TOTAL}^2)^{0.5}-S_{FREQ}$$

$\Delta P$ can be the change in the amount of active power, $P_{TOTAL}$ can be the amount of active power of all frequencies combined, $Q_{TOTAL}$ can be the amount of reactive power of all frequencies combined, and $S_{FREQ}$ can be the amount of apparent power of the desired frequency (e.g., the primary or fundamental frequency of the grid).

The controller can monitor and record the amount of active and reactive power of the grid. For example, such measurements can be recorded in a data historian. Monitors such as current transducers and voltage monitors can be located on the grid electrical conductors (e.g., the incoming lines to the flywheel energy storage system from the grid). Such information can be used to analyze the efficiency of the flywheel energy storage system. Such information can include voltage, frequency, current, active power magnitude, reactive power magnitude, and power factor. Such information can be stored in a data historian. Such information can be used to calculate the amount of apparent power reduction. The apparent power reduction of the power grid can be based on the flywheel energy storage system's active power and reactive power output.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A flywheel energy storage system comprising:
a rotor having a vertical rotational axis about which the rotor spins in operation and comprising a ferrous material;
a housing enclosing the rotor and having an interior subject to a vacuum;
a vacuum pump configured to provide the vacuum of the interior of the housing;
an electromagnet configured to apply a magnetic field and lift the rotor vertically in the direction along the vertical rotational axis of the rotor;
at least one mechanical bearing provided between the rotor and the housing, the rotor applying a force against the at least one mechanical bearing in operation of the flywheel energy storage system; and
a controller in operative communication with the electromagnet and the vacuum pump.

2. The flywheel energy storage system of claim 1, further comprising a first temperature sensor configured to sense a temperature of the at least one mechanical bearing, wherein the controller is in operative communication with the first temperature sensor.

3. The flywheel energy storage system of claim 1, wherein the at least one mechanical bearing comprises an upper mechanical bearing and a lower mechanical bearing, the rotor provided between the upper mechanical bearing and lower mechanical bearing.

4. The flywheel energy storage system of claim 3, further comprising a lower drive mechanism configured to provide an upward force on the lower mechanical bearing and the rotor, wherein the controller is in operative communication with the lower drive mechanism.

5. The flywheel energy storage system of claim 4, further comprising a first load sensor configured to sense a force between the lower mechanical bearing and the lower drive mechanism, wherein the first load sensor is in operative communication with the controller.

6. The flywheel energy storage system of claim 5, further comprising a second load sensor configured to sense a force between the upper mechanical bearing and the housing, wherein the controller is in operative communication with the second load sensor.

7. The flywheel energy storage system of claim 4, wherein the lower drive mechanism comprises a hydraulic piston coupled to the rotor, the hydraulic piston configured to adjust a force applied to the at least one mechanical bearing in a direction opposite which the rotor applies the force against the at least one mechanical bearing.

8. The flywheel energy storage system of claim 4, wherein the lower drive mechanism comprises:
a plate provided against the at least one mechanical bearing and on a side of the at least one mechanical bearing opposite which the rotor applies the force against the at least one mechanical bearing; and
a motor operatively coupled to the plate and configured to adjust a force applied by the plate against the at least one mechanical bearing.

9. The flywheel energy storage system of claim 4, wherein the lower drive mechanism comprises:
an adjustable block movable relative to the housing; and
at least one spring coupled to the at least one mechanical bearing at a first end and to the adjustable block at a second, opposite end, wherein a position of the adjustable block relative to the housing varies a stiffness of the at least one spring to vary a resonant frequency of the rotor.

10. The flywheel energy storage system of claim 4, wherein the lower drive mechanism comprises a magnetorheological (MR) fluid-filled spacer extending between the housing and the rotor, the MR fluid-filled spacer.

11. The flywheel energy storage system of claim 2, further comprising a second temperature sensor configured to sense a temperature of the lower mechanical bearing, wherein the controller is in operative communication with the second temperature sensor.

12. The flywheel energy storage system of claim 11, further comprising an oil cooling system, the oil cooling system comprising:
a radiator configured to cool oil flowing through the oil cooling system; and
a pump coupled to the at least one mechanical bearing to provide oil cooled by the radiator to the at least one mechanical bearing and reduce the temperature of the lower mechanical bearing.

13. The flywheel energy storage system of claim 1, further comprising a motor rotationally coupled to the rotor, wherein the motor is configured to convert electrical energy into rotational energy to the rotor in a first state and configured to convert rotational energy from the rotor into electrical energy in a second state, and wherein the controller is operatively coupled to the motor.

14. The flywheel energy storage system of claim 13, further comprising an inverter configured to convert electrical energy of the motor into line energy of an electrical grid, wherein the controller is operatively coupled to the inverter.

15. The flywheel energy storage system of claim 13, wherein a rotational axis of the motor is aligned with the rotational axis of the rotor.

16. The flywheel energy storage system of claim 1, further comprising a rotational seal between a shaft of a motor and a housing configured to maintain the vacuum within the interior of the housing.

17. The flywheel energy storage system of claim 1, wherein the at least one mechanical bearing comprises ball bearings and a raceway, the raceway comprising at least one shield of high magnetic permeability material.

18. A flywheel energy storage system comprising:
a rotor having a vertical rotational axis about which the rotor spins in operation and comprising a ferrous material;
a housing enclosing the rotor;
an electromagnet configured to apply a magnetic field and lift the rotor vertically in the direction along the vertical rotational axis of the rotor; and
at least one mechanical bearing provided between the rotor and the housing, the rotor applying a force against the at least one mechanical bearing throughout operation of the flywheel energy storage system.

19. The flywheel energy storage system of claim 18, further comprising a seismic isolator on which the housing is provided, the seismic isolator comprising a structure of alternating reinforcing layers to provide structural rigidity to the seismic isolator and isolation layers configured to absorb vibrations traveling through the seismic isolator.

20. The flywheel energy storage system of claim 18, further comprising an oil cooling system, the oil cooling system comprising:
   a radiator configured to cool oil flowing through the oil cooling system; and
   a pump coupled to the at least one mechanical bearing and to provide oil cooled by the radiator to the at least one mechanical bearing.

* * * * *

UNITED STATES PATENT AND TRADEMARK OFFICE
CERTIFICATE OF CORRECTION

PATENT NO. : 10,848,031 B2
APPLICATION NO. : 15/827672
DATED : November 24, 2020
INVENTOR(S) : Phil Alei et al.

Page 1 of 1

It is certified that error appears in the above-identified patent and that said Letters Patent is hereby corrected as shown below:

In the Specification
Column 30, Line 38, change "natural frequency (A) of" to --natural frequency ($f_n$) of--

In the Claims
Claim 16, Column 54, Line 46, change "a housing configured to" to --the housing configured to--

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*